United States Patent
Ozcan et al.

(10) Patent No.: US 12,300,006 B2
(45) Date of Patent: May 13, 2025

(54) METHOD AND SYSTEM FOR DIGITAL STAINING OF MICROSCOPY IMAGES USING DEEP LEARNING

(71) Applicant: THE REGENTS OF THE UNIVERSITY OF CALIFORNIA, Oakland, CA (US)

(72) Inventors: Aydogan Ozcan, Los Angeles, CA (US); Yair Rivenson, Los Angeles, CA (US); Hongda Wang, Los Angeles, CA (US); Yilin Luo, Los Angeles, CA (US); Kevin de Haan, Los Angeles, CA (US); Yijie Zhang, Los Angeles, CA (US); Bijie Bai, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 316 days.

(21) Appl. No.: 17/783,260

(22) PCT Filed: Dec. 22, 2020

(86) PCT No.: PCT/US2020/066708
§ 371 (c)(1),
(2) Date: Jun. 7, 2022

(87) PCT Pub. No.: WO2021/133847
PCT Pub. Date: Jul. 1, 2021

(65) Prior Publication Data
US 2023/0030424 A1    Feb. 2, 2023

Related U.S. Application Data

(60) Provisional application No. 63/058,329, filed on Jul. 29, 2020, provisional application No. 62/952,964, filed on Dec. 23, 2019.

(51) Int. Cl.
*G06V 20/00* (2022.01)
*G06T 7/00* (2017.01)
(Continued)

(52) U.S. Cl.
CPC .......... *G06V 20/698* (2022.01); *G06T 7/0012* (2013.01); *G06V 10/82* (2022.01);
(Continued)

(58) Field of Classification Search
CPC .... G06V 20/698; G06V 10/82; G06T 7/0012; G06T 2207/10056; G06T 2207/20084; G06T 328/128
See application file for complete search history.

(56) References Cited

U.S. PATENT DOCUMENTS 10,795,315 B2    10/2020    Ozcan et al.
1,083,819 A1     11/2020    Ozcan et al.
(Continued)

FOREIGN PATENT DOCUMENTS

CA              3102297 A1    12/2019
WO    WO 2019/103909 A1    5/2019
(Continued)

OTHER PUBLICATIONS

Digital staining through the application of deep neural networks to multi-modal multiphoton microscopy; Navid Borhani (Year: 2019).*
(Continued)

*Primary Examiner* — Khai M Nguyen
(74) *Attorney, Agent, or Firm* — VISTA IP LAW GROUP LLP

(57) ABSTRACT

A deep learning-based digital/virtual staining method and system enables the creation of digitally/virtually-stained microscopic images from label or stain-free samples. In one embodiment, the method of generates digitally/virtually-stained microscope images of label-free or unstained
(Continued)

samples using fluorescence lifetime (FLIM) image(s) of the sample(s) using a fluorescence microscope. In another embodiment, a digital/virtual autofocusing method is provided that uses machine learning to generate a microscope image with improved focus using a trained, deep neural network. In another embodiment, a trained deep neural network generates digitally/virtually stained microscopic images of a label-free or unstained sample obtained with a microscope having multiple different stains. The multiple stains in the output image or sub-regions thereof are substantially equivalent to the corresponding microscopic images or image sub-regions of the same sample that has been histochemically stained.

14 Claims, 24 Drawing Sheets

(51) Int. Cl.
G06V 10/82 (2022.01)
G06V 20/69 (2022.01)
(52) U.S. Cl.
CPC .............. G06T 2207/10056 (2013.01); G06T 2207/20084 (2013.01)

(56) References Cited

U.S. PATENT DOCUMENTS

| | | |
|---|---|---|
| 10,871,745 B2 | 12/2020 | Ozcan et al. |
| 11,222,415 B2 | 1/2022 | Ozcan et al. |
| 11,262,286 B2 | 3/2022 | Ozcan et al. |
| 11,776,124 B1* | 10/2023 | Behrooz ............ G06T 5/50 382/128 |
| 2017/0168285 A1 | 6/2017 | Ozcan et al. |
| 2018/0239951 A1 | 8/2018 | El-Zehiry et al. |
| 2019/0294108 A1 | 9/2019 | Ozcan et al. |
| 2019/0333199 A1 | 10/2019 | Ozcan et al. |
| 2020/0250794 A1 | 8/2020 | Zimmer et al. |
| 2021/0043331 A1* | 2/2021 | Ozcan ............ G16H 30/20 |
| 2021/0264214 A1* | 8/2021 | Ozcan ............ G06V 10/764 |
| 2022/0114711 A1 | 4/2022 | Ozcan et al. |
| 2022/0122313 A1 | 4/2022 | Ozcan et al. |

FOREIGN PATENT DOCUMENTS

| | | | | |
|---|---|---|---|---|
| WO | WO 2019/118544 A1 | 6/2019 | | |
| WO | WO 2019/154987 A1 | 8/2019 | | |
| WO | WO-2019191697 A1 * | 10/2019 | ......... | G06F 18/2155 |
| WO | WO 2020/219468 A1 | 10/2020 | | |
| WO | WO 2020/242993 A1 | 12/2020 | | |
| WO | WO 2021/133847 A1 | 7/2021 | | |
| WO | WO 2021/188839 A1 | 9/2021 | | |

OTHER PUBLICATIONS

PCT International Search Report for PCT/US2020/066708, Applicant: The Regents of the University of California, Form PCT/ISA/210 and 220, dated Mar. 17, 2022 (3 pages).
PCT Written Opinion of the International Search Authority for PCT/US2020/066708, Applicant: The Regents of the University of California, Form PCT/ISA/237, dated Mar. 17, 2022 (12 pages).
Navid Borhani et al., Digital staining through the application of deep neural networks to multi-modal multi-photon microscopy, Biomed Opt Express, Mar. 1, 2019; 10(3):1339-1350.
Yichen Wu et al., Three-dimensional virtual refocusing of fluorescence microscopy images using deep learing, In: Cornell University Library/Computer Science/Computer Vision and Pattern Recognition, Nov. 2, 2019, [online] [retrieved on Feb. 24, 2021] Retrieved from the Internet <URL:https://arxiv.org/abs/1901.11252v2>.
Martin Abadi et al., TensorFlow: A system for large-scale machine learning, USENIX Association, 12th USENIX Symposium on Operating Systems Design and Implementation (OSDI '16), Nov. 2-4, 2016, pp. 265-283.
Aldo Badano et al., Consistency and Standardization of Color in Medical Imaging: a Consensus Report, J Digit Imaging (2015) 28:41-52.
B. Forster et al., Complex Wavelets for Extended Depth-of-Field: A New Method for the Fusion of Multichannel Microscopy Images, Microscopy Research and Technique 65:33-42 (2004).
Ian J. Goodfellow et al., Generative Adversarial Nets, arXiv:1406.2661v1 [stat.ML] Jun. 10, 2014 (9 pages).
Khizar Hayat, Super-Resolution via Deep Learning, arXiv:1706.09077v1 [cs.CV] Jun. 28, 2017 (33 pages).
Kaiming He et al., Deep Residual Learning for Image Recognition, IEEE Xplore (2016), pp. 770-778.
Xiwei Huang et al., Machine Learning Based Single-Frame Super-Resolution Processing for Lensless Blood Cell Counting, Sensors 2016, 16, 1836; doi:10.3390/s16111836.
Diederik P. Kingma et al., Adam: A Method for Stochastic Optimization, ICLR 2015, arXiv:1412.6980v9 [cs.LG] Jan. 30, 2017 (5 pages).
Christian Ledig et al., Photo-Realistic Single Image Super-Resolution Using a Generative Adversarial Network, IEEE Xplore (2017), pp. 4681-4690.
Tairan Liu et al., Deep learning-based superresolution in coherent imaging systems, Scientific Reports, (2019), 9:3926, https://doi.org/10.1038/s41598-019-40554-1.
Xudong Mao et al., Least Squares Generative Adversarial Networks, arXiv:1611.04076v3 [cs.CV] Apr. 5, 2017 (16 pages).
Yair Rivenson et al., Virtual histological staining of unlabelled tissue autofluorescence images via deep learning, Nature Biomedical Engineering, vol. 3, Jun. 2019, 466-477.
Yair Rivenson et al., Deep learning-based virtual histology staining using autofluorescence of label-free tissue, arXiv:1803.11293 [cs.CV], Apr. 2018 (22 pages).
Yair Rivenson et al., Deep learning microscopy, Optica , vol. 4, No. 11, Nov. 2017, pp. 1437-1443.
Yair Rivenson et al., Phase recovery and holographic image reconstruction using deep learning in neural networks, ArXiv170504286 (2017) (30 pages).
Olaf Ronneberger et al., U-Net: Convolutional Networks for Biomedical Image Segmentation, arXiv:1505.04597v1 [cs.CV] May 18, 2015 (8 pages).
Johannes Schindelin et al., Fiji—an Open Source platform for biological image analysis, Nat Methods.; 9(7): doi:10.1038/nmeth.2019.
Tomoyoshi Shimobaba et al., Convolutional neural network-based regression for depth prediction in digital holography, arXiv:1802.00664v1 [cs.CV] Feb. 2, 2018.
Ayan Sinha et al., Lensless computational imaging through deep learning, Optica, vol. 4, No. 9, Sep. 2017, pp. 1117-1125.
Philippe Thevenaz et al., A Pyramid Approach to Subpixel Registration Based on Intensity, IEEE Transactions on Image Processing, vol. 7, No. 1, Jan. 1998, pp. 27-41.
Kyong Hwan Jin et al., Deep Convolutional Neural Network for Inverse Problems in Imaging, IEEE Transactions on Image Processing, vol. 26, No. 9, Sep. 2017, pp. 4509-4522.
Zhou Wang et al., Multi-Scale Structural Similarity for Image Quality Assessment, (2003), (5pages).
Wenming Yang et al., Deep Learning for Single Image Super-Resolution: A Brief Review, arXiv:1808.03344v1 [cs.CV] Aug. 9, 2018 (15 pages).
Martin Weigert et al., Isotropic Reconstruction of 3D Fluorescence Microscopy Images Using Convolutional Neural Networks, MICCAI 2017, Part II, LNCS 10434, pp. 126-134 (2017).
Yichen Wu et al., Extended depth-of-field in holographic imaging using deep-learning-based autofocusing and phase recovery, Optica, vol. 5, No. 6, Jun. 2018, pp. 704-710.
Yibo Zhang et al., Accurate c olor imaging of pathology slides using holography and absorbance spectrum estimation of histochemical stains, (2018) (28 pages).

(56) References Cited

OTHER PUBLICATIONS

Yibo Zhang et al., Digital synthesis of histological stains using micro-structured and multiplexed virtual staining of label-free tissue, Light: Science & Applications (2020) 9:78 (13 pages).
Jun-Yan Zhu et al., Unpaired Image-to-Image Translation using Cycle-Consistent Adversarial Networks, arXiv:1703.10593v1 [cs.CV] Mar. 30, 2017 (18 pages).
Yichen Wu et al., Three-dimensional virtual refocusing of fluorescence microscopy images using deep learning, (2019) (47 pages).
PCT International Preliminary Report on Patentability (Chapter I of the Patent Cooperation Treaty) for PCT/US2020/066709, Applicant: The Regents of the University of California, Form PCT/IB/326 and 373, dated Jul. 7, 2022 (14 pages).
Sandfort Veit et al., Data augmentation using generative adversarial networks (CycleGAN) to improve generalizability in CT segmentation tasks, Scientific Reports, (2019), 9:16884; https://doi.org/10.1038/s41598-019-52737-x.
The extended European search report dated May 12, 2023 for European Patent Application No. 20905259.6, (9 pages).
Communication pursuant to Rules 70(2) and 70a(2) EPC dated May 31, 2023 for European Patent Application No. 20905259.6, (1 page).
Response to Office Action dated Feb. 5, 2025 for Japanese Patent Application No. 2022-537383, English Translations for amended claims only (20 pages).

* cited by examiner

FIG. 3A  Contrast enhanced unstained tissue DAPI image
FIG. 3B  Unstained salivary gland tissue DAPI image (network input)
FIG. 3C  H&E virtually stained salivary gland tissue (network output)
FIG. 3D  H&E histologically stained salivary gland tissue

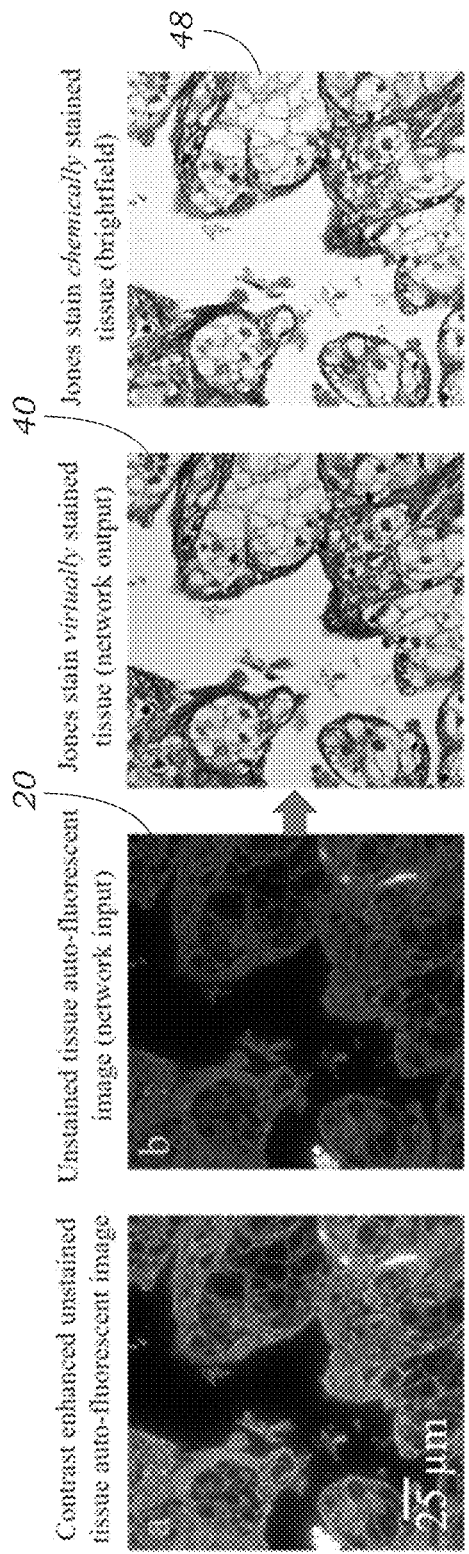
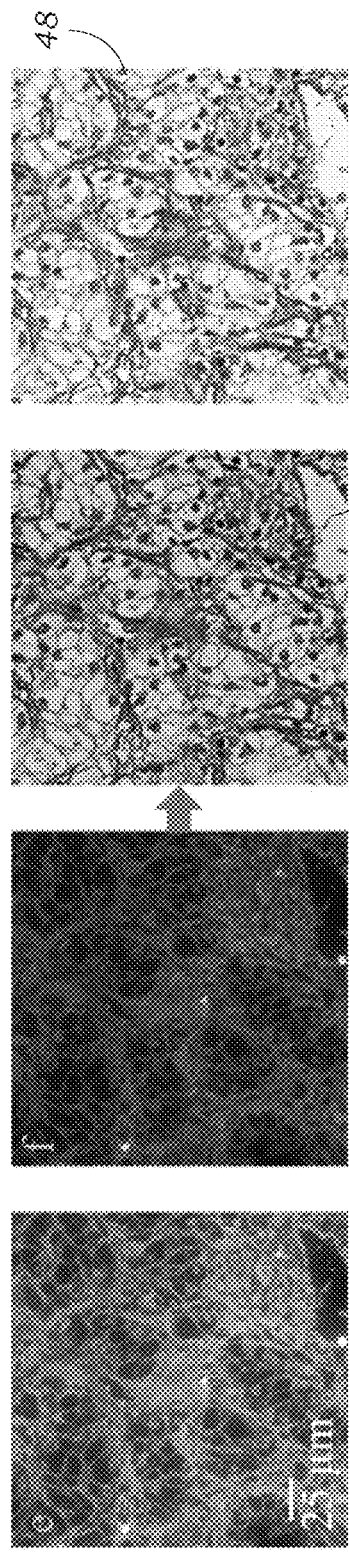

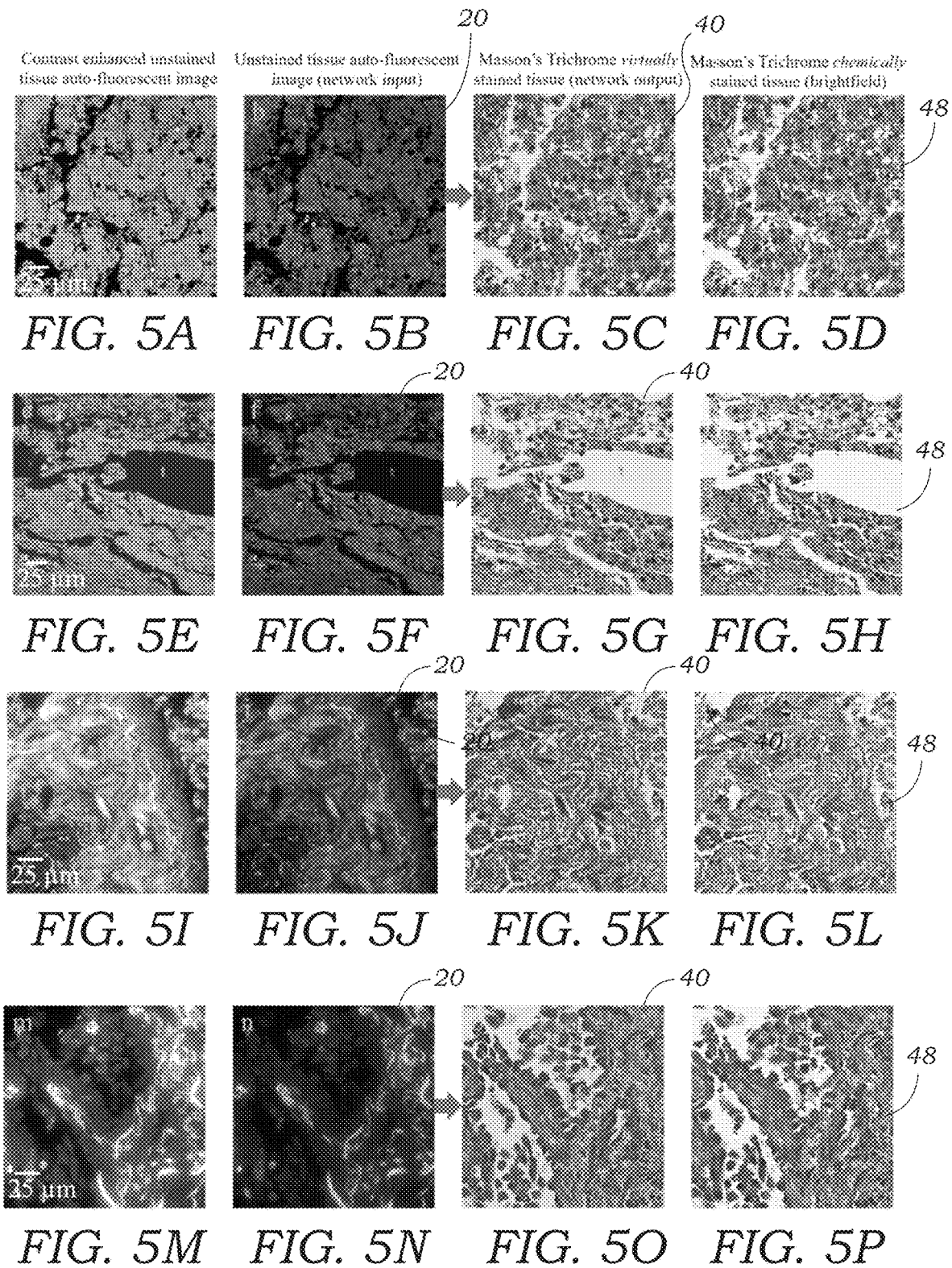

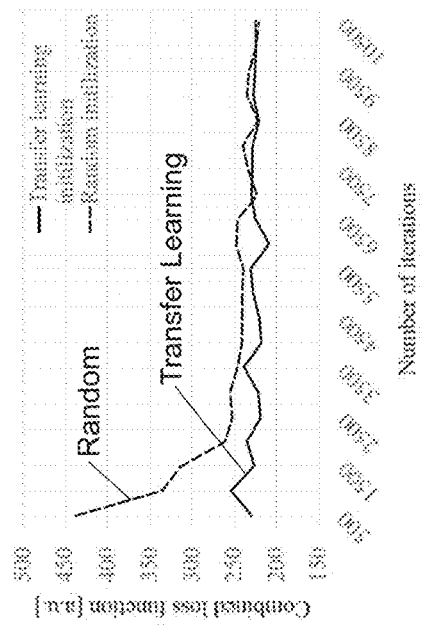
FIG. 6A
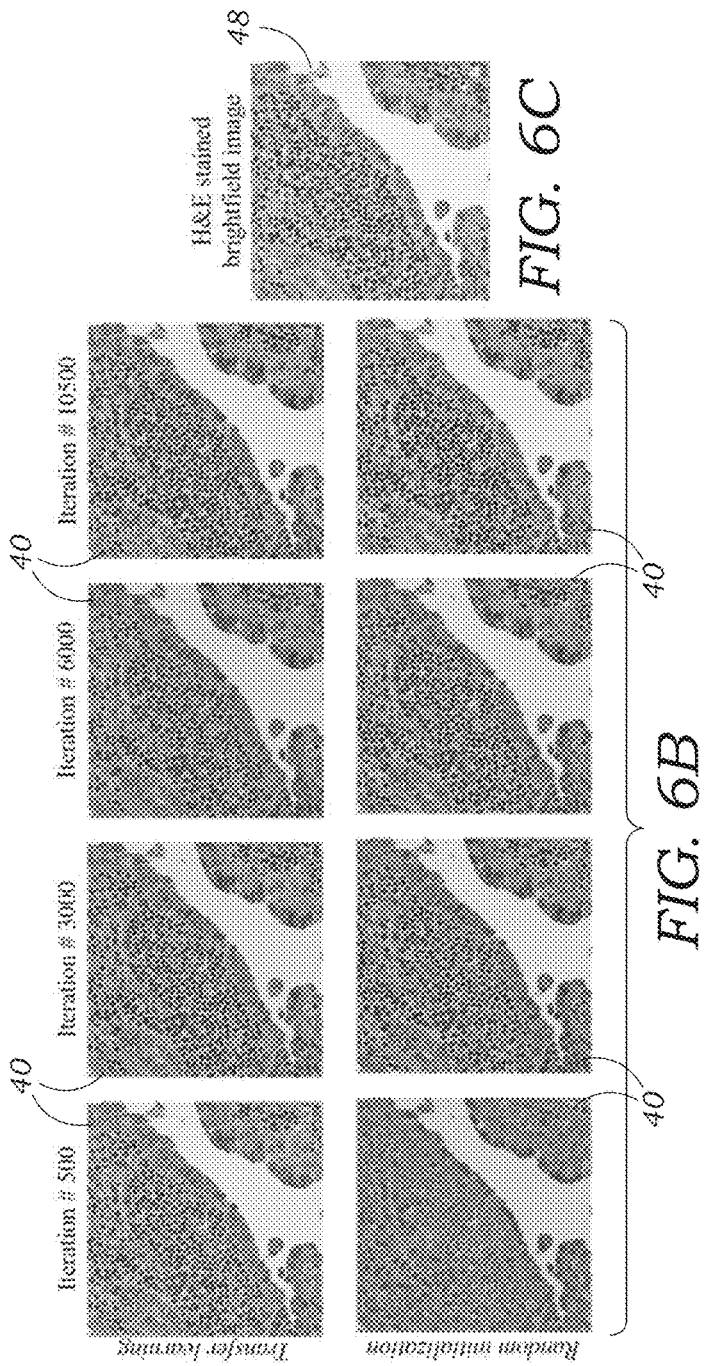
FIG. 6B
FIG. 6C

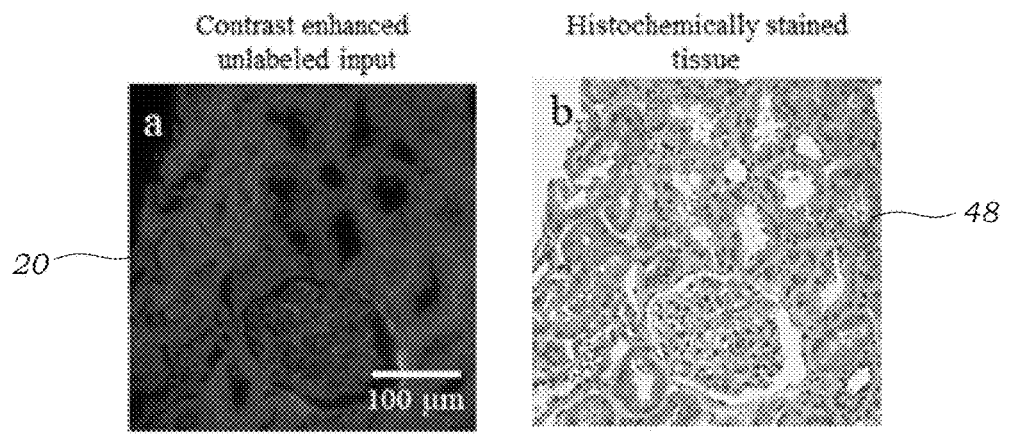
FIG. 18A  FIG. 18B
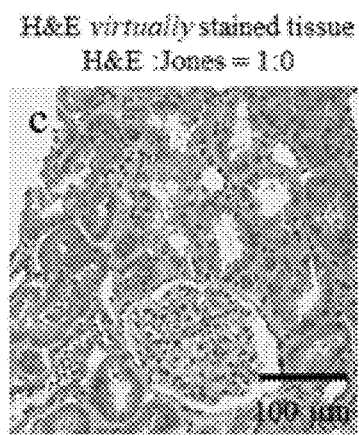 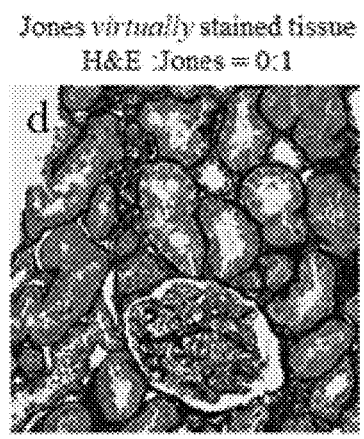
FIG. 18C  FIG. 18D
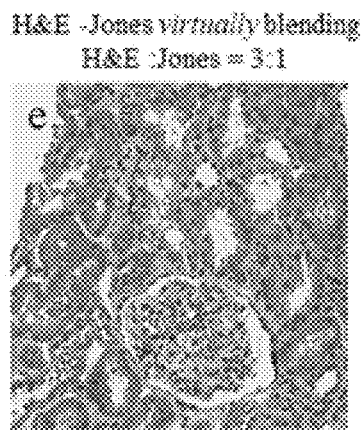 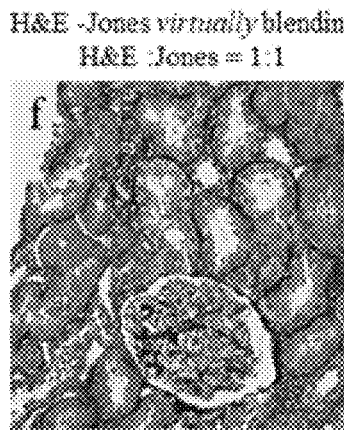 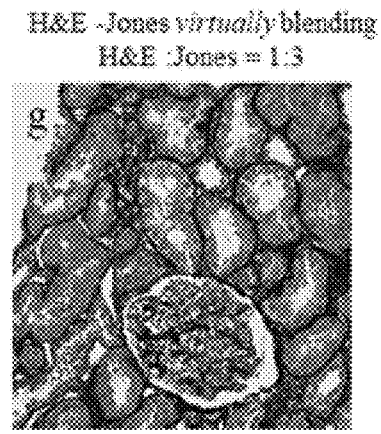
FIG. 18E  FIG. 18F  FIG. 18G

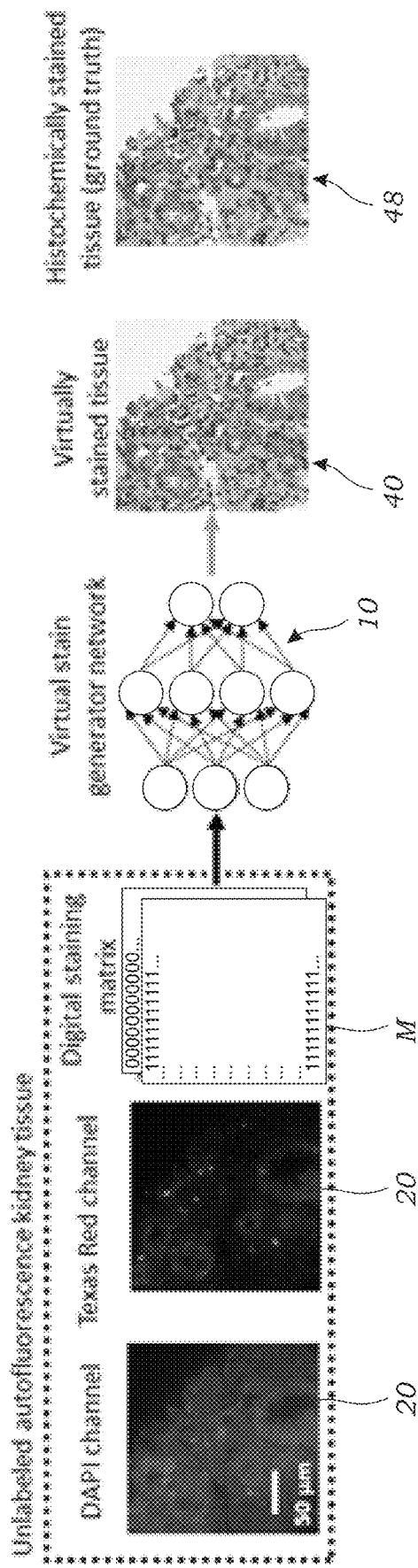
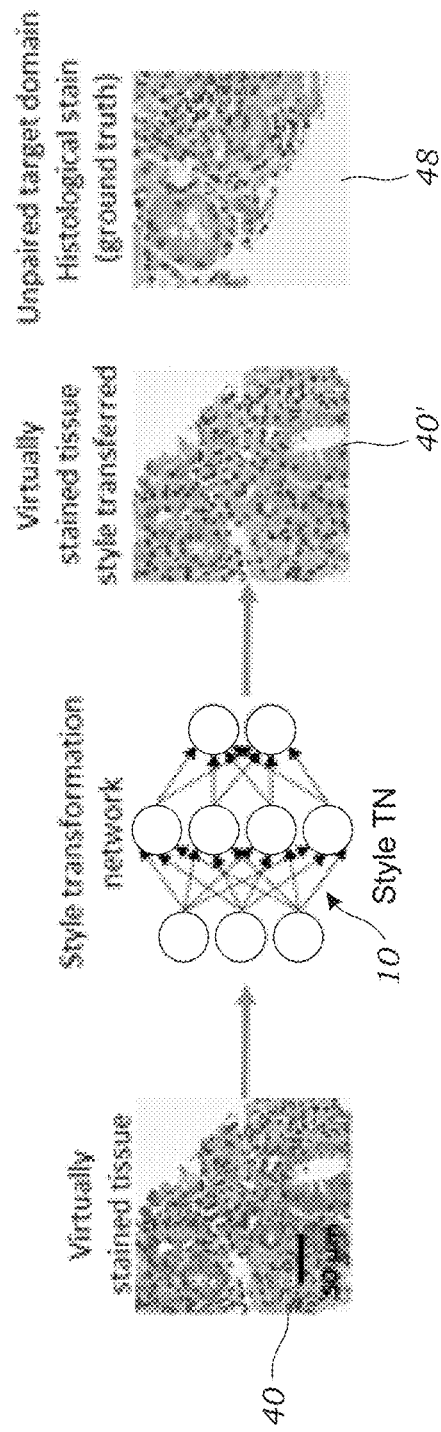
FIG. 20A
FIG. 20B

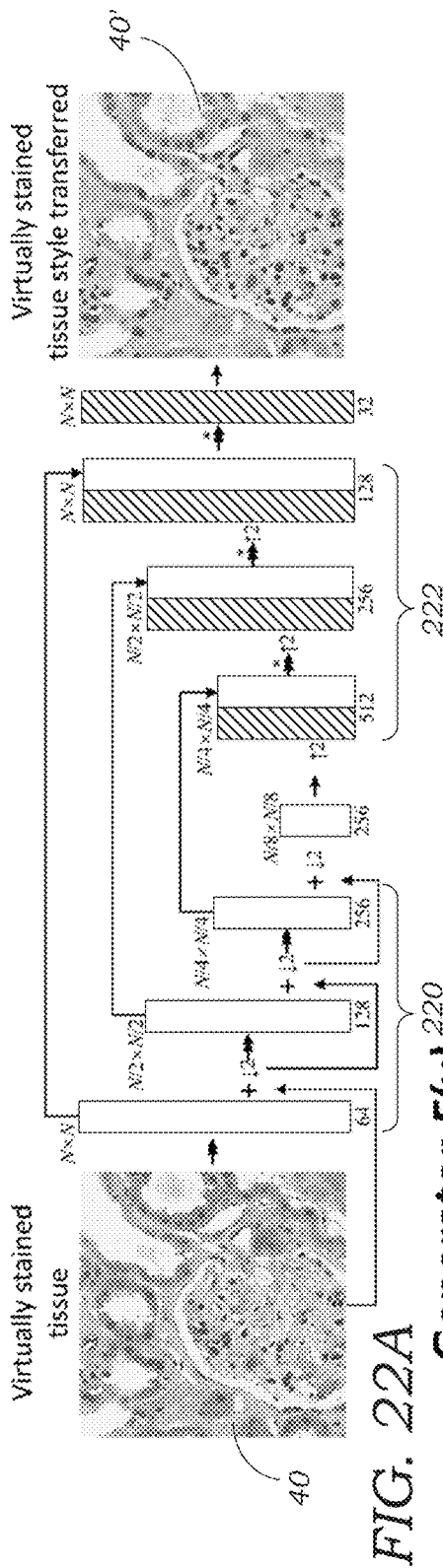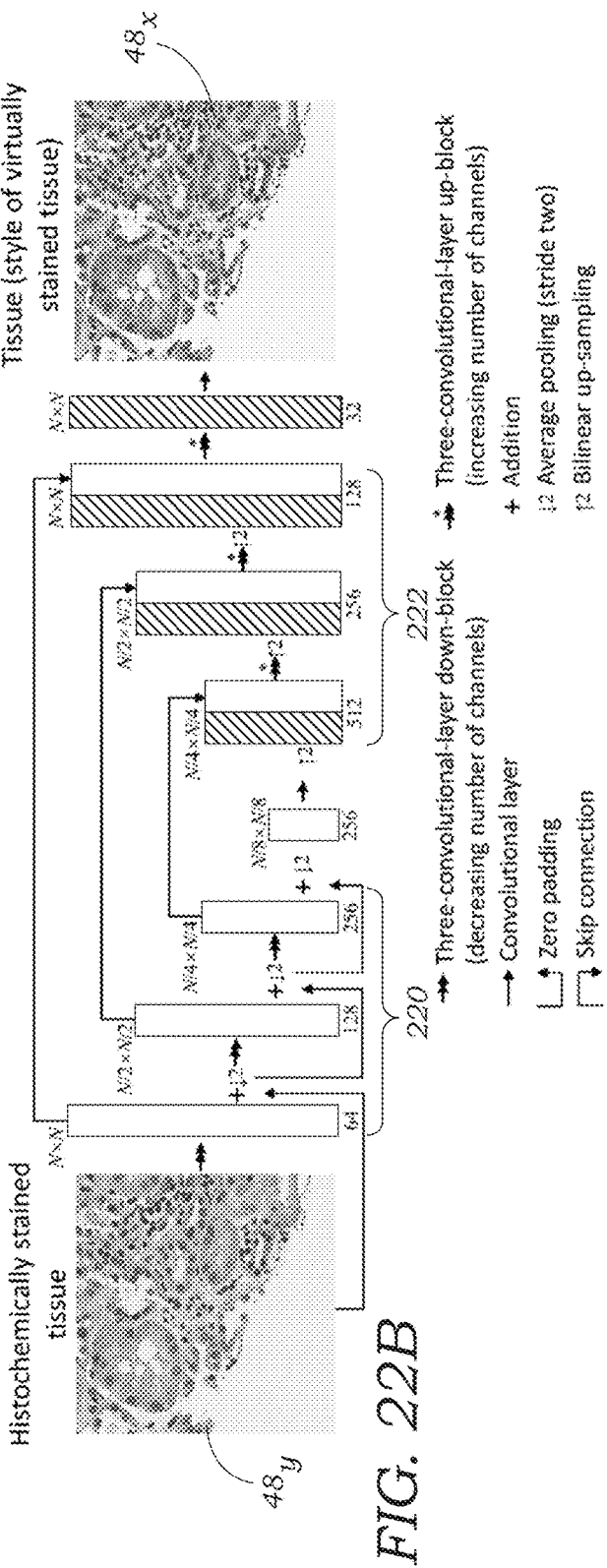
FIG. 22A
FIG. 22B

METHOD AND SYSTEM FOR DIGITAL STAINING OF MICROSCOPY IMAGES USING DEEP LEARNING

RELATED APPLICATIONS

This Application is a U.S. National Stage filing under 35 U.S.C. § 371 of International Application No. PCT/US2020/066708, filed on Dec. 22, 2020, which claims priority to U.S. Provisional Patent Application No. 63/058,329 filed on Jul. 29, 2020 and U.S. Provisional Patent Application No. 62/952,964 filed on Dec. 23, 2019, which are hereby incorporated by reference in their entirety. Priority is claimed pursuant to 35 U.S.C. §§ 119, 371 and any other applicable statute.

TECHNICAL FIELD

The technical field generally relates to methods and systems used to image unstained (i.e., label-free) tissue. In particular, the technical field relates to microscopy methods and systems that utilize deep neural network learning for digitally or virtually staining of images of unstained or unlabeled tissue. Deep learning in neural networks, a class of machine learning algorithms, are used to digitally stain images of label-free tissue sections into images that are equivalent to microscopy images of the same samples that are stained or labelled.

BACKGROUND

Microscopic imaging of tissue samples is a fundamental tool used for the diagnosis of various diseases and forms the workhorse of pathology and biological sciences. The clinically-established gold standard image of a tissue section is the result of a laborious process, which includes the tissue specimen being formalin-fixed paraffin-embedded (FFPE), sectioned to thin slices (typically ~2-10 µm), labeled/stained and mounted on a glass slide, which is then followed by its microscopic imaging using e.g., a brightfield microscope. All these steps use multiple reagents and introduce irreversible effects on the tissue. There have been recent efforts to change this workflow using different imaging modalities. Attempts have been made to imaged fresh, non-paraffin-embedded tissue samples using non-linear microscopy methods based on e.g., two-photon fluorescence, second harmonic generation, third-harmonic generation as well as Raman scattering. Other attempts have used a controllable super-continuum source to acquire multi-modal images for chemical analysis of fresh tissue samples. These methods require using ultra-fast lasers or super-continuum sources, which might not be readily available in most settings and require relatively long scanning times due to weaker optical signals. In addition to these, other microscopy methods for imaging non-sectioned tissue samples have also emerged by using UV-excitation on stained samples, or by taking advantage of the fluorescence emission of biological tissue at short wavelengths.

In fact, fluorescence signal creates some unique opportunities for imaging tissue samples by making use of the fluorescent light emitted from endogenous fluorophores. It has been demonstrated that such endogenous fluorescence signatures carry useful information that can be mapped to functional and structural properties of biological specimen and therefore have been used extensively for diagnostics and research purposes. One of the main focus areas of these efforts has been the spectroscopic investigation of the relationship between different biological molecules and their structural properties under different conditions. Some of these well-characterized biological constituents include vitamins (e.g., vitamin A, riboflavin, thiamin), collagen, coenzymes, fatty acids, among others.

While some of the above discussed techniques have unique capabilities to discriminate e.g., cell types and sub-cellular components in tissue samples using various contrast mechanisms, pathologists as well as tumor classification software are in general trained for examining "gold standard" stained tissue samples to make diagnostic decisions. Partially motivated by this, some of the above-mentioned techniques have been augmented to create pseudo-Hematoxylin and Eosin (H&E) images, which are based on a linear approximation that relates the fluorescence intensity of an image to the dye concentration per tissue volume, using empirically determined constants that represent the mean spectral response of various dyes embedded in the tissue. These methods also used exogenous staining to enhance the fluorescence signal contrast in order to create virtual H&E images of tissue samples.

SUMMARY

In one embodiment, a method of generating a virtually stained microscopic image of a sample includes providing a trained, deep neural network that is executed by image processing software using one or more processors of a computing device, wherein the trained, deep neural network is trained with a plurality of matched immunohistochemistry (IHC) stained microscopy images or image patches and their corresponding fluorescence lifetime (FLIM) microscopy images or image patches of the same sample(s) obtained prior to immunohistochemistry (IHC) staining. A fluorescence lifetime (FLIM) image of the sample is obtained using a fluorescence microscope and at least one excitation light source and the fluorescence lifetime (FLIM) image of the sample is input to the trained, deep neural network. The trained, deep neural network outputs the virtually stained microscopic image of the sample that is substantially equivalent to a corresponding image of the same sample that has been immunohistochemistry (IHC) stained.

In another embodiment, a method of virtually autofocusing microscopic images of a sample obtained with an incoherent microscope includes providing a trained, deep neural network that is executed by image processing software using one or more processors of a computing device, wherein the trained, deep neural network is trained with a plurality of pairs of out-of-focus and/or in-focus microscopy images or image patches that are used as input images to the deep neural network, and corresponding or matching in-focus microscopy images or image patches of the same sample(s) obtained with the incoherent microscope, which are used as ground truth images for training of the deep neural network. An out-of-focus or in-focus image of the sample is obtained using the incoherent microscope. The out-of-focus or in-focus image of the sample obtained from the incoherent microscope is then input to the trained, deep neural network. The trained, deep neural network outputs an output image having improved focus, substantially matching the in-focus image (ground truth) of the same sample acquired by the incoherent microscope.

In another embodiment, a method of generating a virtually stained microscopic image of a sample with an incoherent microscope includes providing a trained, deep neural network that is executed by image processing software using one or more processors of a computing device, wherein the trained, deep neural network is trained with a plurality of pairs of out-of-focus and/or in-focus microscopy images or image patches that are used as input images to the deep neural network and are all matched with corresponding in-focus microscopy images or image patches of the same sample(s) obtained with the incoherent microscope after a chemical staining process, which generate ground truth images for training of the deep neural network. An out-of-focus or in-focus image of the sample using the incoherent microscope is obtained and the out-of-focus or in-focus image of the sample obtained from the incoherent microscope is input to the trained, deep neural network. The trained, deep neural network outputs an output image of the sample having improved focus and virtually stained to substantially resemble and match a chemically stained and in-focus image of the same sample obtained by the incoherent microscope after the chemical staining process.

In another embodiment, a method of generating a virtually stained microscopic image of a sample includes providing a trained, deep neural network that is executed by image processing software using one or more processors of a computing device, wherein the trained, deep neural network is trained with a plurality of pairs of stained microscopy images or image patches that are either virtually stained by at least one algorithm or chemically stained to have a first stain type, and are all matched with the corresponding stained microscopy images or image patches of the same sample(s) that are either virtually stained by at least one algorithm or chemically stained to have another different stain type, which constitute ground truth images for training of the deep neural network to transform input images histochemically or virtually stained with the first stain type into output images that are virtually stained with the second stain type. A histochemically or virtually stained input image of the sample stained with the first stain type is obtained. The histochemically or virtually stained input image of the sample is input to the trained, deep neural network that transforms input images stained with the first stain type into output images virtually stained with the second stain type. The trained, deep neural network outputs an output image of the sample having virtual staining to substantially resemble and match a chemically stained image of the same sample stained with the second stain type obtained by an incoherent microscope after the chemical staining process.

In another embodiment, a method of generating a virtually stained microscopic image of a sample with multiple different stains using a single trained, deep neural network includes providing a trained, deep neural network that is executed by image processing software using one or more processors of a computing device, wherein the trained, deep neural network is trained with a plurality of matched chemically stained microscopy images or image patches using a plurality of chemical stains which are used as ground truth images for training of the deep neural network and their corresponding and matched fluorescence microscopy images or image patches of the same sample(s) obtained prior to chemical staining, which are used as input images for training of the deep neural network. A fluorescence image of the sample is obtained using a fluorescence microscope and at least one excitation light source. One or more class conditional matrices are applied to condition the trained, deep neural network. The fluorescence image of the sample is input to the trained deep neural network along with one or more class conditional matrices. The trained and conditioned deep neural network outputs the virtually stained microscopic image of the sample having one or more different stains, and wherein the output image or sub-regions thereof are substantially equivalent to corresponding microscopic images or image sub-regions of the same sample that is histochemically stained with the corresponding one or more different stains.

In another embodiment, a method of generating a virtually stained microscopic image of a sample with multiple different stains using a single trained, deep neural network includes providing a trained, deep neural network that is executed by image processing software using one or more processors of a computing device, wherein the trained, deep neural network is trained with a plurality of matched chemically stained microscopy images or image patches using a plurality of chemical stains and their corresponding microscopy images or image patches of the same sample(s) obtained prior to chemical staining. An input image of the sample is obtained using a microscope. One or more class conditional matrices are applied to condition to the trained, deep neural network. The input image of the sample is input to the trained deep neural network along with the one or more class conditional matrices. The trained and conditioned deep neural network outputs the virtually stained microscopic image of the sample having one or more different stains, and wherein the output image or sub-regions thereof are substantially equivalent to corresponding microscopic images or image sub-regions of the same sample that is histochemically stained with the corresponding one or more different stains.

In another embodiment, a method of generating a virtually de-stained microscopic image of a sample includes providing a first trained, deep neural network that is executed by image processing software using one or more processors of a computing device, wherein the first trained, deep neural network is trained with a plurality of matched chemically stained microscopy images or image patches, used as training input to the deep neural network, and their corresponding non-stained microscopy images or image patches of the same sample or samples obtained prior to chemical staining, which constitute the ground truth during training of the deep neural network. A microscopy image of the chemically stained sample is obtained using a microscope. The image of the chemically stained sample is input to the first trained, deep neural network. The first trained, deep neural network outputs the virtually de-stained microscopic image of the sample that is substantially equivalent to a corresponding image of the same sample obtained prior to or without any chemical staining.

BRIEF DESCRIPTION OF THE DRAWINGS

FIGS. 3A-3H illustrate digital/virtual staining results that match the chemically stained H&E samples. The first two (2) columns (FIGS. 3A and 3E) show the auto-fluorescence images of unstained salivary gland tissue sections (used as input to the deep neural network), and the third column (FIGS. 3C and 3G) shows the digital/virtual staining results. The last column (FIGS. 3D and 3H) shows the brightfield images of the same tissue sections, after the histochemical staining process. Evaluation of both FIG. 3C and FIG. 3D demonstrates a small island of infiltrating tumor cells within subcutaneous fibro-adipose tissue. Note that the nuclear detail, including distinction of nucleoli (arrows in 3C and 3D) and chromatin texture, is clearly appreciated in both panels. Similarly, in FIGS. 3G and 3H the H&E stains demonstrate infiltrating squamous cell carcinoma. The desmoplastic reaction with edematous myxoid change (asterisk in FIGS. 3G and 3H) in the adjacent stroma is clearly identifiable in both stains/panels.

FIGS. 4A-4H illustrate digital/virtual staining results to match the chemically stained Jones samples. The first two (2) columns (FIGS. 4A, 4E) show the auto-fluorescence images of unstained kidney tissue sections (used as input to the deep neural network), and the third column (FIGS. 4C and 4G), shows the digital/virtual staining results. The last column (FIGS. 4D, 4H) shows the brightfield images of the same tissue sections, after the histochemical staining process.

FIGS. 5A-5P illustrate digital/virtual staining results to match the Masson's Trichrome stain for liver and lung tissue sections. The first two (2) columns show the auto-fluorescence images of an unstained liver tissue section (rows 1 and 2—FIGS. 5A, 5B, 5E, 5F) and an unstained lung tissue section (rows 3 and 4—FIGS. 5I, 5J, 5M, 5N), used as input to the deep neural network. The third column (FIGS. 5C, 5G, 5K, 5O) shows the digital/virtual staining results for these tissue samples. The last column (FIGS. 5D, 5H, 5L, 5P) shows the brightfield images of the same tissue sections, after the histochemical staining process.

FIG. 6A illustrates a graph of combined loss function vs. number of iterations for random initialization and transfer learning initialization. FIG. 6A illustrates how superior convergence is achieved using transfer learning. A new deep neural network is initialized using the weights and biases learned from the salivary gland tissue sections to achieve virtual staining of thyroid tissue with H&E. Compared to random initialization, transfer learning enables much faster convergence, also achieving a lower local minimum.

FIG. 6B illustrates network output images at different stages of the learning process for both random initialization and transfer learning to better illustrate the impact of the transfer learning to translate the presented approach to new tissue/stain combinations.

FIG. 6C illustrates the corresponding H&E chemically stained brightfield image.

FIGS. 18A-18G illustrates example of stain blending. FIG. 18A illustrates the autofluorescence image used as the input to the machine learning algorithm. FIG. 18B illustrates a co-registered image of the histochemically stained H&E tissue for comparison. FIG. 18C illustrates kidney tissue virtually stained with H&E (no Jones). FIG. 18D illustrates kidney tissue virtually stained with Jones stain (no H&E). FIG. 18E illustrates kidney tissue virtually stained with an input class condition ratio of 3:1 of H&E:Jones stains. FIG. 18F illustrates kidney tissue virtually stained with an input class condition ratio of 1:1 of H&E:Jones stains. FIG. 18G illustrates kidney tissue virtually stained with an input class condition ratio of 1:3 of H&E:Jones stains.

FIG. 20A illustrates a virtual staining network which can generate both H&E and special stain images.

FIG. 20B illustrates one embodiment of style transfer network (e.g., CycleGan network) used to transfer a style to a virtually and/or histochemically stained image.

FIG. 22A illustrates structure of a first generator network G(x) used for style transformation.

FIG. 22B illustrates structure of the second generator network F(y) used for style transformation.

DETAILED DESCRIPTION OF THE ILLUSTRATED EMBODIMENTS

Figure 1:
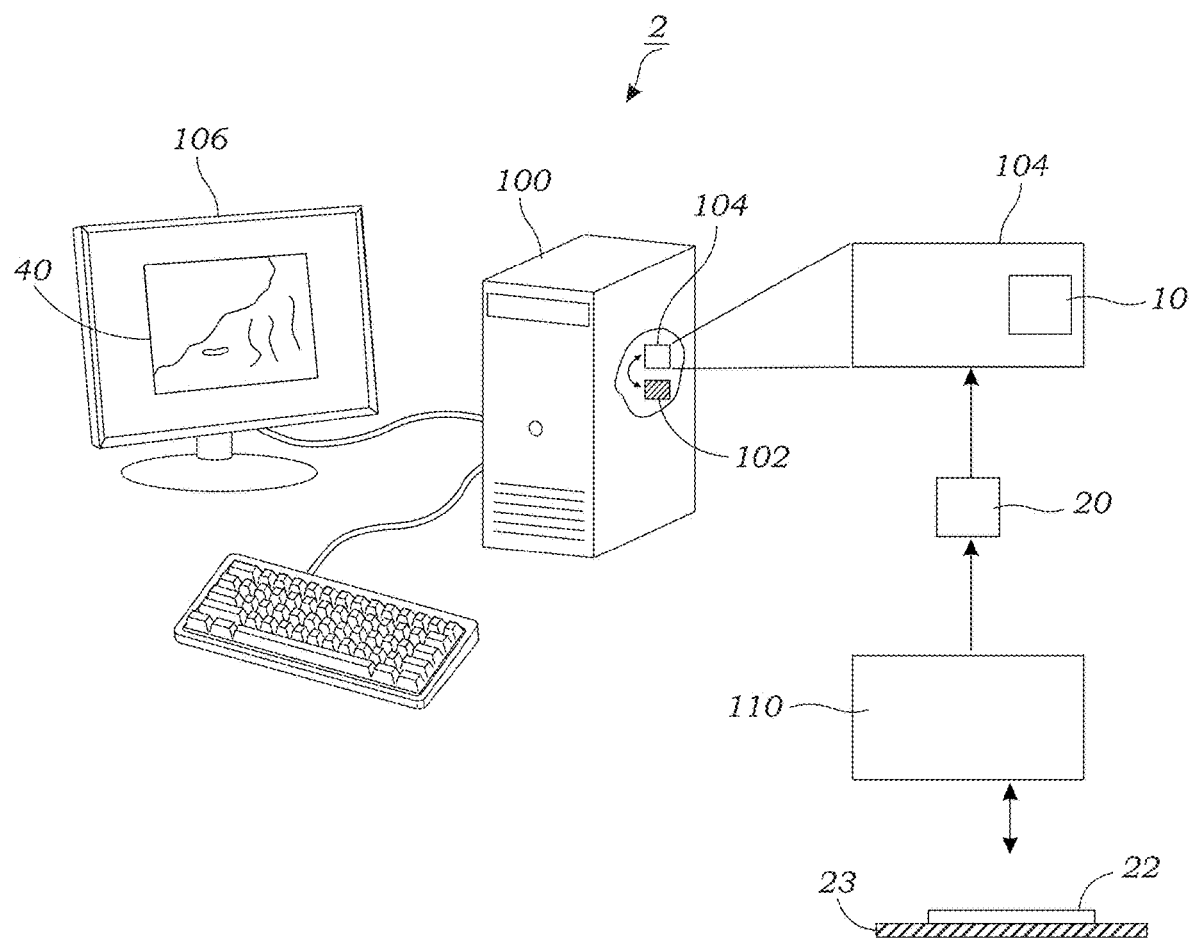
FIG. 1 schematically illustrates a system that is used to generate a digitally/virtually stained output image of a sample from an unstained microscope image of the sample according to one embodiment.

FIG. 1 schematically illustrates one embodiment of a system 2 for outputting digitally stained images 40 from an input microscope image 20 of a sample 22. As explained herein, the input image 20 is a fluorescence image 20 of a sample 22 (such as tissue in one embodiment) that is not stained or labeled with a fluorescent stain or label. Namely, the input image 20 is an autofluorescence image 20 of the sample 22 in which the fluorescent light that is emitted by the sample 22 is the result of one or more endogenous fluorophores or other endogenous emitters of frequency-shifted light contained therein. Frequency-shifted light is light that is emitted at a different frequency (or wavelength) that differs from the incident frequency (or wavelength). Endogenous fluorophores or endogenous emitters of frequency-shifted light may include molecules, compounds, complexes, molecular species, biomolecules, pigments, tissues, and the like. In some embodiments, the input image 20 (e.g., the raw fluorescent image) is subject to one or more linear or non-linear pre-processing operations selected from contrast enhancement, contrast reversal, image filtering. The system includes a computing device 100 that contains one or more processors 102 therein and image processing software 104 that incorporates the trained, deep neural network 10 (e.g., a convolutional neural network as explained herein in one or more embodiments). The computing device 100 may include, as explained herein, a personal computer, laptop, mobile computing device, remote server, or the like, although other computing devices may be used (e.g., devices that incorporate one or more graphic processing units (GPUs)) or other application specific integrated circuits (ASICs). GPUs or ASICs can be used to accelerate training as well as final image output. The computing device 100 may be associated with or connected to a monitor or display 106 that is used to display the digitally stained images 40. The display 106 may be used to display a Graphical User Interface (GUI) that is used by the user to display and view the digitally stained images 40. In one embodiment, the user may be able to trigger or toggle manually between multiple different digital/virtual stains for a particular sample 22 using, for example, the GUI. Alternatively, the triggering or toggling between different stains may be done automatically by the computing device 100. In one preferred embodiment, the trained, deep neural network 10 is a Convolution Neural Network (CNN).

For example, in one preferred embodiment as is described herein, the trained, deep neural network 10 is trained using a GAN model. In a GAN-trained deep neural network 10, two models are used for training. A generative model is used that captures data distribution while a second model estimates the probability that a sample came from the training data rather than from the generative model. Details regarding GAN may be found in Goodfellow et al., Generative Adversarial Nets., Advances in Neural Information Processing Systems, 27, pp. 2672-2680 (2014), which is incorporated by reference herein. Network training of the deep neural network 10 (e.g., GAN) may be performed the same or different computing device 100. For example, in one embodiment a personal computer may be used to train the GAN although such training may take a considerable amount of time. To accelerate this training process, one or more dedicated GPUs may be used for training. As explained herein, such training and testing was performed on GPUs obtained from a commercially available graphics card. Once the deep neural network 10 has been trained, the deep neural network 10 may be used or executed on a different computing device 110 which may include one with less computational resources used for the training process (although GPUs may also be integrated into execution of the trained deep neural network 10).

The image processing software 104 can be implemented using Python and TensorFlow although other software packages and platforms may be used. The trained deep neural network 10 is not limited to a particular software platform or programming language and the trained deep neural network 10 may be executed using any number of commercially available software languages or platforms. The image processing software 104 that incorporates or runs in coordination with the trained, deep neural network 10 may be run in a local environment or a remove cloud-type environment. In some embodiments, some functionality of the image processing software 104 may run in one particular language or platform (e.g., image normalization) while the trained deep neural network 10 may run in another particular language or platform. Nonetheless, both operations are carried out by image processing software 104.

As seen in FIG. 1, in one embodiment, the trained, deep neural network 10 receives a single fluorescence image 20 of an unlabeled sample 22. In other embodiments, for example, where multiple excitation channels are used (see melanin discussion herein), there may be multiple fluorescence images 20 of the unlabeled sample 22 that are input to the trained, deep neural network 10 (e.g., one image per channel). The fluorescence images 20 may include a wide-field fluorescence image 20 of an unlabeled tissue sample 22. Wide-field is meant to indicate that a wide field-of-view (FOV) is obtained by scanning of a smaller FOV, with the wide FOV being in the size range of 10-2,000 $mm^2$. For example, smaller FOVs may be obtained by a scanning fluorescent microscope 110 that uses image processing software 104 to digitally stitch the smaller FOVs together to create a wider FOV. Wide FOVs, for example, can be used to obtain whole slide images (WSI) of the sample 22. The fluorescence image is obtained using an imaging device 110. For the fluorescent embodiments described herein, this may include a fluorescence microscope 110. The fluorescent microscope 110 includes at least one excitation light source that illuminates the sample 22 as well as one or more image sensor(s) (e.g., CMOS image sensors) for capturing fluorescent light that is emitted by fluorophores or other endogenous emitters of frequency-shifted light contained in the sample 22. The fluorescence microscope 110 may, in some embodiments, include the ability to illuminate the sample 22 with excitation light at multiple different wavelengths or wavelength ranges/bands. This may be accomplished using multiple different light sources and/or different filter sets (e.g., standard UV or near-UV excitation/emission filter sets). In addition, the fluorescence microscope 110 may include, in some embodiments, multiple filter sets that can filter different emission bands. For example, in some embodiments, multiple fluorescence images 20 may be captured, each captured at a different emission band using a different filter set.

The sample 22 may include, in some embodiments, a portion of tissue that is disposed on or in a substrate 23. The substrate 23 may include an optically transparent substrate in some embodiments (e.g., a glass or plastic slide or the like). The sample 22 may include a tissue sections that are cut into thin sections using a microtome device or the like. Thin sections of tissue 22 can be considered a weakly scattering phase object, having limited amplitude contrast modulation under brightfield illumination. The sample 22 may be imaged with or without a cover glass/cover slip. The sample may involve frozen sections or paraffin (wax) sections. The tissue sample 22 may be fixed (e.g., using formalin) or unfixed. The tissue sample 22 may include mammalian (e.g., human or animal) tissue or plant tissue. The sample 22 may also include other biological samples, environmental samples, and the like. Examples include particles, cells, cell organelles, pathogens, parasites, fungi, or other micro-scale objects of interest (those with micrometer-sized dimensions or smaller). The sample 22 may include smears of biological fluids or tissue. These include, for instance, blood smears, Papanicolaou or Pap smears. As explained herein, for the fluorescent-based embodiments, the sample 22 includes one or more naturally occurring or endogenous fluorophores that fluoresce and are captured by the fluorescent microscope device 110. Most plant and animal tissues show some autofluorescence when excited with ultraviolet or near ultra-violet light. Endogenous fluorophores may include by way of illustration proteins such as collagen, elastin, fatty acids, vitamins, flavins, porphyrins, lipofuscins, co-enzymes (e.g., NAD(P)H). In some optional embodiments, exogenously added fluorescent labels or other exogenous emitters of light may also be added (for training of the deep neural network 10 or for testing of new sample 12 or both). As explained herein, the sample 22 may also contain other endogenous emitters of frequency-shifted light.

The trained, deep neural network 10 in response to the input image 20 outputs or generates a digitally stained or labelled output image 40. The digitally stained output image 40 has "staining" that has been digitally integrated into the stained output image 40 using the trained, deep neural network 10. In some embodiments, such as those involved tissue sections, the trained, deep neural network 10 appears to a skilled observer (e.g., a trained histopathologist) to be substantially equivalent to a corresponding brightfield image of the same tissue section sample 22 that has been chemically stained. Indeed, as explained herein, the experimental results obtained using the trained, deep neural network 10 show that trained pathologists were able to recognize histopathologic features with both staining techniques (chemically stained vs. digitally/virtually stained) and with a high degree of agreement between the techniques, without a clear preferable staining technique (virtual vs. histological). This digital or virtual staining of the tissue section sample 22 appears just like the tissue section sample 22 had undergone histochemical staining even though no such staining operation was conducted.

Figure 2:
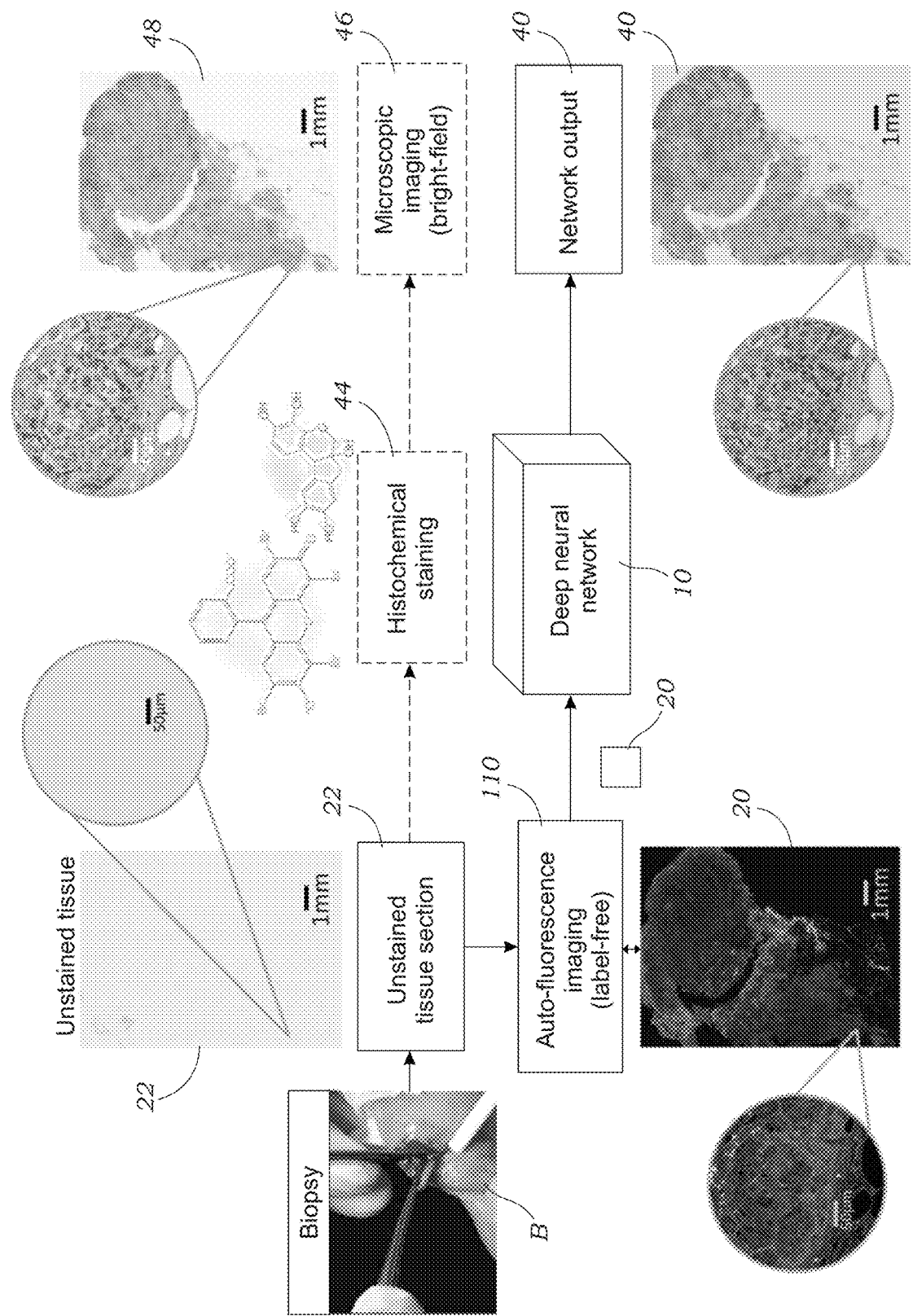
FIG. 2 illustrates a schematic representation of the deep learning-based digital/virtual histology staining operations using a fluorescence image of unstained tissue.

FIG. 2 schematically illustrates the operations involved in a typical fluorescent-based embodiment. As seen in FIG. 2, a sample 22 such as an unstained tissue section is obtained. This may be obtained from living tissue such as through a biopsy B or the like. The unstained tissue section sample 22 is then subject to fluorescent imaging using a fluorescence microscope 110 and generates a fluorescence image 20. This fluorescence image 20 is then input to a trained, deep neural network 10 that then promptly outputs a digitally stained image 40 of the tissue section sample 22. This digitally stained image 40 closely resembles the appearance of a brightfield image of the same tissue section sample 22 had the actual tissue section sample 22 be subject to histochemical staining. FIG. 2 illustrates (using dashed arrows) the conventional process whereby the tissue section sample 22 is subject to histochemical or immunohistochemistry (IHC) staining 44 followed by conventional brightfield microscopic imaging 46 to generate a conventional brightfield image 48 of the stained tissue section sample 22. As seen in FIG. 2, the digitally stained image 40 closely resembles the actual chemically stained image 48. Similar resolution and color profiles are obtained using the digital staining platform described herein. This digitally stained image 40 may, as illustrated in FIG. 1, be shown or displayed on a computer monitor 106 but it should be appreciated the digitally stained image 40 may be displayed on any suitable display (e.g., computer monitor, tablet computer, mobile computing device, mobile phone, etc.). A GUI may be displayed on the computer monitor 106 so that the user may view and optionally interact with the digitally stained image 40 (e.g., zoom, cut, highlight, mark, adjust exposure, and the like).

In one embodiment, the fluorescence microscope 110, obtains a fluorescence lifetime image of an unstained tissue sample 22 and outputs an image 40 that well matches a bright-field image 48 of the same field-of-view after IHC staining. Fluorescence lifetime imaging (FLIM) produces an image based on the differences in the excited state decay rate from a fluorescent sample. Thus, FLIM is a fluorescence imaging technique where the contrast is based on the lifetime or decay of individual fluorophores. The fluorescence lifetime is generally defined as the average time that a molecule or fluorophore remains in an excited state prior to returning to the ground state by emitting a photon. Among all the intrinsic properties of unlabeled tissue samples, fluorescent lifetime of endogenous fluorophore(s) is one of the most informative channels that measures the time a fluorophore stays in excited stated before returning to ground state.

It is well-known that the lifetime of endogenous fluorescence emitters, e.g., flavin adenine dinucleotide (FAD) and nicotinamide adenine dinucleotide (NAD+ or NADH), are dependent of the immersion chemical environment such as the abundance of oxygen, therefore, indicates physiobiological changes inside the tissue that are not obvious in brightfield or fluorescence microscopy. Although existing literature has confirmed the close correlation between lifetime changes between benign and cancer tissues, there lacks a cross-modality image transformation method that enables pathologists or computer software to perform disease diagnosis to unlabeled tissues based on the color contrast they were trained with. In this embodiment of the invention, machine learning algorithm (i.e., the trained deep neural network 10) that enables virtual IHC staining of unstained tissue samples 22 based on fluorescence lifetime imaging. Using this method, the laborious and time consuming IHC staining procedure can be substituted with a virtual staining, which will be significantly faster and provide will allow tissue preservation for further analysis.

Figure 11A:
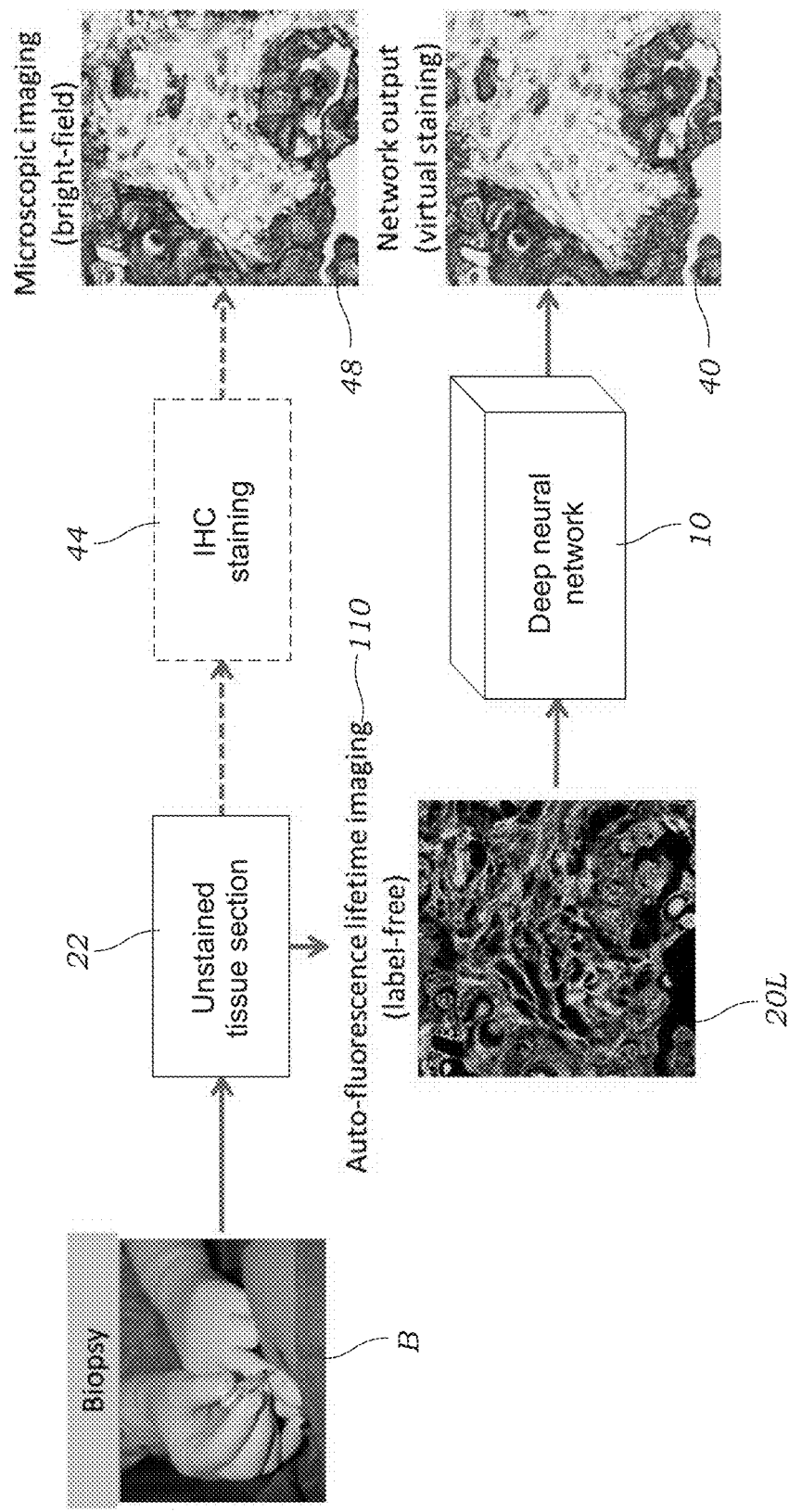
FIG. 11A illustrates a machine learning-based virtual IHC staining using auto-fluorescence and fluorescence lifetime images of unstained tissue. Following its training using a deep neural network model, the trained, deep neural network rapidly outputs a virtually stained tissue image, in response to an auto-fluorescence lifetime image of an unstained tissue section, bypassing the standard IHC staining procedure used in histology.
Figure 11B:
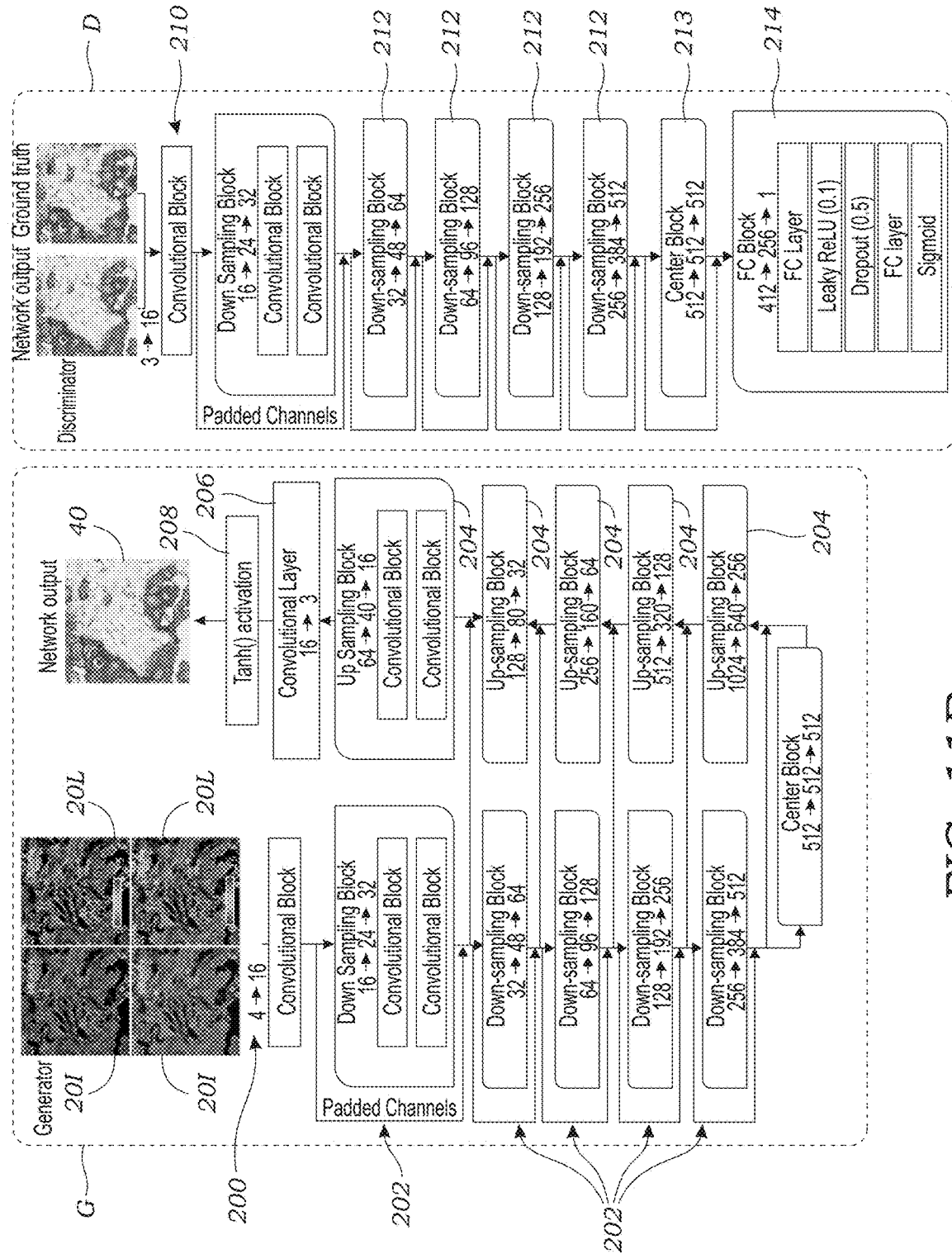
FIG. 11B illustrates the generative adversarial network (GAN) architecture for the generator (G) and discriminator (D) used in fluorescence lifetime imaging (FLIM) according to one embodiment.

The trained neural network 10 is trained, in one embodiment, using lifetime (e.g., decay time) fluorescence images 20 of unstained sample 22, with a paired ground truth image 48, which is the bright-field image of the same field of view after IHC staining. The trained neural network 10 may also be trained, in another embodiment, using a combination of lifetime fluorescence images 20 and fluorescence intensity images 20. Once the neural network 10 has converged (i.e., it is trained), it can be used for the blind inference of new lifetime images 20 from unstained tissue samples 22 and transform or output them to the equivalence of bright-field images 40 of after staining, without any parameter tuning, as illustrated in FIGS. 11A and 11B.

Figure 12:
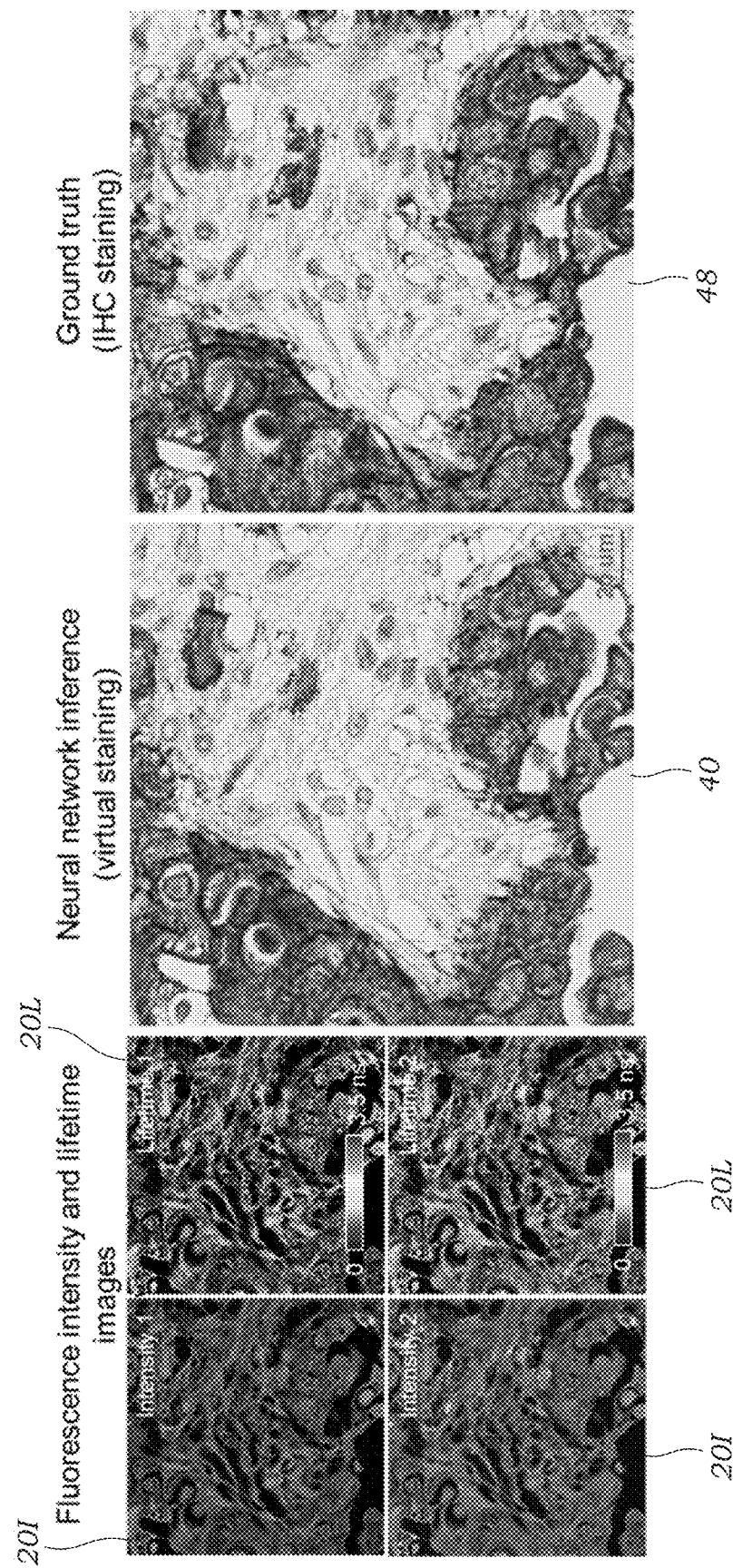
FIG. 12 illustrates digital/virtual staining results to match the HER2 stain. The two leftmost columns show the auto-fluorescence intensity (first column) and lifetime images (second column) of unstained human breast tissue sections (used as input to the deep neural network 10) for two excitation wavelengths, and the middle column shows the virtual staining results (virtual staining). The last column shows the bright-field images of the same tissue sections, after the IHC staining process (IHC staining).

To train the artificial neural network 10, a generative adversarial network (GAN) framework was used to perform virtual staining. The training dataset is composed autofluorescence (endogenous fluorophores) lifetime images 20 of multiple tissue sections 22, for single or multiple excitation and emission wavelengths. The samples 22 are scanned by a standard fluorescence microscope 110 with photon counting capability, that outputs the fluorescence intensity image 20I and lifetime image 20L at each field of view. The tissue samples 22 were also sent to a pathology lab for IHC staining and scanned by a bright-field microscope which was used to generate the ground truth training images 48. The fluorescence lifetime images 20L and the bright-field images 48 of the same field-of-view are paired. The training dataset is composed from thousands of such pairs 20L, 48, which are used as input and output for the training of the network 10, respectively. Typically, an artificial neural network model 10 converges after ~30 hours on two Nvidia 1080Ti GPUs. Once the neural network 10 converges, the method enables virtual IHC staining of unlabeled tissue section 22 in real time performance, as shown in FIG. 12. Note that deep neural network 10 may be trained with fluorescence lifetime images 20L and fluorescence intensity images 20I. This is illustrated in FIG. 11B.

In another embodiment, a trained, deep neural network 10a is provided that takes an aberrated and/or out-of-focus input image 20 and then outputs a corrected image 20a that substantially matches a focused image of the same field-of-view. A critical step for high-quality and rapid microscopy imaging of e.g., tissue samples 22 is autofocusing. Conventionally, autofocusing is performed using a combination of optical and algorithmic methods. These methods are time consuming, as they image the specimen 22 at multiple focusing depths. Ever-growing demand for higher throughput microscopy, entail more assumptions that are made on the specimen's profile. In other words, one sacrifices the accuracy that is usually obtained by the multiple focal depths acquisition, with the assumption that in adjacent field-of-view, the specimen's profile is uniform. This type of assumption often results image focusing errors. These errors might require the reimaging of the specimen, which is not always possible, for example, in life science experiments. In digital pathology, for example, such focusing errors might prolong the diagnosis of a patient's disease.

In this particular embodiment, post-imaging computational autofocusing is performed using a trained, deep neural network 10a for incoherent imaging modalities. Thus, it may be used in connection with images obtained by fluorescence microscopy (e.g., fluorescent microscope) as well as other imaging modalities. Examples include a fluorescence microscope, a widefield microscope, a super-resolution microscope, a confocal microscope, a confocal microscope with single photon or multi-photon excited fluorescence, a second harmonic or high harmonic generation fluorescence microscope, a light-sheet microscope, a FLIM microscope, a brightfield microscope, a darkfield microscope, a structured illumination microscope, a total internal reflection microscope, a computational microscope, a ptychographic microscope, a synthetic aperture-based microscope, or a phase contrast microscope. In some embodiments, the output of the trained, deep neural network 10a generates a modified input image 20a that is focused or more focused than the raw input image 20. This modified input image 20a with improved focus is then input into a separate trained, deep neural network 10 described herein that transforms from a first image modality to a second image modality (e.g., fluorescence microscopy to brightfield microscopy). In this regard, the trained, deep neural networks 10a, 10 are coupled together in a "daisy chain" configuration with the output of the trained, autofocusing neural network 10a being the input to the trained, deep neural network 10 for digital/virtual staining. In another embodiment, the machine learning algorithm that is used for the trained, deep neural network 10 combines the functionality of autofocusing with that functionality described herein of transforming images from one microscope modality to another. In this latter embodiment, there is no need for two separate trained, deep neural networks. Instead, a single trained, deep neural network 10a is provided that performs virtual autofocusing as well as digital/virtual staining. The functionality of both networks 10, 10a are combined into a single network 10a. This deep neural network 10a follows the architecture(s) as described herein.

Regardless of whether the method is implemented in a single trained, deep neural network 10a or multiple trained, deep neural network 10, 10a, one can generate virtually stained images 40 even with out-of-focus input images 20 and increase the scanning speed of imaging samples 22. The deep neural network 10a is trained using images obtained at different focal depths, while the output (which is the input image 20 or the virtually stained image 40 depending on the implementation) is the focused image of the same field of view. The images used for the training are acquired with a standard optical microscope. For training of the deep neural network 10a a "gold standard" or "ground truth" image is paired with various out-of-focused or aberrated images. The gold standard/ground truth image that is used for training may include a focused image of the sample 22 that, for example, may be identified by any number of focusing criteria (e.g., sharp edges or other features). The "gold standard" image may also include an extended depth of field image (EDOF) that is a composite focused image based on multiple images that provides a focused view over a larger depth of field. For training of the deep neural network 10a, some of the training images may themselves be in-focus images. Combinations of out-of-focus and in-focus images may be used to train the deep neural network 10a.

Figure 13:
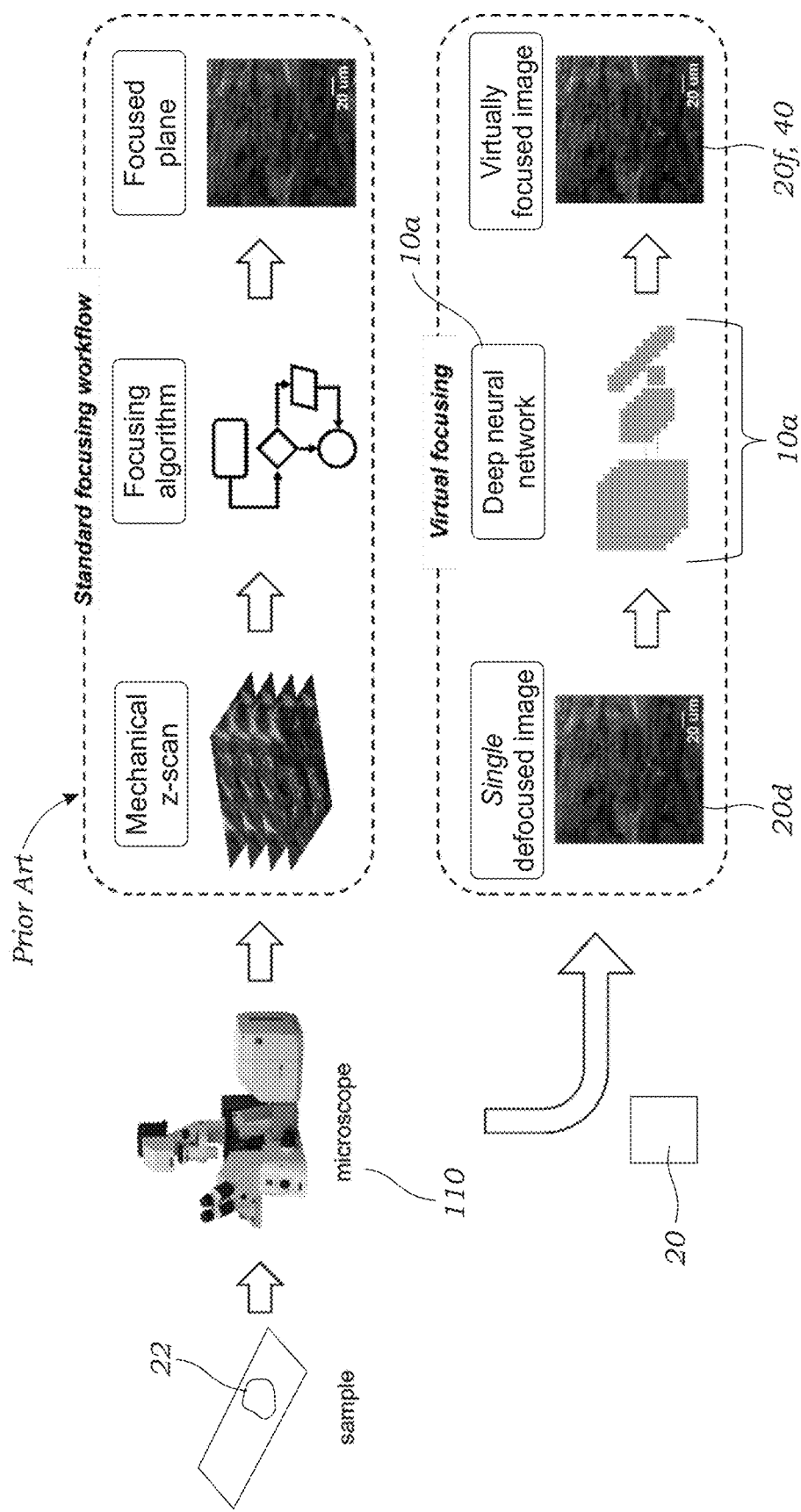
FIG. 13 illustrates a comparison of standard (prior art) autofocusing methods the virtual focusing method disclosed herein. Top-right: The standard auto-focusing methods require the acquisition of multiple images, to be used with the autofocusing algorithm, which selects the most in focus image, according to a pre-defined criterion. In contrast, the disclosed method, requires only a single aberrated image to virtually refocus it, using a trained deep neural network.

Following the conclusion of the training phase, the deep neural network 10a can be used to refocus aberrated images from a single defocused image, as demonstrated in FIG. 13, in contrast to standard autofocusing techniques, which require the acquisition of multiple images through multiple depth planes. As seen in FIG. 13 a single defocused image 20d obtained from the microscope 110 is input to the trained, deep neural network 10a and a focused image 20f is generated. This focused image 20f can then be input into the trained, deep neural network 10, in one embodiment as explained herein. Alternatively, the functions of the deep neural networks 10 (virtual staining) may be combined with the autofocusing functionality into a single deep neural network 10a.

To train the deep neural network 10a, a Generative Adversarial Network (GAN) may be used to perform the virtual focusing. The training dataset is composed of autofluorescence (endogenous fluorophores) images of multiple tissue sections, for multiple excitation and emission wavelengths. In another embodiment, the training images can be other microscope modalities (e.g., brightfield microscope, a super-resolution microscope, a confocal microscope, a light-sheet microscope, a FLIM microscope, a widefield microscope, a darkfield microscope, a structured illumination microscope, a computational microscope, a ptychographic microscope, a synthetic aperture-based microscope, or a total internal reflection microscope, and a phase contrast microscope).

Figure 14:
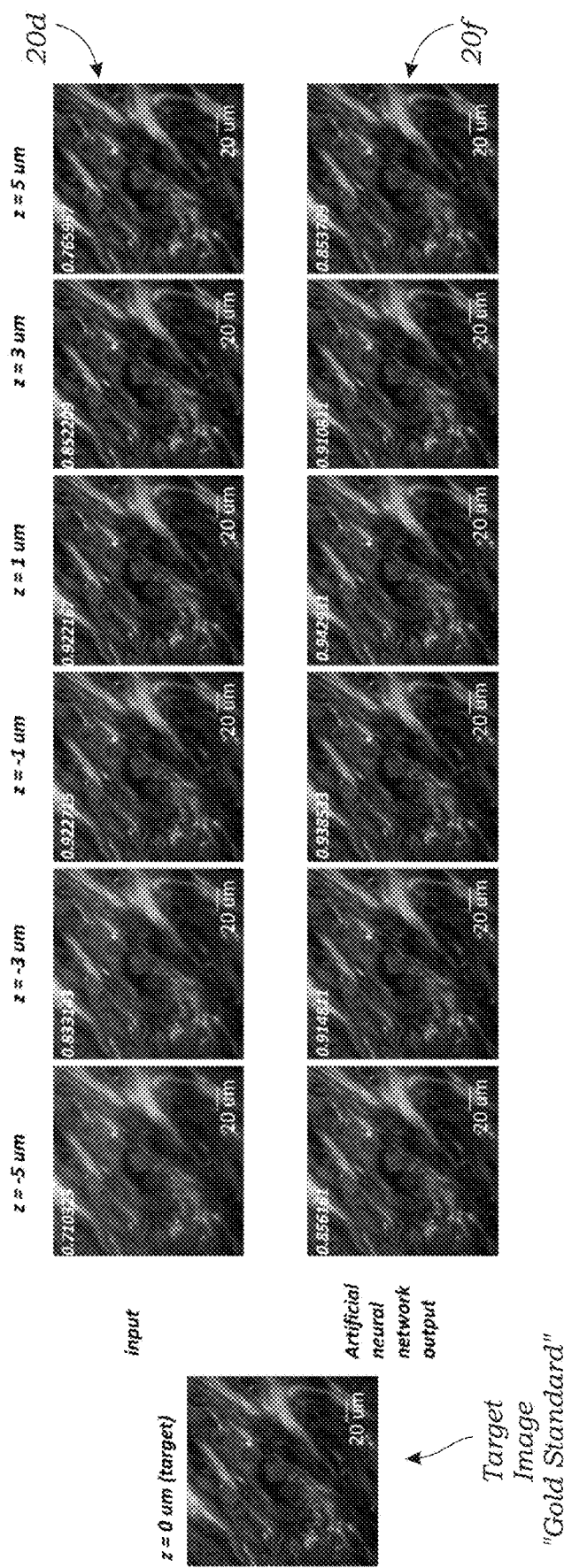
FIG. 14 illustrates a demonstration of the refocusing capability of the post imaging computational autofocusing method for various imaging planes of the samples, where the value of z signifies the focal distance from the focused plane, which resides in z=0 (as a reference plane). The refocusing capability of the network can be assessed both qualitatively and quantitatively, using the structural similarity index, which appears on the upper left corner of every panel, and compares that image to the reference in-focus image (at z=0).

The sample is scanned by an Olympus microscope, and a 21-layer image stack with 0.5 µm axial spacing is acquired at each field-of-view (different numbers of images may be obtained at different axial spacing in other embodiments). The defocused aberrated and focused images of the same field-of-view are paired. The training dataset is composed from thousands of such pairs, which are used as input and output for the network training, respectively. The training for 30,000 image pairs takes about ~30 hours on a Nvidia 2080 Ti GPU. Following the training of the deep neural network 10a, the method enables the refocusing of images 20d of the specimen 22 for multiple defocusing distances into focused images 20f, as shown in FIG. 14.

The autofocusing method is also applicable to thick specimen or sample 22, where the network 10a can be trained to refocus on a specific depth feature of the specimen (for example, surface of thick tissue section), eliminating the out-of-focus scattering that substantially degrades the image quality. Various user-defined depths or planes may be defined by the user. This may include an upper surface of the sample 22, a middle plane of the sample 22, or a bottom surface of the sample 22. The output of this trained, deep neural network 10a can then be used as input to a second, and independently trained virtual staining neural network 10 as explained herein, to virtually stain a label-free tissue sample 22. The output images 20f of the first trained, deep neural network 10a is then input the virtual staining trained, neural network 10. In an alternative embodiment, one can train, using a similar process as outlined above, a single neural network 10 that can directly take an out-of-focus image 20d of an incoherent microscope 110 such as a fluorescence, brightfield, darkfield, or phase microscope, to directly output a virtually stained image 40 of the label-free sample 22, where the raw image 20d was out-of-focus (at the input of the same neural network). The virtually stained image 40 resembles another image modality than the image modality of the incoherent microscope 110 that obtained the out-of-focus image 20d. For example, the out-of-focus image 20d may be obtained with a fluorescence microscope yet the output image 40 which is in-focus and digitally stained substantially resembles a brightfield microscope image.

In another embodiment, a machine learning-based framework is utilized where the trained, deep neural network 10 enables the digital/virtual staining of a sample 22 with multiple stains. Multiple histological virtual stains can be applied to the image using a single trained, deep neural network 10. In addition, the method enables one to perform user-defined region of interest specific virtual staining as well as blending of multiple virtual stains (e.g., to generate other unique stains or staining combinations). For example, a Graphical User Interface (GUI) may be provided to allow the user to paint or highlight specific regions of an image of unlabeled histological tissue with one or more virtual stains. The method uses a class conditional convolutional neural network 10 to transform input images consisting of one or more input images 20 which, in one particular embodiment, include autofluorescence images 20 of the unlabeled tissue sample 22.

As an example, to demonstrate its utility, a single trained, deep neural network 10 was used to virtually stain an image of an unlabeled section of tissue sample 22 with Hematoxylin and Eosin (H&E) stain, hematoxylin, eosin, Jones silver stain, Masson's Trichrome stain, Periodic acid-Schiff (PAS) stains, Congo Red stain, Alcian Blue stain, Blue Iron, Silver nitrate, trichrome stains, Ziehl Neelsen, Grocott's Methenamine Silver (GMS) stains, Gram Stains, acidic stains, basic stains, Silver stains, Nissl, Weigert's stains, Golgi stain, Luxol fast blue stain, Toluidine Blue, Genta, Mallory's Trichrome stain, Gomori Trichrome, van Gieson, Giemsa, Sudan Black, Perls' Prussian, Best's Carmine, Acridine Orange, immunofluorescent stains, immunohistochemical stains, Kinyoun's-cold stain, Albert's staining, Flagellar staining, Endospore staining, Nigrosin, or India Ink.

The method may also be used to generate novel stains which are a composition of multiple, virtual stains, as well as staining of specific tissue microstructures with these trained stains. In yet another alternative embodiment, image processing software may be used to automatically identify or segment regions of interest within an image of unlabeled tissue sample 22. These identified or segment regions of interest may be presented to the user for virtual staining or already stained by the image processing software. As one example, nuclei may be automatically segmented and "digitally" stained with a particular virtual stain without having to be identified by a pathologist or other human operator.

Figure 15:
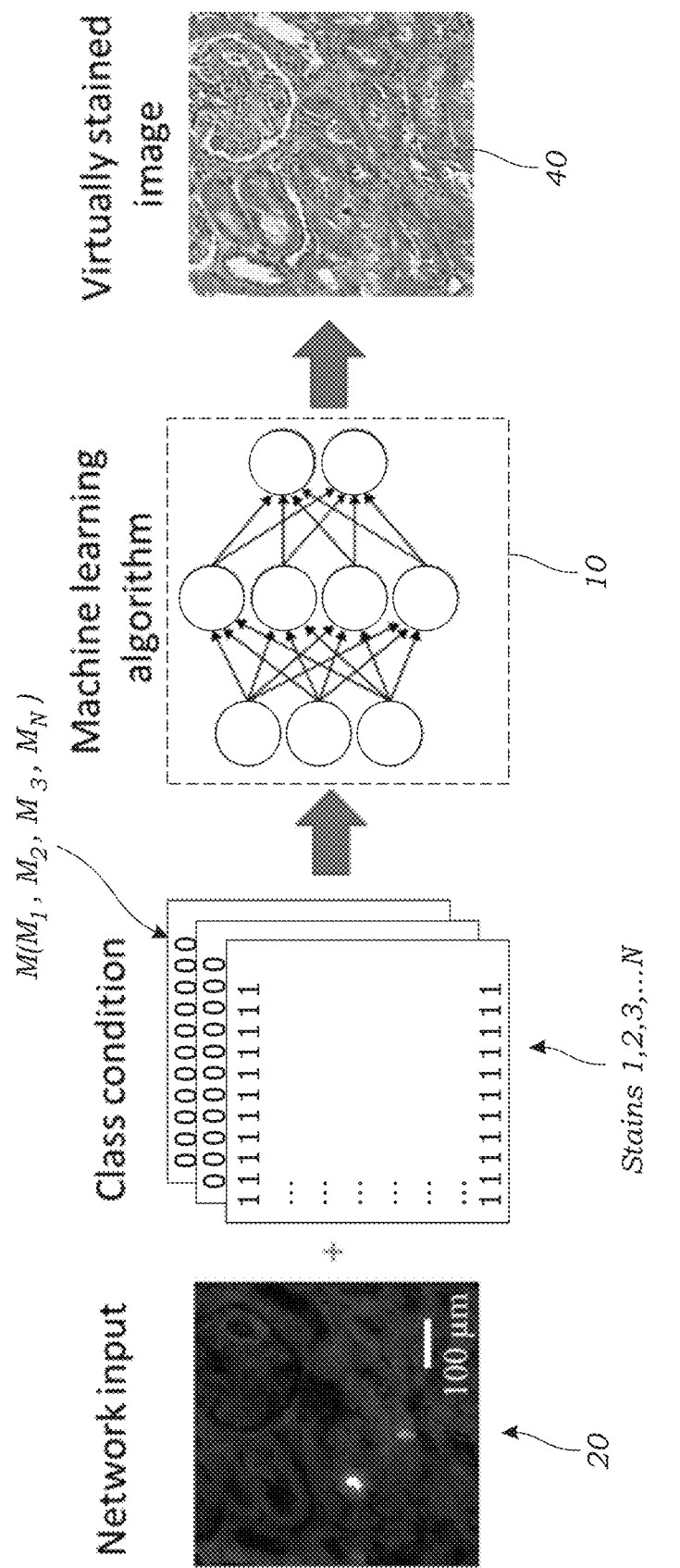
FIG. 15 illustrates a schematic of the machine learning-based approach that uses class condition to apply multiple stains to a microscope image to create a virtually stained image.

In this embodiment, one or more autofluorescence images 20 of unlabeled tissue 22 is used as the input to a trained, deep neural network 10. This input is transformed using a class conditional generative adversarial network (c-GAN) into an equivalent image 40 of a stained tissue section of the same field-of-view (see FIG. 15). During network training, the class input into the deep neural network 10 is specified to be the class of the corresponding ground truth image for that image. In one embodiment, the class condition can be implemented as a set of "one hot" encoded matrices (FIG. 15) with the same vertical and horizontal dimensions as the network input image. During training, the classes can be changed to any number. Alternatively, by modifying the class encoding matrices M to use a mixture of multiple classes, rather than simple one-hot encoding matrices, the multiple stains can be blended, creating an output image 40 having a unique stain with features emanating from various stains learned by the deep neural network 10 (FIGS. 18A-18G).

Figure 8:
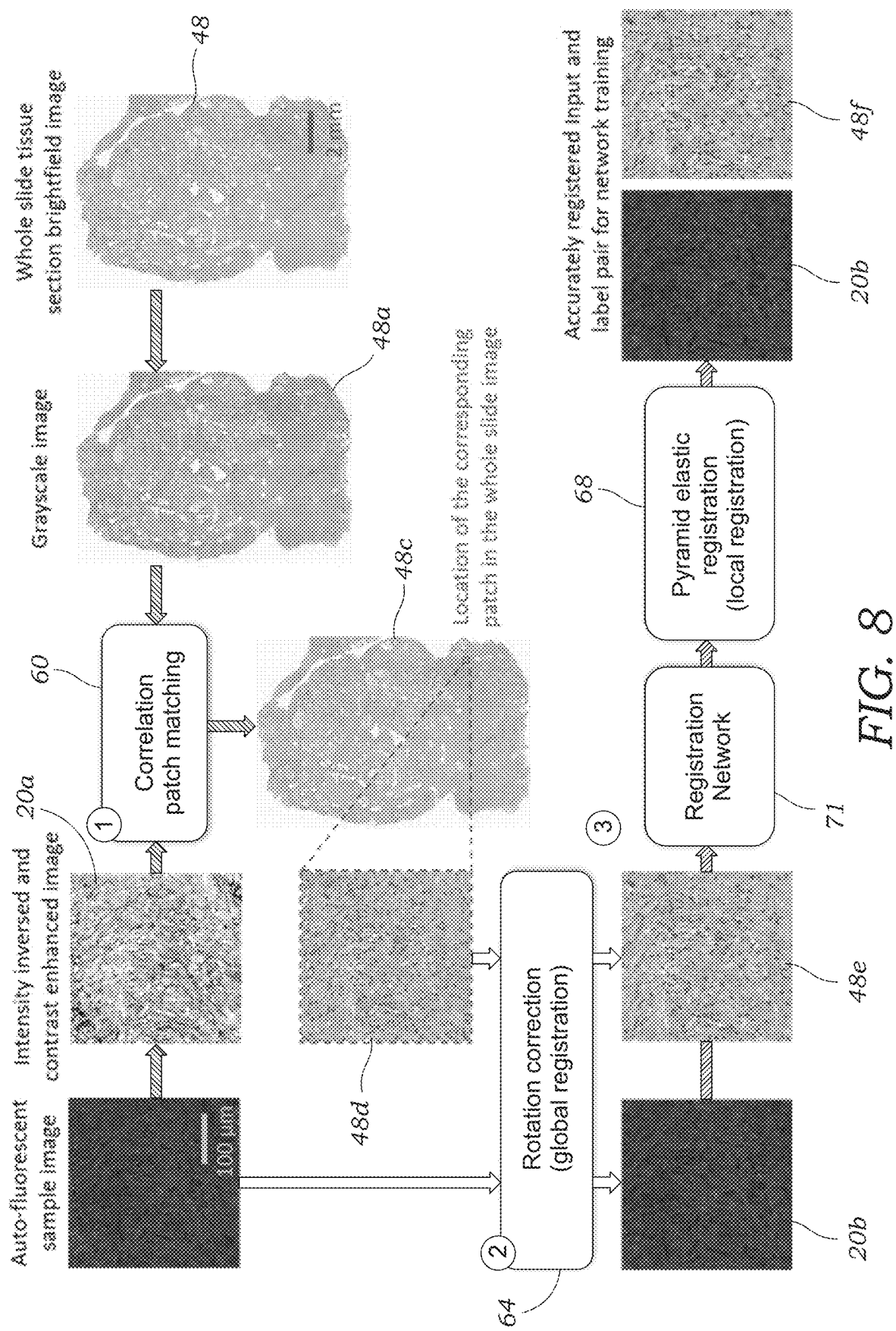
FIG. 8 illustrates the field-of-view matching and registration process of the auto-fluorescence images of unstained tissue samples with respect to the brightfield images of the same samples, after the chemical staining process.

As the deep neural network 10 aims to learn the transformation from autofluorescence images 20 of the unlabeled tissue specimens 22 to those of a stained specimen (i.e., gold standard), it is crucial to accurately align the FOVs. Furthermore, when more than one autofluorescence channel is used as the network's 10 input, the various filter channels must be aligned. In order to use four different stains, (H&E, Masson trichrome, PAS and Jones), image pre-processing and alignment was implemented for each input image and target image pair (training pairs) from those four different staining datasets respectively. Image pre-processing and alignment follows the global and local registration process as described herein and illustrated in FIG. 8. However, one major difference is that when using multiple autofluorescence channels as the network input (i.e., DAPI and TxRed as shown here), they must be aligned. Even though the images from the two channels are captured using the same microscope it was determined that the corresponding FOVs from the two channels are not precisely aligned, particularly on the edges of the FOVs. Therefore, an elastic registration algorithm as described herein was used to accurately align the multiple autofluorescence channels. The elastic registration algorithm matches the local features of both channels of images (e.g., DAPI and TxRed) by hierarchically breaking the images into smaller and smaller blocks while matching the corresponding blocks. The calculated transformation map was then applied to the TxRed images to ensure that they are aligned to the corresponding images from DAPI channel. Finally, the aligned images from the two channels and get aligned whole slide images which contain both the DAPI and TxRed channels.

At the end of the co-registration process, images 20 from the single or multiple autofluorescence channels of the unlabeled tissue sections are well aligned to the corresponding brightfield images 48 of the histologically stained tissue sections 22. Before feeding those aligned pairs into deep neural network 10 for training, normalization is implemented on the whole slide images of the DAPI and TxRed, respectively. This whole slide normalization is performed by subtracting the mean value of the entire tissue sample and dividing it by the standard deviation between pixel values. Following the training procedure, using the class condition, multiple virtual stains can be applied to the images 20 with a single algorithm on the same input image 20. In other words, an additional network is not required for each individual stain. A single, trained neural network can be used to apply one or more digital/virtual stains to an input image 20.

Figure 16:
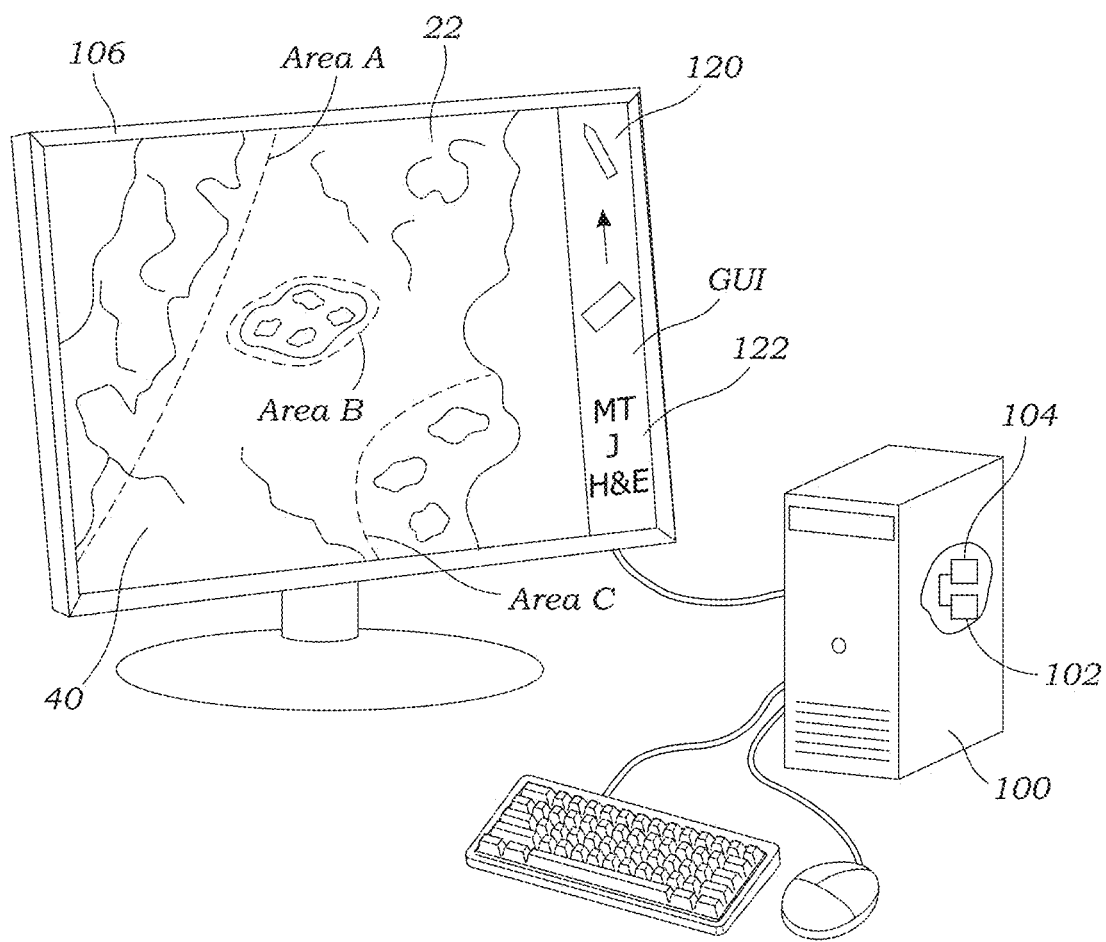
FIG. 16 illustrates a display that shows a Graphical User Interface (GUI) that is used to display an output image from the trained, deep neural network according to one embodiment. Different areas or sub-regions of the image are highlighted which can be virtually stained with different stains. This may be done manually, automatically with the aid of image processing software, or some combination of the two (e.g., a hybrid approach).

FIG. 16 illustrates a display that shows a Graphical User Interface (GUI) that is used to display an output image 40 from the trained, deep neural network 10 according to one embodiment. In this embodiment, the user is provided a list of tools (e.g., pointer, marker, eraser, loop, highlighter, etc.) that can be used to identify and select certain regions of the output image 40 for virtual staining. For example, the user may use one or more of the tools to select certain areas or regions of the tissue in the output image 40 for virtual staining. In this particular example, three areas are identified by hashed lines (Areas A, B, C) that have been manually selected by the user. The user may be provided with a palette of stains to choose from to stain the regions. For example, the user may be provided stain options to stain the tissue (e.g., Masson's Trichrome, Jones, H&E). The user is then able to select the different Areas for staining with one or more of these stains. This results in a micro-structured output such as that illustrated in FIG. 17. In a separate embodiment, image processing software 104 may be used to automatically identify or segment certain regions of the output image 40. For example, image segmentation and computer-generated mapping may be used to identify certain histological features in the imaged sample 22. For example, cell nuclei, certain cell or tissue types may be automatically identified by the image processing software 104. These automatically identified regions-of-interest in the output image 40 may be manually and/or automatically stained with one or more stains/stain combinations.

In yet another embodiment, a blending of multiple stains may be generated in the output image 40. For example, multiple stains may be blended together in different ratios or percentages to create unique stains or stain combinations. Examples are disclosed herein (FIGS. 18E-18G) of using stain blends with different input class conditions of the stain ratios (e.g., virtual 3:1 of H&E:Jones stain in FIG. 18E) to generate the virtually stained network output image 40. FIG. 18F illustrates a H&E:Jones virtually blended stain in a ratio of 1:1. FIG. 18F illustrates a H&E:Jones virtually blended stain in a ratio of 1:3.

While the digital/virtual staining method may be used for fluorescent images obtained of label-free samples 22 it should be appreciated that the multi-stain digital/virtual staining method may also be used for other microscope imaging modalities. These include, for example, brightfield microscopy images of stained or unstained samples 22. In other examples, the microscope may include: single photon fluorescence microscope, multiple-photon microscope, second harmonic generation microscope, high harmonic generation microscope, optical coherence tomography (OCT) microscope, confocal reflectance microscope, fluorescence lifetime microscope, Raman spectroscopy microscope, brightfield microscope, darkfield microscope, phase contrast microscope, and quantitative phase microscope, structured illumination microscope, super-resolution microscope, light-sheet microscope, computational microscope, ptychographic microscope, synthetic aperture-based microscope, and total internal reflection microscope.

The digital/virtual staining method may be used with any number of stains including, by way of example, Hematoxylin and Eosin (H&E) stain, hematoxylin, eosin, Jones silver stain, Masson's Trichrome stain, Periodic acid-Schiff (PAS) stains, Congo Red stain, Alcian Blue stain, Blue Iron, Silver nitrate, trichrome stains, Ziehl Neelsen, Grocott's Methenamine Silver (GMS) stains, Gram Stains, Acidic stains, Basic stains, Silver stains, Nissl, Weigert's stains, Golgi stain, Luxol fast blue stain, Toluidine Blue, Genta, Mallory's Trichrome stain, Gomori Trichrome, van Gieson, Giemsa, Sudan Black, Perls' Prussian, Best's Carmine, Acridine Orange, an immunofluorescent stain, an immunohistochemical stain, a Kinyoun's-cold stain, an Albert's staining, a Flagellar staining, an Endospore staining, an Nigrosin, and an India Ink stain. The sample 22 that is imaged may include tissue sections or cells/cellular structures.

Figure 19A:
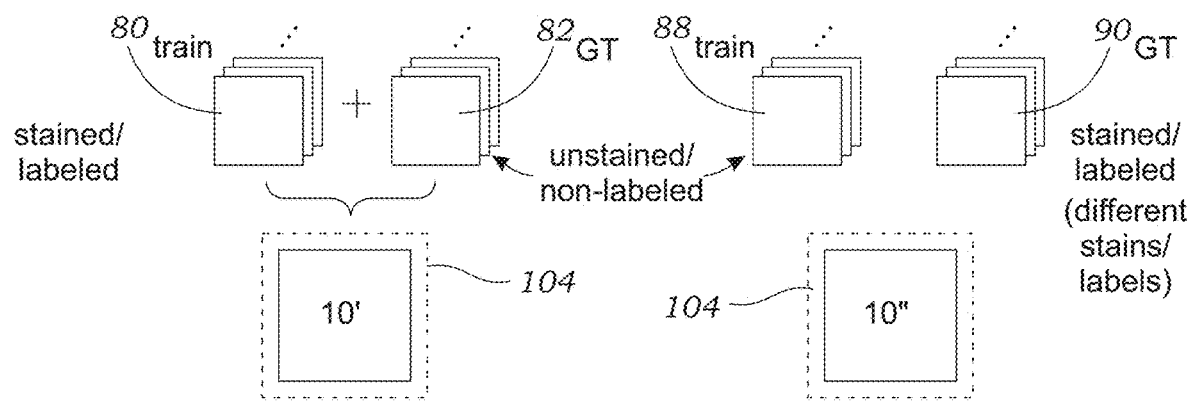
FIGS. 19A and 19B illustrate another embodiment to virtually de-stain images obtained from a microscope (e.g., stained images to de-stained images). Also illustrated is an optional machine learning-based operation to re-stain the image with a different chemical stain from that obtained with the microscope. This illustrates virtual de-staining and re-staining.

In another embodiment, the trained, deep neural network 10', 10" may operate to virtually de-stain (and optionally virtually re-stain the sample with a different stain). In this embodiment, a first trained, deep neural network 10' is provided that is executed by image processing software 104 using one or more processors 102 of a computing device 100 (see FIG. 1), wherein the first trained, deep neural network 10' is trained with a plurality of matched chemically stained microscopy images or image patches $80_{train}$ and their corresponding non-stained ground truth microscopy images or image patches $82_{GT}$ of the same sample obtained prior to chemical staining (FIG. 19A). Thus, in this embodiment, the ground truth images used for training the deep neural network 10' is the unstained (or non-labeled) image while the training images are those that are chemically stained (e.g., IHC stained). In this embodiment, a microscopy image $84_{test}$ of the chemically stained sample 12 (i.e., the sample 12 that is to be tested or imaged) is obtained using a microscope 110 of any of the types described herein. The image $84_{test}$ of the chemically stained sample is then input to a trained, deep neural network 10'. The trained, deep neural network 10' then outputs a virtually de-stained microscopic image 86 of the sample 12 that is substantially equivalent to a corresponding image of the same sample obtained without chemical staining (i.e., unstained or non-labeled).

Figure 19B:
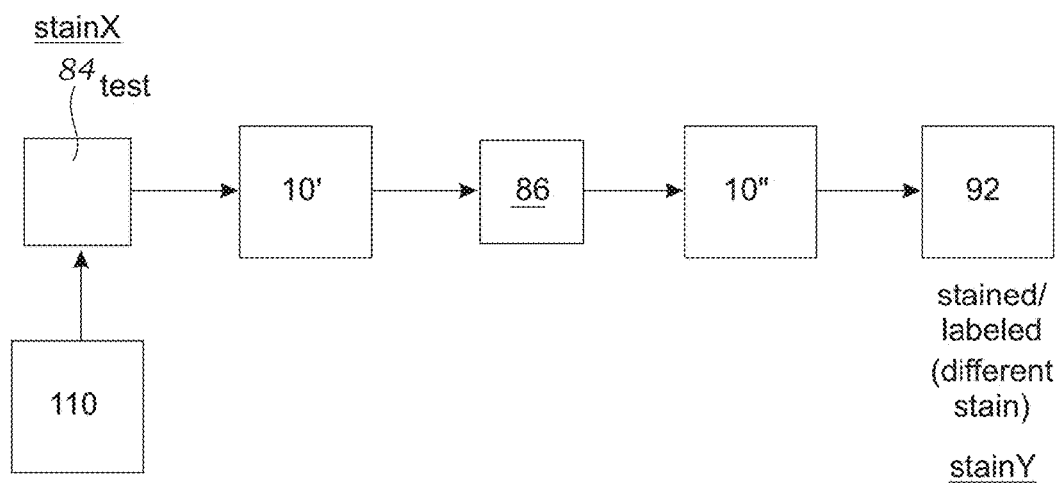

Optionally, as seen in FIG. 19B, a second trained, deep neural network 10" is provided that is executed by image processing software 104 using one or more processors 102 of a computing device 100 (see FIG. 1), wherein the second trained, deep neural network 10" is trained with a plurality of matched non-stained or unlabeled microscopy images or image patches $88_{train}$ same sample obtained prior to chemical staining and their corresponding stained ground truth microscopy images or image patches $90_{GT}$ of the (FIG. 19A). In this embodiment, the stained ground truth corresponds to a different stain as used in the $80_{train}$ images. Next, the virtually de-stained microscopic image 86 of the sample 12 (i.e., the sample 12 that is to be tested or imaged) is input to the second trained, deep neural network 10". The second trained, deep neural network 10" then outputs a stained or labeled microscopic image 92 of the sample 12 that is substantially equivalent to a corresponding image of the same sample 12 obtained with a different chemical stain.

For example, the stain be transformed from/to one of the following: Hematoxylin and Eosin (H&E) stain, hematoxylin, eosin, Jones silver stain, Masson's Trichrome stain, Periodic acid-Schiff (PAS) stains, Congo Red stain, Alcian Blue stain, Blue Iron, Silver nitrate, trichrome stains, Ziehl Neelsen, Grocott's Methenamine Silver (GMS) stains, Gram Stains, acidic stains, basic stains, Silver stains, Nissl, Weigert's stains, Golgi stain, Luxol fast blue stain, Toluidine Blue, Genta, Mallory's Trichrome stain, Gomori Trichrome, van Gieson, Giemsa, Sudan Black, Perls' Prussian, Best's Carmine, Acridine Orange, immunofluorescent stains, immunohistochemical stains, Kinyoun's-cold stain, Albert's staining, Flagellar staining, Endospore staining, Nigrosin, or India Ink.

It should be appreciated that this embodiment may be combined with the machine learning-based training of out-of-focus and in-focus images. Thus, the network (e.g., deep neural network 10') may be trained to also focus or eliminate optical aberrations in addition to de-staining/re-staining. In addition, for all embodiments described herein, the input image(s) 20 may in some instances have the same or substantially similar numerical aperture and resolution as the ground truth (GT) images have. Alternatively, the input image(s) 20 may have a lower numerical aperture and poorer resolution compared to the ground truth (GT) images.

Experimental—Digital Staining of Label Free Tissue Using Auto-Fluorescence

Virtual Staining of Tissue Samples

Figures 3E, 3F, 3G, 3H:
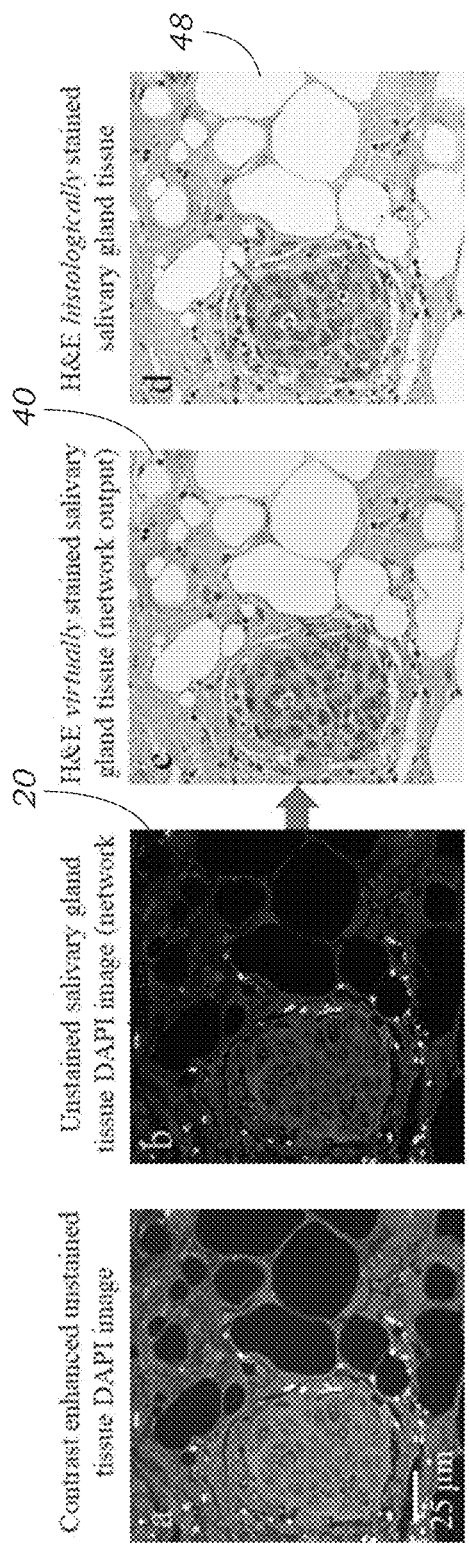

The system 2 and methods described herein was tested and demonstrated using different combinations of tissue section samples 22 and stains. Following the training of a CNN-based deep neural network 10 its inference was blindly tested by feeding it with the auto-fluorescence images 20 of label-free tissue sections 22 that did not overlap with the images that were used in the training or validation sets. FIGS. 4A-4H illustrates the results for a salivary gland tissue section, which was digitally/virtually stained to match H&E stained brightfield images 48 (i.e., the ground truth images) of the same sample 22. These results demonstrate the capability of the system 2 to transform a fluorescence image 20 of a label-free tissue section 22 into a brightfield equivalent image 40, showing the correct color scheme that is expected from an H&E stained tissue, containing various constituents such as epithelioid cells, cell nuclei, nucleoli, stroma, and collagen. Evaluation of both FIGS. 3C and 3D show the H&E stains demonstrate a small island of infiltrating tumor cells within subcutaneous fibro-adipose tissue. Note the nuclear detail, including distinction of nucleoli (arrow) and chromatin texture, is clearly appreciated in both panels. Similarly, in FIGS. 3G and 3H, the H&E stains demonstrate infiltrating squamous cell carcinoma. The desmoplastic reaction with edematous myxoid change (asterisk) in the adjacent stroma is clearly identifiable in both stains.

Next, the deep network 10 was trained to digitally/virtually stain other tissue types with two different stains, i.e., the Jones methenamine silver stain (kidney) and the Masson's Trichrome stain (liver and lung). FIGS. 4A-4H and 5A-5P summarize the results for deep learning-based digital/virtual staining of these tissue sections 22, which very well match to the brightfield images 48 of the same samples 22, captured after the histochemical staining process. These results illustrate that the trained deep neural network 10 is capable of inferring the staining patterns of different types of histology stains used for different tissue types, from a single fluorescence image 20 of a label-free specimen (i.e., without any histochemical stains). With the same overall conclusion as in FIGS. 3A-3H, it was also confirmed by a pathologist that the neural network output images FIGS. 4C and 5G correctly reveal the histological features corresponding to hepatocytes, sinusoidal spaces, collagen and fat droplets (FIG. 5G), consistent with the way that they appear in the brightfield images 48 of the same tissue samples 22, captured after the chemical staining (FIGS. 5D and 5H). Similarly, it was also confirmed by the same expert that the deep neural network output images 40 reported in FIGS. 5K and 5O (lung) reveal consistently stained histological features corresponding to vessels, collagen and alveolar spaces as they appear in the brightfield images 48 of the same tissue sample 22 imaged after the chemical staining (FIGS. 6L and 6P).

The digitally/virtually-stained output images 40 from the trained, deep neural network 10 were compared to the standard histochemical staining images 48 for diagnosing multiple types of conditions on multiple types of tissues, which were either Formalin-Fixed Paraffin-Embedded (FFPE) or frozen sections. The results are summarized in Table 1 below. The analysis of fifteen (15) tissue sections by four board certified pathologists (who were not aware of the virtual staining technique) demonstrated 100% non-major discordance, defined as no clinically significant difference in diagnosis among professional observers. The "time to diagnosis" varied considerably among observers, from an average of 10 seconds-per-image for observer 2 to 276 seconds-per-image for observer 3. However, the intra-observer variability was very minor and tended towards shorter time to diagnosis with the virtually-stained slide images 40 for all the observers except observer 2 which was equal, i.e., ~10 seconds-per-image for both the virtual slide image 40 and the histology stained slide image 48. These indicate very similar diagnostic utility between the two image modalities.

TABLE 1

| Serial number | Tissue, fixation, type of stain | Pathologist # | Histochemically / Virtually stained | Diagnosis | Time to diagnose |
|---|---|---|---|---|---|
| 1 | Ovary, Frozen section, H&E | 1 | VS | Adenocarcinoma | 30 sec |
|  |  | 2 | VS | Borderline serous tumor | 15 sec |
|  |  | 3 | HS | Mucinous adenocarcinoma | 10 min |
|  |  | 4 | HS | Adenocarcinoma, endometrioid | 2 min |
| 2 | Ovary, Frozen section, H&E | 1 | VS | Benign ovary | 10 sec |
|  |  | 2 | VS | Benign ovary | 10 sec |
|  |  | 3 | HS | Normal ovary with corpus luteal cyst | 15 min |
|  |  | 4 | HS | Normal | 1 min |
| 3 |  | 1 | VS | Benign salivary glands with mild chronic inflammation | 10 sec |
|  | Salivary Gland, FFPE, H&E | 2 | VS | Benign parotid tissue | 5 sec |
|  |  | 3 | HS | Normal salivary gland | 1 min |
|  |  | 4 | HS | No histopathologic abnormality | 1 min |
| 4 | Salivary Gland, Frozen section, H&E | 1 | HS | Pleomorphic adenoma | 5 sec |
|  |  | 2 | HS | Pleomorphic adenoma | 5 sec |
|  |  | 3 | VS | Pleomorphic adenoma | 3 min |
|  |  | 4 | VS | Pleomorphic adenoma | 2 sec |
| 5 | Salivary Gland, FFPE, H&E | 1 | HS | Mucoepidermoid carcinoma, low grade | 5 sec |
|  |  | 2 | HS | Salivary duct carcinoma | 5 sec |
|  |  | 3 | VS | Mucoepidermoid carcinoma | 10 min |
|  |  | 4 | VS | Mucoepidermoid Carcinoma | 10 sec |
| 6 | Breast, FFPE, H&E | 1 | VS | Invasive ductal carcinoma and DCIS | 15 sec |
|  |  | 2 | VS | Ductal carcinoma | 10 sec |
|  |  | 3 | HS | Invasive ductal carcinoma with DCIS | 2 min |
|  |  | 4 | HS | Invasive carcinoma | 1 minute |
| 7 | Skin, FFPE, H&E | 1 | HS | Malignant melanoma | 30 sec |
|  |  | 2 | HS | melanoma | 30 sec |
|  |  | 3 | VS | Melanoma | 5 min |
|  |  | 4 | VS | Melanoma | 1 min |
| 8 | Prostate, FFPE, H&E | 1 | HS | Prostatic adenocarcinoma 3 + 4 | 1 min |
|  |  | 2 | HS | Prostatic adenocarcinoma 4 + 3 | 5 sec |
|  |  | 3 | VS | Prostatic adenocarcinoma, Gleason pattern 3 + 4 | 5 min |
|  |  | 4 | VS | HG-PIN with cribiforming vs carcinoma | 5 min |
| 9 | Liver, FFPE, Masson's trichrome | 1 | VS | Benign liver with mild steatosis | 10 sec |
|  |  | 2 | VS | Benign liver with steatosis | 5 sec |
|  |  | 3 | HS | Hepatosteatosis, predominantly macrovesicular | 3 min |
|  |  | 4 | HS | Minimal steatosis, no fibrosis | 5 min |
| 10 | Liver, FFPE, Masson's trichrome | 1 | HS | Benign liver with bridging fibrosis | 10 sec |
|  |  | 2 | HS | Benign liver, bridging fibrosis | 5 sec |
|  |  | 3 | VS | Moderate cirrhosis | 1 min |
|  |  | 4 | VS | Mild portal inflammation, focal bridging fibrosis (Stage 2-3) | 5 minutes |
| 11 | Salivary Gland, FFPE, H&E | 1 | VS | Carcinoma | 5 sec |
|  |  | 2 | VS | Intraductal ca | 20 sec |
|  |  | 3 | HS | Poorly differentiated carcinoma | 1 min |
|  |  | 4 | HS | Low-grade salivary gland neoplasm | 1 minute |
| 12 | Salivary Gland, FFPE, H&E | 1 | HS | Adenocarcinoma | 5 sec |
|  |  | 2 | HS | Salivary duct carcinoma | 5 sec |
|  |  | 3 | VS | Salivary duct carcinoma | 2 min |
|  |  | 4 | VS | Low-grade salivary gland neoplasm | 1 minute |
| 13 | Thyroid, FFPE, H&E | 1 | VS | Papillary thyroid carcinoma, tall cell type | 10 sec |
|  |  | 2 | VS | Papillary thyroid ca, tall cell | 20 sec |
|  |  | 3 | HS | Papillary thyroid carcinoma, tall cell variant | 5 min |
|  |  | 4 | HS | PTC | 10 sec |
| 14 | Thyroid, FFPE, H&E | 1 | HS | Papillary thyroid carcinoma | 5 sec |
|  |  | 2 | HS | Medullary ca | 5 sec |
|  |  | 3 | VS | Papillary thyroid carcinoma, oncocytic variant | 7 min |
|  |  | 4 | VS | PTC | 10 sec |
| 15 | Thyroid, FFPE, H&E | 1 | VS | Papillary thyroid carcinoma | 5 sec |
|  |  | 2 | VS | Papillary thyroid ca | 5 sec |
|  |  | 3 | HS | Papillary thyroid carcinoma | 1 min |
|  |  | 4 | HS | PTC | 10 sec |

Blind Evaluation of Staining Efficacy for Whole Slide Images (WSIs)

After evaluating the differences in tissue section and stains, the ability of the virtual staining system 2 was tested in the specialized staining histology workflow. In particular, the autofluorescence distribution of 15 label-free samples of liver tissue sections and 13 label-free tissue sections of kidney were imaged with a 20×/0.75NA objective lens. All liver and kidney tissue sections were obtained from different patients and included both small biopsies and larger resections. All the tissue sections were obtained from FFPE but not cover slipped. After the autofluorescence scanning, the tissue sections were histologically stained with Masson's Trichrome (4 µm liver tissue sections) and Jones' stain (2 µm kidney tissue sections). The WSIs were then divided into training and test sets. For the liver slides cohort, 7 WSIs were used for training the virtual staining algorithm and 8 WSIs were used for blind testing; for the kidney slides cohort, 6 WSIs were used for training the algorithm and 7 WSIs were used for testing. The study pathologists were blinded to the staining techniques for each WSI and were asked to apply a 1-4 number grade for the quality of the different stains: 4=perfect, 3=very good, 2=acceptable, 1=unacceptable. Secondly, the study pathologists applied the same score scale (1-4) for specific features: nuclear detail (ND), cytoplasmic detail (CD) and extracellular fibrosis (EF), for liver only. These results are summarized in Table 2 (Liver) and Table 3 (Kidney) below (winner is bolded). The data indicates that the pathologists were able to recognize histopathologic features with both staining techniques and with a high degree of agreement between the techniques, without a clear preferable staining technique (virtual vs. histological).

TABLE 2

| Tis. # | Pathologist 1 | | | | Pathologist 2 | | | | Pathologist 3 | | | | Average | | | |
|---|---|---|---|---|---|---|---|---|---|---|---|---|---|---|---|---|
| | ND | CD | EF | SQ | ND | CD | EF | SQ | ND | CD | EF | SQ | ND | CD | EF | SQ |
| 1-HS | 3 | 2 | 1 | 1 | 4 | 4 | 3 | 4 | 1 | 1 | 1 | 3 | 2.67 | 2.33 | 1.67 | 2.67 |
| 1-VS | 3 | 3 | 3 | 3 | 3 | 3 | 2 | 3 | 2 | 2 | 3 | 3 | 2.67 | 2.67 | 2.67 | 3.00 |
| 2-HS | 3 | 2 | 4 | 4 | 4 | 4 | 3 | 4 | 1 | 2 | 2 | 2 | 2.67 | 2.67 | 3.00 | 3.33 |
| 2-VS | 3 | 3 | 4 | 4 | 4 | 3 | 3 | 3 | 2 | 2 | 3 | 3 | 3.00 | 2.67 | 3.33 | 3.33 |
| 3-HS | 3 | 3 | 2 | 2 | 3 | 3 | 4 | 3 | 1 | 1 | 1 | 1 | 2.33 | 2.33 | 2.33 | 2.00 |
| 3-VS | 3 | 2 | 1 | 1 | 3 | 3 | 1 | 4 | 1 | 1 | 1 | 1 | 2.33 | 2.00 | 1.00 | 2.00 |
| 4-HS | 3 | 2 | 4 | 4 | 3 | 4 | 4 | 4 | 1 | 2 | 1 | 2 | 2.33 | 2.67 | 3.00 | 3.33 |
| 4-VS | 3 | 3 | 4 | 4 | 3 | 3 | 4 | 4 | 2 | 2 | 3 | 3 | 3.00 | 2.67 | 3.67 | 3.67 |
| 5-HS | 3 | 3 | 4 | 4 | 3 | 3 | 2 | 1 | 1 | 3 | 2 | 2 | 2.33 | 3.00 | 2.67 | 2.33 |
| 5-VS | 3 | 2 | 3 | 3 | 3 | 3 | 4 | 2 | 2 | 1 | 3 | 3 | 2.67 | 2.00 | 3.33 | 2.67 |
| 6-HS | 3 | 2 | 3 | 3 | 4 | 4 | 4 | 3 | 2 | 2 | 2 | 2 | 3.00 | 2.67 | 3.00 | 2.67 |
| 6-VS | 3 | 3 | 4 | 3 | 4 | 3 | 4 | 3 | 1 | 1 | 1 | 1 | 2.67 | 2.33 | 3.00 | 2.33 |
| 7-HS | 3 | 3 | 4 | 4 | 3 | 4 | 4 | 3 | 2 | 1 | 2 | 2 | 2.67 | 2.67 | 3.33 | 3.00 |
| 7-VS | 3 | 2 | 3 | 3 | 4 | 4 | 4 | 3 | 2 | 2 | 3 | 3 | 3.00 | 2.67 | 3.33 | 3.00 |
| 8-HS | 3 | 3 | 4 | 4 | 4 | 4 | 4 | 3 | 1 | 1 | 1 | 1 | 2.67 | 2.67 | 3.00 | 2.67 |
| 8-VS | 3 | 2 | 4 | 4 | 4 | 3 | 4 | 4 | 2 | 2 | 3 | 2 | 3.00 | 2.33 | 3.67 | 3.33 |

TABLE 3

| Tissue # | Pathologist 1 | | | Pathologist 2 | | | Pathologist 3 | | | Average | | |
|---|---|---|---|---|---|---|---|---|---|---|---|---|
| | ND | CD | SQ | ND | CD | SQ | ND | CD | SQ | ND | CD | SQ |
| 1-HS | 3 | 3 | 3 | 2 | 2 | 4 | 2 | 2 | 2 | 2.33 | 2.33 | 3.00 |
| 1-VS | 2 | 3 | 3 | 3 | 3 | 4 | 3 | 3 | 3 | 2.67 | 3.00 | 3.33 |
| 2-HS | 2 | 4 | 4 | 3 | 3 | 2 | 1 | 1 | 2 | 2.00 | 2.67 | 2.67 |
| 2-VS | 2 | 3 | 4 | 3 | 3 | 3 | 1 | 2 | 3 | 2.00 | 2.67 | 3.33 |
| 3-HS | 2 | 3 | 3 | 3 | 3 | 2 | 2 | 3 | 4 | 2.33 | 3.00 | 3.00 |
| 3-VS | 2 | 3 | 3 | 3 | 3 | 3 | 1 | 2 | 3 | 2.00 | 2.67 | 3.00 |
| 4-HS | 3 | 3 | 3 | 2 | 2 | 2 | 1 | 2 | 3 | 2.00 | 2.33 | 2.67 |
| 4-VS | 3 | 3 | 3 | 2 | 2 | 3 | 1 | 2 | 2 | 2.00 | 2.33 | 2.67 |
| 5-HS | 3 | 3 | 2 | 3 | 3 | 1 | 3 | 3 | 3 | 3.00 | 3.00 | 2.00 |
| 5-VS | 3 | 3 | 2 | 4 | 3 | 4 | 3 | 3 | 4 | 3.33 | 3.00 | 3.33 |

TABLE 3-continued

| Tissue # | Pathologist 1 | | | Pathologist 2 | | | Pathologist 3 | | | Average | | |
|---|---|---|---|---|---|---|---|---|---|---|---|---|
| | ND | CD | SQ | ND | CD | SQ | ND | CD | SQ | ND | CD | SQ |
| 6-HS | 2 | 3 | 3 | 3 | 3 | 1 | 2 | 2 | 2 | 2.33 | 2.67 | 2.00 |
| 6-VS | 2 | 2 | 3 | 2 | 2 | 2 | 2 | 2 | 2 | 2.00 | 2.00 | 2.33 |
| 7-HS | 3 | 3 | 2 | 3 | 2 | 2 | 3 | 3 | 3 | 3.00 | 2.67 | 2.33 |
| 7-VS | 3 | 3 | 2 | 4 | 3 | 1 | 3 | 2 | 3 | 3.33 | 2.67 | 2.00 |

Quantification of the Network Output Image Quality

Next, beyond the visual comparison provided in FIGS. 3A-3H, 4A-4H, 5A-5P, the results of the trained deep neural network 10 were quantified by first calculating the pixel-level differences between the brightfield images 48 of the chemically stained samples 22 and the digitally/virtually stained images 40 that are synthesized using the deep neural network 10 without the use of any labels/stains. Table 4 below summarizes this comparison for different combinations of tissue types and stains, using the YCbCr color space, where the chroma components Cb and Cr entirely define the color, and Y defines the brightness component of the image. The results of this comparison reveal that the average difference between these two sets of images is <~5% and <~16%, for the chroma (Cb, Cr) and brightness (Y) channels, respectively. Next, a second metric was used to further quantify the comparison, i.e., the structural similarity index (SSIM), which is in general used to predict the score that a human observer will give for an image, in comparison to a reference image (Equation 8 herein). SSIM ranges between 0 and 1, where 1 defines the score for identical images. The results of this SSIM quantification are also summarized in Table 4, which very well illustrates the strong structural similarity between the network output images 40 and the brightfield images 48 of the chemically stained samples.

TABLE 4

| Virtual histological staining using a deep network | Number images of test | SSIM | | Y difference (%) | | Cb difference (%) | | Cr difference (%) | |
|---|---|---|---|---|---|---|---|---|---|
| | | mean | std | mean | std | mean | std | mean | std |
| Salivary gland (H&E) | 10 | 0.826 | 0.059 | 11.5 | 9.0 | 2.5 | 2.4 | 2.5 | 2.5 |
| Thyroid (H&E) | 30 | 0.789 | 0.044 | 10.1 | 7.9 | 3.4 | 2.7 | 2.8 | 2.7 |
| Thyroid (H&E, transfer learning) | 30 | 0.839 | 0.029 | 14.0 | 8.4 | 2.4 | 2.2 | 2.6 | 2.6 |
| Liver (Masson's Trichrome) | 30 | 0.847 | 0.023 | 11.0 | 8.9 | 3.1 | 2.7 | 4.0 | 3.5 |
| Lung (Masson's Trichrome) | 48 | 0.776 | 0.039 | 15.9 | 11.7 | 4.0 | 3.6 | 5.3 | 4.9 |
| Kidney (Jones Stain) | 30 | 0.841 | 0.021 | 16.1 | 10.4 | 2.5 | 2.2 | 3.6 | 3.4 |

One should note that the brightfield images 48 of the chemically stained tissue samples 22 in fact do not provide the true gold standard for this specific SSIM and YCbCr analysis of the network output images 40, because there are uncontrolled variations and structural changes that the tissue undergoes during the histochemical staining process and related dehydration and clearing steps. Another variation that was noticed for some of the images was that the automated microscope scanning software selected different auto-focusing planes for the two imaging modalities. All these variations create some challenges for the absolute quantitative comparison of the two sets of images (i.e., the network output 40 for a label-free tissue vs. the brightfield image 48 of the same tissue after the histological staining process).

Staining Standardization

An interesting by-product of the digital/virtual staining system 2 can be staining standardization. In other words, the trained deep neural network 10 converges to a "common stain" colorization scheme whereby the variation in the histologically stained tissue images 48 is higher than that of the virtually stained tissue images 40. The colorization of the virtual stain is solely the result of its training (i.e., the gold standard histological staining used during the training phase) and can be further adjusted based on the preferences of pathologists, by retraining the network with a new stain colorization. Such "improved" training can be created from scratch or accelerated through transfer learning. This potential staining standardization using deep learning can remedy the negative effects of human-to-human variations at different stages of the sample preparation, create a common ground among different clinical laboratories, enhance the diagnostic workflow for clinicians as well as assist the development of new algorithms such as automatic tissue metastasis detection or grading of different types of cancer, among others.

Transfer Learning to Other Tissue-Stain Combinations

Using the concept of transfer learning, the training procedure for new tissue and/or stain types can converge much faster, while also reaching an improved performance, i.e., a better local minimum in the training cost/loss function. This means, a pre-learnt CNN model deep neural network 10, from a different tissue-stain combination, can be used to initialize the deep neural network 10 to statistically learn virtual staining of a new combination. FIGS. 6A-6C shows the favorable attributes of such an approach: a new deep neural network 10 was trained to virtually stain the autofluorescence images 20 of unstained thyroid tissue sections, and it was initialized using the weights and biases of another deep neural network 10 that was previously trained for H&E virtual staining of the salivary gland. The evolution of the loss metric as a function of the number of iterations used in the training phase clearly demonstrates that the new thyroid deep network 10 rapidly converges to a lower minimum in comparison to the same network architecture which was trained from scratch, using random initialization as seen in FIG. 6A. FIG. 6B compares the output images 40 of this thyroid network 10 at different stages of its learning process, which further illustrates the impact of transfer learning to rapidly adapt the presented approach to new tissue/stain combinations. The network output images 40, after the training phase with e.g., >6,000 iterations, reveal that cell nuclei show irregular contours, nuclear grooves, and chromatin pallor, suggestive of papillary thyroid carcinoma; cells also show mild to moderate amounts of eosinophilic granular cytoplasm and the fibrovascular core at the network output image shows increased inflammatory cells including lymphocytes and plasma cells. FIG. 6C illustrates the corresponding H&E chemically stained brightfield image 48.

Using Multiple Fluorescent Channels at Different Resolutions

Figures 7A, 7B, 7C:
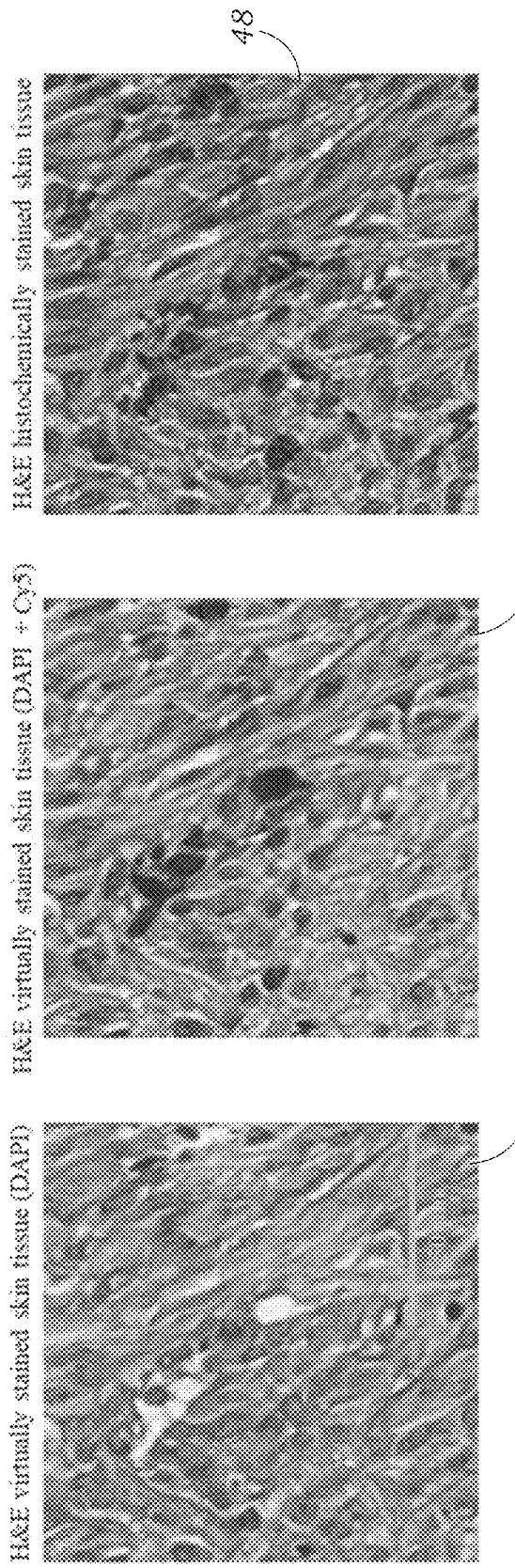
FIG. 7A illustrates the virtual staining (H&E stain) of skin tissue using the DAPI channel only.
FIG. 7B illustrates the virtual staining (H&E stain) of skin tissue using the DAPI and Cy5 channels. Cy5 refers to a far-red-fluorescent label cyanine dye used to label biomolecules.
FIG. 7C illustrates the corresponding histologically stained (i.e., chemically stained with H&E) tissue.

The method of using the trained, deep neural network 10 can be combined with other excitation wavelengths and/or imaging modalities in order to enhance its inference performance for different tissue constituents. For example, melanin detection on a skin tissue section sample using virtual H&E staining was tried. However, melanin was not clearly identified in the output of the network, as it presents a weak auto-fluorescent signal at DAPI excitation/emission wavelengths measured in the experimental system described herein. One potential method to increase the autofluorescence of melanin is to image the samples while they are in an oxidizing solution. However, a more practical alternative was used where an additional autofluorescence channel was employed, originating from e.g., Cy5 filter (excitation 628 nm/emission 692 nm) such that the melanin signal can be enhanced and accurately inferred in the trained, deep neural network 10. By training the network 10 using both the DAPI and Cy5 autofluorescence channels, the trained, deep neural network 10 was able to successfully determine where melanin occurs in the sample, as illustrated in FIGS. 7A-7C. In contrast, when only the DAPI channel was used (FIG. 7A), the network 10 was unable to determine the areas that contain melanin (the areas appear white). Stated differently, the additional autofluorescence information from the Cy5 channel was used by the network 10 to distinguish melanin from the background tissue. For the results that are shown in FIGS. 7A-7C, the images 20 were acquired using a lower resolution objective lens (10×/0.45NA) for the Cy5 channel, to supplement the high-resolution DAPI scan (20×/0.75NA), as it was hypothesized that most necessary information is found in the high-resolution DAPI scan and the additional information (for example, the melanin presence) can be encoded with the lower resolution scan. In this manner, two different channels were used with one of the channels being used at a lower resolution to identify the melanin. This may require multiple scanning passes of the sample 22 with the fluorescent microscope 110. In yet another multi-channel embodiment, multiple images 20 may be fed to the trained, deep neural network 10. This may include, for example, raw fluorescent images in combination with one or more images that have undergone linear or non-linear image pre-processing such as contrast enhancement, contrast reversal, and image filtering.

The system 2 and methods described herein show the ability to digitally/virtually stain label-free tissue sections 22, using a supervised deep learning technique that uses a single fluorescence image 20 of the sample as input, captured by a standard fluorescence microscope 110 and filter set (in other embodiments multiple fluorescence images 20 are input when multiple fluorescence channels are used). This statistical learning-based method has the potential to restructure the clinical workflow in histopathology and can benefit from various imaging modalities such as fluorescence microscopy, non-linear microscopy, holographic microscopy, stimulated Raman scattering microscopy, and optical coherence tomography, among others, to potentially provide a digital alternative to the standard practice of histochemical staining of tissue samples 22. Here, the method was demonstrated using fixed unstained tissue samples 22 to provide a meaningful comparison to chemically stained tissue samples, which is essential to train the deep neural network 10 as well as to blindly test the performance of the network output against the clinically-approved method. However, the presented deep learning-based approach is broadly applicable to different types and states of a sample 22 including un-sectioned, fresh tissue samples (e.g., following a biopsy procedure) without the use of any labels or stains. Following its training, the deep neural network 10 can be used to digitally/virtually stain the images of label-free fresh tissue samples 22, acquired using e.g., UV or deep UV excitation or even nonlinear microscopy modalities. For example, Raman microscopy can provide very rich label-free biochemical signatures that can further enhance the effectiveness of the virtual staining that the neural network learns.

An important part of the training process involves matching the fluorescence images 20 of label-free tissue samples 22 and their corresponding brightfield images 48 after the histochemical staining process (i.e., chemically stained images). One should note that during the staining process and related steps, some tissue constitutes can be lost or deformed in a way that will mislead the loss/cost function in the training phase. This, however, is only a training and validation related challenge and does not pose any limitations on the practice of a well-trained deep neural network 10 for virtual staining of label-free tissue samples 22. To ensure the quality of the training and validation phase and minimize the impact of this challenge on the network's performance, a threshold was established for an acceptable correlation value between the two sets of images (i.e., before and after the histochemical staining process) and eliminated the non-matching image pairs from the training/validation set to make sure that the deep neural network 10 learns the real signal, not the perturbations to the tissue morphology due to the chemical staining process. In fact, this process of cleaning the training/validation image data can be done iteratively: one can start with a rough elimination of the obviously altered samples and accordingly converge on a neural network 10 that is trained. After this initial training phase, the output images 40 of each sample in the available image set can be screened against their corresponding brightfield images 48 to set a more refined threshold to reject some additional images and further clean the training/validation image set. With a few iterations of this process, one can, not only further refine the image set, but also improve the performance of the final trained deep neural network 10.

The methodology described above will mitigate some of the training challenges due to random loss of some tissue features after the histological staining process. In fact, this highlights another motivation to skip the laborious and costly procedures that are involved in histochemical staining as it will be easier to preserve the local tissue histology in a label-free method, without the need for an expert to handle some of the delicate procedures of the staining process, which sometimes also requires observing the tissue under a microscope.

Using a PC desktop, the training phase of the deep neural network 10 takes a considerable amount of time (e.g., ~13 hours for the salivary gland network). However, this entire process can be significantly accelerated by using dedicated computer hardware, based on GPUs. Furthermore, as already emphasized in FIGS. 6A-6C, transfer learning provides a "warm start" to the training phase of a new tissue/stain combination, making the entire process significantly faster. Once the deep neural network 10 has been trained, the digital/virtual staining of a sample image 40 is performed in a single, non-iterative manner, which does not require a trial-and-error approach or any parameter tuning to achieve the optimal result. Based on its feed-forward and non-iterative architecture, the deep neural network 10 rapidly outputs a virtually stained image in less than one second (e.g., 0.59 sec, corresponding to a sample field-of-view of ~0.33 mm×0.33 mm). With further GPU-based acceleration, it has the potential to achieve real-time or near real-time performance in outputting digitally/virtually stained images 40 which might especially be useful in the operating room or for in vivo imaging applications. In should be appreciated that the methods may also be used in in vitro imaging applications as described herein.

The digital/virtual staining procedure that is implemented is based on training a separate CNN deep neural network 10 for each tissue/stain combination. If one feeds a CNN-based deep neural network 10 with the auto-fluorescence images 20 having different tissue/stain combinations, it will not perform as desired. This, however, is not a limitation because for histology applications, the tissue type and stain type are pre-determined for each sample 22 of interest, and therefore, a specific CNN selection for creating the digitally/virtually stained image 40 from an auto-fluorescence image 20 of the unlabeled sample 22 does not require an additional information or resource. Of course, a more general CNN model can be learnt for multiple tissue/stain combinations by e.g., increasing the number of trained parameters in the model, at the cost of a possible increase in the training and inference times. Another avenue is the potential of the system 2 and method to perform multiple virtual stains on the same unlabeled tissue type.

A significant advantage of the system 2 is that it is quite flexible. It can accommodate feedback to statistically mend its performance if a diagnostic failure is detected through a clinical comparison, by accordingly penalizing such failures as they are caught. This iterative training and transfer learning cycle, based on clinical evaluations of the performance of the network output, will help optimize the robustness and clinical impact of the presented approach. Finally, this method and system 2 may be used for micro-guiding molecular analysis at the unstained tissue level, by locally identifying regions of interest based on virtual staining, and using this information to guide subsequent analysis of the tissue for e.g., micro-immunohistochemistry or sequencing. This type of virtual micro-guidance on an unlabeled tissue sample can facilitate high-throughput identification of subtypes of diseases, also helping the development of customized therapies for patients.

Sample Preparation

Formalin-fixed paraffin-embedded 2 μm thick tissue sections were deparaffinized using Xylene and mounted on a standard glass slide using Cytoseal™ (Thermo-Fisher Scientific, Waltham, Mass. USA), followed by placing a coverslip (Fisherfinest™, 24×50-1, Fisher Scientific, Pittsburgh, PA USA). Following the initial auto-fluorescence imaging process (using a DAPI excitation and emission filter set) of the unlabeled tissue sample, the slide was then put into Xylene for approximately 48 hours or until the coverslip can be removed without damaging the tissue. Once the coverslip is removed the slide was dipped (approximately 30 dips) in absolute alcohol, 95% alcohol and then washed in D.I. water for ~1 min. This step was followed by the corresponding staining procedures, used for H&E, Masson's Trichrome or Jones stains. This tissue processing path is only used for the training and validation of the approach and is not needed after the network has been trained. To test the system and method, different tissue and stain combinations were used: the salivary gland and thyroid tissue sections were stained with H&E, kidney tissue sections were stained with Jones stain, while the liver and lung tissue sections were stained with Masson's trichrome.

In the WSI study, the FFPE 2-4 μm thick tissue sections were not cover slipped during the autofluorescence imaging stage. Following the autofluorescence imaging, the tissue samples were histologically stained as described above (Masson's Trichrome for the liver and Jones for the kidney tissue sections). The unstained frozen samples were prepared by embedding the tissue section in O.C.T. (Tissue Tek, SAKURA FINETEK USA INC) and dipped in 2-Methylbutane with dry ice. The frozen section was then cut to 4 μm sections and was put in a freezer until it was imaged. Following the imaging process, the tissue section was washed with 70% alcohol, H&E stained and cover slipped. The samples were obtained from the Translational Pathology Core Laboratory (TPCL) and were prepared by the Histology Lab at UCLA. The kidney tissue sections of diabetic and non-diabetic patients were obtained under IRB 18-001029 (UCLA). All the samples were obtained after de-identification of the patient related information, and were prepared from existing specimen. Therefore, this work did not interfere with standard practices of care or sample collection procedures.

Data Acquisition

The label-free tissue auto-fluorescence images 20 were captured using a conventional fluorescence microscope 110 (IX83, Olympus Corporation, Tokyo, Japan) equipped with a motorized stage, where the image acquisition process was controlled by MetaMorph® microscope automation software (Molecular Devices, LLC). The unstained tissue samples were excited with near UV light and imaged using a DAPI filter cube (OSFI3-DAPI-5060C, excitation wavelength 377 nm/50 nm bandwidth, emission wavelength 447 nm/60 nm bandwidth) with a 40×/0.95NA objective lens (Olympus UPLSAPO 40×2/0.95NA, WD0.18) or 20×/0.75NA objective lens (Olympus UPLSAPO 20×/0.75NA, WD0.65). For the melanin inference, the autofluorescence images of the samples were additionally acquired using a Cy5 filter cube (CY5-4040C-OFX, excitation wavelength 628 nm/40 nm bandwidth, emission wavelength 692 nm/40 nm bandwidth) with a 10×/0.4NA objective lens (Olympus UPLSAPO10×2). Each auto-fluorescence image was captured with a scientific CMOS sensor (ORCA-flash4.0 v2, Hamamatsu Photonics K.K., Shizuoka Prefecture, Japan) with an exposure time of ~500 ms. The brightfield images 48 (used for the training and validation) were acquired using a slide scanner microscope (Aperio AT, Leica Biosystems) using a 20×/0.75NA objective (Plan Apo), equipped with a 2× magnification adapter.

Image Pre-Processing and Alignment

Since the deep neural network 10 aims to learn a statistical transformation between an auto-fluorescence image 20 of a chemically unstained tissue sample 22 and a brightfield image 48 of the same tissue sample 22 after the histochemical staining, it is important to accurately match the FOV of the input and target images (i.e., unstained auto-fluorescence image 20 and the stained bright-filed image 48). An overall scheme describing the global and local image registration process is described in FIG. 8 which was implemented in MATLAB (The MathWorks Inc., Natick, MA, USA). The first step in this process is to find candidate features for matching unstained auto-fluorescence images and chemically stained brightfield images. For this, each auto-fluorescence image 20 (2048×2048 pixels) is down-sampled to match the effective pixel size of the brightfield microscope images. This results in a 1351×1351-pixel unstained auto-fluorescent tissue image, which is contrast enhanced by saturating the bottom 1% and the top 1% of all the pixel values, and contrast reversed (image 20a in FIG. 8) to better represent the color map of the grayscale converted whole slide image. Then, a correlation patch process 60 is performed in which a normalized correlation score matrix is calculated by correlating each one of the 1351×1351-pixel patches with the corresponding patch of the same size, extracted from the whole slide gray-scale image 48a. The entry in this matrix with the highest score represents the most likely matched FOV between the two imaging modalities. Using this information (which defines a pair of coordinates), the matched FOV of the original whole slide brightfield image 48 is cropped 48c to create target images 48d. Following this FOV matching procedure 60, the auto-fluorescence 20 and brightfield microscope images 48 are coarsely matched. However, they are still not accurately registered at the individual pixel-level, due to the slight mismatch in the sample placement at the two different microscopic imaging experiments (auto-fluorescence, followed by brightfield), which randomly causes a slight rotation angle (e.g., ~1-2 degrees) between the input and target images of the same sample.

The second part of the input-target matching process involves a global registration step 64, which corrects for this slight rotation angle between the auto-fluorescence and brightfield images. This is done by extracting feature vectors (descriptors) and their corresponding locations from the image pairs, and matching the features by using the extracted descriptors. Then, a transformation matrix corresponding to the matched pairs is found using the M-estimator Sample Consensus (MSAC) algorithm, which is a variant of the Random Sample Consensus (RANSAC) algorithm. Finally, the angle-corrected image 48e is obtained by applying this transformation matrix to the original brightfield microscope image patch 48d. Following the application of this rotation, the images 20b, 48e are further cropped by 100 pixels (50 pixels on each side) to accommodate for undefined pixel values at the image borders, due to the rotation angle correction.

Finally, for the local feature registration operation 68, an elastic image registration, which matches the local features of both sets of images (auto-fluorescence 20b vs. brightfield 48e), by hierarchically matching the corresponding blocks, from large too small. A neural network 71 is used to learn the transformation between the roughly matched images. This network 71 uses the same structure as the network 10 in FIG. 10. A low number of iterations is used so that the network 71 only learns the accurate color mapping, and not any spatial transformations between the input and label images. The calculated transformation map from this step is finally applied to each brightfield image patch 48e. At the end of these registration steps 60, 64, 68, the auto-fluorescence image patches 20b and their corresponding brightfield tissue image patches 48f are accurately matched to each other and can be used as input and label pairs for the training of the deep neural network 10, allowing the network to solely focus on and learn the problem of virtual histological staining.

For the 20× objective lens images (that were used for generating Table 2 and Table 3 data) a similar process was used. Instead of down-sampling the auto-fluorescence images 20, the bright-field microscope images 48 were down-sampled to 75.85% of their original size so that they match with the lower magnification images. Furthermore, to create whole slide images using these 20× images, additional shading correction and normalization techniques were applied. Before being fed into the network 71, each field-of-view was normalized by subtracting the mean value across the entire slide and dividing it by the standard deviation between pixel values. This normalizes the network input both within each slide as well as between slides. Finally, shading correction was applied to each image to account for the lower relative intensity measured at the edges of each field-of-view.

Deep Neural Network Architecture and Training

Figure 9:
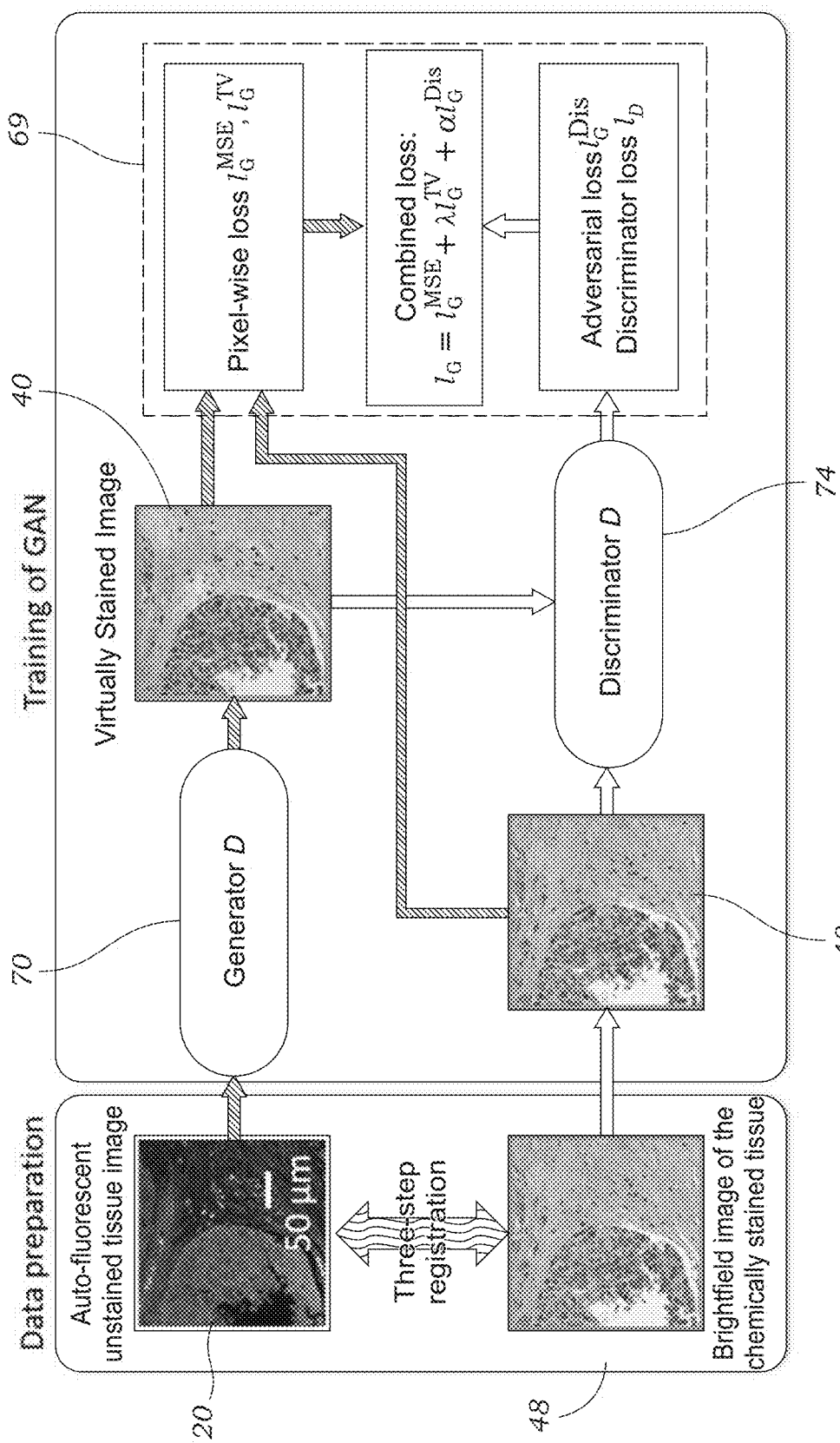
FIG. 9 schematically illustrates the training process of the virtual staining network using a GAN.
Figure 10:
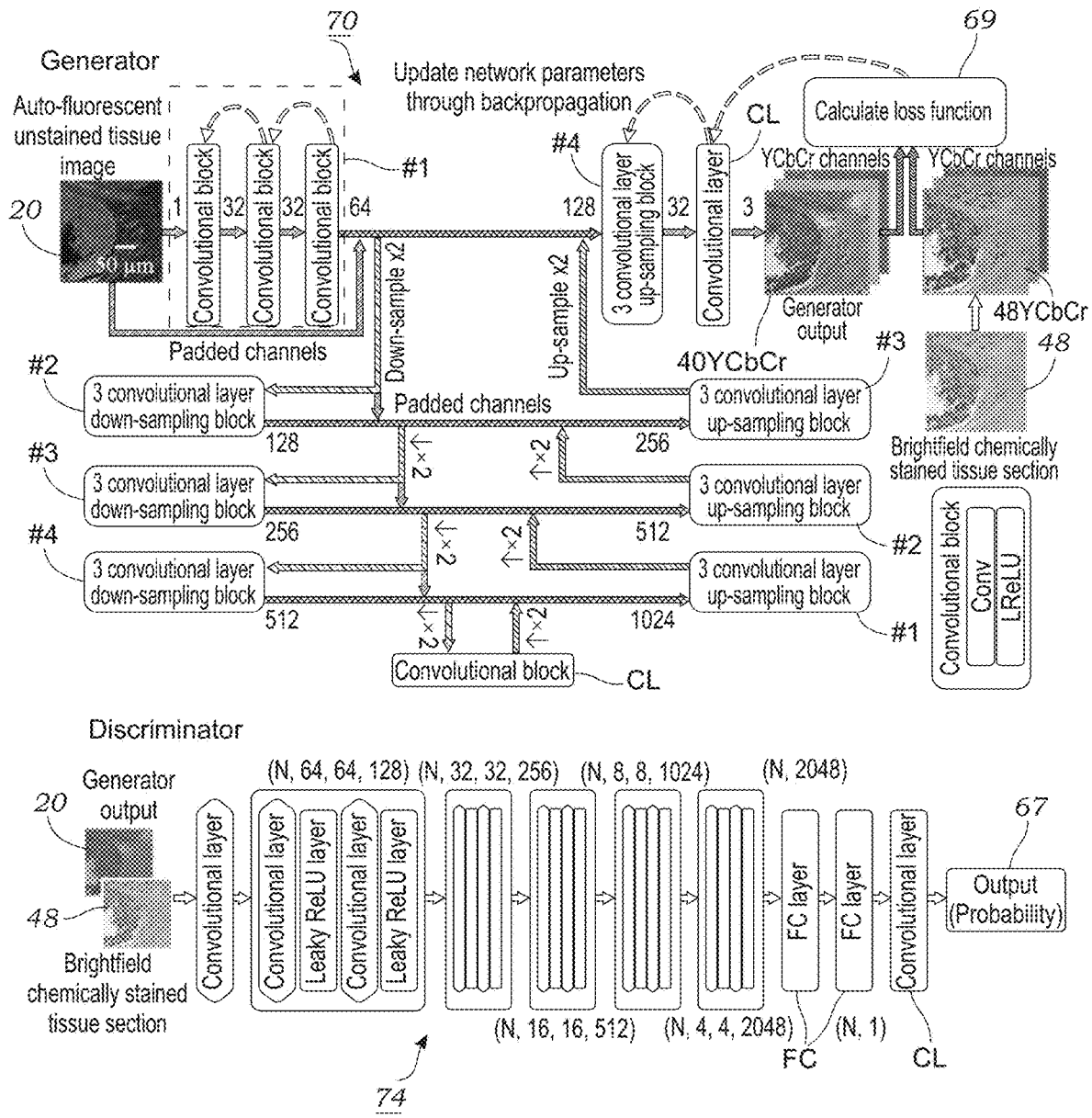
FIG. 10 illustrates the generative adversarial network (GAN) architecture for the generator and discriminator according to one embodiment.

Here, a GAN architecture was used to learn the transformation from a label-free unstained auto-fluorescence input image 20 to the corresponding brightfield image 48 of the chemically stained sample. A standard convolutional neural network-based training learns to minimize a loss/cost function between the network's output and the target label. Thus, the choice of this loss function 69 (FIGS. 9 and 10) is a critical component of the deep network design. For instance, simply choosing an $l_2$-norm penalty as a cost function will tend to generate blurry results, as the network averages a weighted probability of all the plausible results; therefore, additional regularization terms are generally needed to guide the network to preserve the desired sharp sample features at the network's output. GANs avoid this problem by learning a criterion that aims to accurately classify if the deep network's output image is real or fake (i.e., correct in its virtual staining or wrong). This makes the output images that are inconsistent with the desired labels not to be tolerated, which makes the loss function to be adaptive to the data and the desired task at hand. To achieve this goal, the GAN training procedure involves training of two different networks, as shown in FIGS. 9 and 10: (i) a generator network 70, which in this case aims to learn the statistical transformation between the unstained auto-fluorescence input images 20 and the corresponding brightfield images 48 of the same samples 12, after the histological staining process; and (ii) a discriminator network 74 that learns how to discriminate between a true brightfield image of a stained tissue section and the generator network's output image. Ultimately, the desired result of this training process is a trained deep neural network 10, which transforms an unstained auto-fluorescence input image 20 into a digitally stained image 40 which will be indistinguishable from the stained brightfield image 48 of the same sample 22. For this task, the loss functions 69 of the generator 70 and discriminator 74 were defined as such:

$$\ell_{generator} = MSE\{z_{label}, z_{output}\} + \lambda \times TV\{z_{output}\} + \alpha \times (1 - D(z_{output}))^2 \quad (1)$$

$$\ell_{discriminator} = D(z_{output})^2 + (1 - D(z_{label}))^2$$

where D refers to the discriminator network output, $z_{label}$ denotes the brightfield image of the chemically stained tissue, $z_{output}$ denotes the output of the generator network. The generator loss function balances the pixel-wise mean squared error (MSE) of the generator network output image with respect to its label, the total variation (TV) operator of the output image, and the discriminator network prediction of the output image, using the regularization parameters ($\lambda$, $\alpha$) that are empirically set to different values, which accommodate for ~2% and ~20% of the pixel-wise MSE loss and the combined generator loss ($\ell_{generator}$), respectively. The TV operator of an image z is defined as:

$$TV(z) = \sum_p \sum_q \sqrt{(z_{p+1,q} - z_{p,q})^2 + (z_{p,q+1} - z_{p,q})^2} \quad (2)$$

where p, q are pixel indices. Based on Eq. (1), the discriminator attempts to minimize the output loss, while maximizing the probability of correctly classifying the real label (i.e., the brightfield image of the chemically stained tissue). Ideally, the discriminator network would aim to achieve $D(z_{label})=1$ and $D(z_{output})=0$, but if the generator is successfully trained by the GAN, $D(z_{output})$ will ideally converge to 0.5.

The generator deep neural network architecture 70 is detailed in FIG. 10. An input image 20 is processed by the network 70 in a multi-scale fashion, using down-sampling and up-sampling paths, helping the network to learn the virtual staining task at various different scales. The down-sampling path consists of four individual steps (four blocks #1, #2, #3, #4), with each step containing one residual block, each of which maps a feature map $x_k$ into feature map $x_{k+1}$:

$$x_{k+1} = x_k + LReLU[CONV_{k3}\{LReLU[CONV_{k2}\{LReLU[CONV_{k1}\{x_k\}]\}]\}] \quad (3)$$

where CONV{.} is the convolution operator (which includes the bias terms), k1, k2, and k3 denote the serial number of the convolution layers, and LReLU[.] is the non-linear activation function (i.e., a Leaky Rectified Linear Unit) that was used throughout the entire network, defined as:

$$LReLU(x) = \begin{cases} x & \text{for } x > 0 \\ 0.1x & \text{otherwise} \end{cases} \quad (4)$$

The number of the input channels for each level in the down-sampling path was set to: 1, 64, 128, 256, while the number of the output channels in the down-sampling path was set to: 64, 128, 256, 512. To avoid the dimension mismatch for each block, the feature map $x_k$ was zero-padded to match the number of the channels in $x_{k+1}$. The connection between each down-sampling level is a 2×2 average pooling layer with a stride of 2 pixels that down-samples the feature maps by a factor of 4 (2-fold for in each direction). Following the output of the fourth down-sampling block, another convolutional layer (CL) maintains the number of the feature maps as 512, before connecting it to the up-sampling path. The up-sampling path consists of four, symmetric, up-sampling steps (#1, #2, #3, #4), with each step containing one convolutional block. The convolutional block operation, which maps feature map $y_k$ into feature map $y_{k+1}$, is given by:

$$y_{k+1} = LReLU[CONV_{k6}\{LReLU[CONV_{k5}\{LReLU[CONV_{k4}\{CONCAT(x_{k+1}, US\{y_k\})\}]\}]\}] \quad (5)$$

where CONCAT(.) is the concatenation between two feature maps which merges the number of channels, US{.} is the up-sampling operator, and k4, k5, and k6, denote the serial number of the convolution layers. The number of the input channels for each level in the up-sampling path was set to 1024, 512, 256, 128 and the number of the output channels for each level in the up-sampling path was set to 256, 128, 64, 32, respectively. The last layer is a convolutional layer (CL) mapping 32 channels into 3 channels, represented by the YcbCr color map. Both the generator and the discriminator networks were trained with a patch size of 256×256 pixels.

The discriminator network, summarized in FIG. 10, receives three (3) input channels, corresponding to the YcbCr color space of an input image 40YcbCr, 48YcbCr. This input is then transformed into a 64-channel representation using a convolutional layer, which is followed by 5 blocks of the following operator:

$$z_{k+1} = LReLU[CONV_{k2}\{LReLU[CONV_{k1}\{z_k\}]\}] \quad (6)$$

where k1, k2, denote the serial number of the convolutional layer. The number of channels for each layer was 3, 64, 64, 128, 128, 256, 256, 512, 512, 1024, 1024, 2048. The next layer was an average pooling layer with a filter size that is equal to the patch size (256×256), which results in a vector with 2048 entries. The output of this average pooling layer is then fed into two fully connected layers (FC) with the following structure:

$$z_{k+1} = FC[LReLU[FC\{z_k\}]] \quad (7)$$

where FC represents the fully connected layer, with learnable weights and biases. The first fully connected layer outputs a vector with 2048 entries, while the second one outputs a scalar value. This scalar value is used as an input to a sigmoid activation function $D(z) = 1 1 (1+\exp(-z))$ which calculates the probability (between 0 and 1) of the discriminator network input to be real/genuine or fake, i.e., ideally $D(z_{label}) = 1$ as illustrated by output 67 in FIG. 10.

The convolution kernels throughout the GAN were set to be 3×3. These kernels were randomly initialized by using a truncated normal distribution with a standard deviation of 0.05 and a mean of 0; all the network biases were initialized as 0. The learnable parameters are updated through the training stage of the deep neural network 10 by back propagation (illustrated in dashed arrows of FIG. 10) using an adaptive moment estimation (Adam) optimizer with learning rate $1 \times 10^{-4}$ for the generator network 70 and $1 \times 10^{-5}$ for the discriminator network 74. Also, for each iteration of the discriminator network 74, there were 4 iterations of the generator network 70, to avoid training stagnation following a potential over-fit of the discriminator network to the labels. A batch size of 10 was used in the training.

Once all the fields-of-view have passed through the network 10, the whole slide images are stitched together using the Fiji Grid/Collection stitching plugin (see, e.g., Schindelin, J. et al. Fiji: an open-source platform for biological-image analysis. Nat. Methods 9, 676-682 (2012), which is incorporated herein by reference). This plugin calculates the exact overlap between each tile and linearly blends them into a single large image. Overall, the inference and stitching took ~5 minutes and 30 seconds, respectively, per $cm^2$ and can be substantially improved using hardware and software advancements. Before being shown to the pathologists, sections which are out of focus or have major aberrations (due to e.g., dust particles) in either the autofluorescence or bright-field images are cropped out. Finally, the images were exported to the Zoomify format (designed to enable viewing of large images using a standard web browser; http://zoomify.com/) and uploaded to the GIGAmacro website (https://viewer.gigamacro.com/) for easy access and viewing by the pathologists.

Implementation Details

The other implementation details, including the number of trained patches, the number of epochs and the training times are shown in Table 5 below. The digital/virtual staining deep neural network 10 was implemented using Python version 3.5.0. The GAN was implemented using TensorFlow framework version 1.4.0. Other python libraries used were os, time, tqdm, the Python Imaging Library (PIL), SciPy, glob, ops, sys, and numpy. The software was implemented on a desktop computer with a Core i7-7700K CPU @ 4.2 GHz (Intel) and 64 GB of RAM, running a Windows 10 operating system (Microsoft). The network training and testing were performed using dual GeForce® GTX 1080Ti GPUs (Nvidia).

TABLE 5

| Virtual staining network | # of training patches | # of epochs | Training time (hours) |
|---|---|---|---|
| Salivary gland (H&E) | 2768 | 26 | 13.046 |
| Thyroid (H&E) | 8336 | 8 | 12.445 |
| Thyroid (H&E, transfer learning) | 8336 | 4 | 7.107 |
| Liver (Masson's Trichrome) | 3840 | 26 | 18.384 |
| Lung (Masson's Trichrome) | 9162 | 10 | 16.602 |
| Kidney (Jones stain) | 4905 | 8 | 7.16 |
| Liver (Masson's Trichrome, WSI) | 211475 | 3 | 39.64 |
| Kidney (Jones stain, WSI) | 59344 | 14 | 57.05 |
| Ovary 1 | 4738 | 84 | 37.21 |
| Ovary 2 | 11123 | 14 | 37.41 |
| Salivary Gland-1 | 4417 | 65 | 24.61 |
| Salivary Gland-2 | 2652 | 90 | 23.9 |
| Salivary Gland-3 | 13262 | 24 | 30.58 |
| Breast | 67188 | 4 | 24.85 |
| Skin | 2566 | 124 | 27.02 |
| Skin (DAPI + CY5) | 2566 | 124 | 29.62 |
| Prostate | 677 | 472 | 30.27 |

Experimental—Virtual Staining of Samples Using Fluorescence Lifetime Imaging FLIM In this embodiment, a trained neural network 10 is used that enables virtual IHC staining of unstained tissue samples 22 based on fluorescence lifetime imaging. This algorithm takes a fluorescence lifetime image 20L of an unstained tissue sample 22 and outputs an image 40 that well matches a bright-field image 48 of the same field-of-view after IHC staining. Using this method, the laborious and time consuming IHC staining procedure can be substituted with a virtual staining, which will be significantly faster and provide will allow tissue preservation for further analysis.

Data Acquisition

With reference to FIG. 11A, unstained formalin-fixed and paraffin-embedded (FFPE) breast tissues (e.g., obtained by a biopsy B) were sectioned into thin, 4 μm slices and fixed on a standard microscope glass slide. These tissue sections 22 were obtained under IRB 18-001029. The tissues were de-paraffinized with xylene before imaging and mounted on a standard glass slide using Cytoseal (Thermo-Fisher Scientific). A standard fluorescence lifetime microscope 110 (SP8-DIVE, Leica Microsystems) was used equipped with a 20×/0.75 NA objective lens (Leica HC PL APO 20×/0.75 IMM) and with two separate hybrid photodetectors receiving fluorescence signal at 435-485 nm and 535-595 nm wavelength range, respectively. The microscope 110 used a 700 nm wavelength laser exciting at ~0.3 W, these unlabeled tissue sections 22 autofluorescence lifetime was imaged generating images 20L. The scanning speed was 200 Hz for 1024×1024 pixels with a pixel size of 300 nm. Once the autofluorescence lifetime images 20L were obtained, the slides were IHC stained using standard HER2, ER, or PR staining procedures. The staining was performed by the UCLA Translational Pathology Core Laboratory (TPCL). These IHC stained slides were then imaged using a commercial slide scanning microscope equipped with a 20×/0.75 NA objective (Aperio AT, Leica Biosystems) to create the target images 48 used to train, validate and test the neural network 10.

Image Pre-Processing and Registration

Because the deep neural network 10 aims to learn the transformation from autofluorescence lifetime images 20L of the unlabeled specimen 22, it is crucial to accurately align the FOVs between them and the corresponding brightfield image 48 of the target. Image pre-processing and alignment follows the global and local registration process as described herein and illustrated in FIG. 8. At the end of the registration process, images from a single/multiple autofluorescence and/or lifetime channels from the unlabeled tissue sections 22 are well aligned to the corresponding brightfield images 48 of the IHC stained tissue sections. Before feeding those aligned image pairs 20L, 48 into neural network 10, slide normalization is implemented on fluorescence intensity images by subtracting the mean values across the entire slide and dividing it by the standard deviation between pixel values.

Deep Neural Network Architecture, Training and Validation

For the trained, deep neural network 10, a conditional GAN architecture was used to learn the transformation from a label-free unstained autofluorescence lifetime input image 20L to the corresponding bright-field image 48 in three different stains (HER2, PR, and ER). Following the registration of the autofluorescence lifetime images 20L to the bright-field images 48, these accurately aligned FOVs were randomly partitioned into overlapping patches of 256×256 pixels, which were then used to train the GAN-based deep neural network 10.

The GAN-based neural network 10 is composed of two deep neural networks, a generator network (G) and a discriminator network (D). For this task, the loss functions of the generator and discriminator were defined as such:

$$\ell_{generator} = -\mu \times \log D(G(z_{output})) + \alpha \times L_1(z_{label}, G(x_{input})) - \quad (8)$$
$$v \times \log[(1 + SSIM(G(z_{output}), z_{label}))/2] + \lambda \times TV(z_{output})$$
$$\ell_{discriminator} = -\log D(z_{label}) - \log[1 - D(G(z_{output}))]$$

where the anisotropic total variation (TV) operator and the $L_1$ norm are defined as:

$$TV(Z) = \Sigma_p \Sigma_q |z_{p+1,q} - z_{p,q}| + |z_{p,q+1} - z_{p,q}| \quad (9)$$
$$L_1(z, G) = \|z - G\|_1 \quad (9)$$

where $D(\bullet)$ and $G(\bullet)$ refers to the discriminator and generator network output, $z_{label}$ denotes the bright-field image of the histologically stained tissue and $z_{output}$ denotes the output of the generator network.

The structure similarity index (SSIM) is defined as:

$$SSIM(x, y) = \frac{(2\mu_x\mu_y + c_1)(2\sigma_{x,y} + c_2)}{(\mu_x^2 + \mu_y^2 + c_1)(\sigma_x^2 + \sigma_y^2 + c_2)} \quad (10)$$

where $\mu_x$, $\mu_y$ are the averages of the images x, y $\sigma_x^2$, $\sigma_y^2$ are the variances of x, y; $\sigma_{x,y}$ is the covariance of x and y; and $c_1$, $c_2$ are the variables used to stabilize the division with a small denominator. An SSIM value of 1.0 refers to identical images. The generator loss function balances the pixel-wise SSIM and $L_1$ norm of the generator network output image with respects its label, the total variation (TV) operator of the output image and the discriminator network prediction of the output image. The regularization parameters ($\mu$, $\alpha$, $v$, $\lambda$) were set to be (0.3, 0.7, 0.05, 0.002).

The deep neural network architecture of the generator G follows the structure of the deep neural network 10 illustrated in FIG. 11B (and described herein). However, in this implementation, the network 10 starts with a convolutional layer mapping 200 the input lifetime and/or autofluorescence image data into sixteen (16) channels, followed by the down-sampling path consists of five individual down-sampling operations 202. The number of the input channels for each level in the down-sampling path was set to: 16, 32, 64, 128, 256, while the number of the output channels in the down-sampling path was set to: 32, 64, 128, 256, 512. Following a center block convolution layer 203, the up-sampling path consists of five, symmetric, up-sampling operations 204. The number of the input channels for each level in the up-sampling path was set to 1024, 512, 256, 128, 64 and the number of the output channels for each level in the up-sampling path was set to 256, 128, 64, 32, 16 respectively. The last layer 206 is a convolutional layer mapping 16 channels into 3 channels with tan h( ) activation function 208, represented by the RGB color map. Both the generator (G) and the discriminator (D) networks were trained with an image patch size of 256×256 pixels.

The discriminator network (D) receives three (3) (i.e., red, green, and blue) input channels, corresponding to the RGB color space of an input image. This three-channel input is then transformed into a 16-channel representation using a convolutional layer 210, which is followed by 5 blocks 212 of the following operator:

$$z_{k+1} = POOL(LReLU[CONV_{k2}\{LReLU[CONV_{k1}\{z_k\}]\}]) \quad (11)$$

where CONV{.} is the convolution operator (which includes the bias terms), k1, and k2 denote the serial number of the convolution layers, and LReLU[.] is the non-linear activation function (i.e., a Leaky Rectified Linear Unit) that was used throughout the entire network, and POOL(.) is the 2×2 average pooling operation defined as:

$$LReLU(x) = \begin{cases} x & \text{for } x > 0 \\ 0.1x & \text{otherwise} \end{cases} \quad (12)$$

The number of input channels and output channels for each level exactly follows the generator down-sampling path followed by center block convolution layer 213. The last level 214 is represented by:

$$z_{k+1} = \text{Sigmoid} \quad (13)$$
$$(FC[\text{Dropout}[LReLU[FC[LReLU[CONV_{k2}\{LReLU[CONV_{k1}\{z_k\}]\}]]]]])$$

where FC[.] represents the fully connected layer, with learnable weights and biases. Sigmoid(.) represents the sigmoid activation function and Dropout[.] randomly prunes 50% of the connections from the fully connected layer.

The convolution filter size throughout the GAN-based deep neural network 10 was set to be 3×3. The learnable parameters were updated through the training using adaptive moment estimation (Adam) optimizer with a learning rate of $1 \times 10^{-4}$ for the generator network (G) and $1 \times 10^{-5}$ for discriminator network (N). The batch size of the training was set to be 48.

Implementation Details

The virtual staining network 10 was implemented using Python version 3.7.1, with Pytorch framework version 1.3. The software was implemented on a desktop computer with an Intel i9-7900X CPU at 3.30 GHz and 64 GB RAM, running a Microsoft Windows 10 operating system. Network training and testing were performed using two NVIDIA GeForce GTX 1080Ti GPUs.

Experimental—Post-Imaging Computational Autofocusing

This embodiment involves post-imaging computational autofocusing for incoherent imaging modalities, such as brightfield microscopy and fluorescence microscopy. The method requires only a single aberrated image to virtually refocus the same using a trained deep neural network. This data-driven machine learning algorithm takes an aberrated and/or out of focus image, and outputs an image that well matches a focused image of the same field-of-view. Using this method one can increase the scanning speed of microscopes that image samples, e.g., tissue.

Fluorescence Image Acquisition

With reference to FIG. 13, the tissue-autofluorescence images 20 were obtained by an inverted Olympus microscope (IX83, Olympus) 110, controlled by the Micro-Manager microscope automation software. The unstained tissue 22 was excited near the ultraviolet range and imaged using a DAPI filter cube (OSF13-DAPI-5060C, excitation wavelength 377 nm/50 nm bandwidth, emission wavelength 447 nm/60 nm bandwidth). The images 20 were acquired with a 20×/0.75NA objective lens (Olympus UPLSAPO 20×/0.75NA, WD 0.65). At each stage position, the automation software performed autofocusing based on image contrast, and a z-stack was taken from −10 μm to 10 μm with 0.5 μm axial spacing. Each image 20 was captured with a scientific CMOS sensor (ORCA-flash4.0 v.2, Hamamatsu Photonics) with an exposure time of ~100 ms.

Image Pre-Processing

To correct for rigid shift and rotation from the microscope stage, the autofluorescence image stacks (2048×2048×41) were first aligned with the ImageJ plugin 'StackReg'. Then, an extended depth of field image was generated using the ImageJ plugin 'Extended Depth of Field' for each stack. The stacks and the corresponding extended depth of field (EDOF) images were cropped into non-overlapping 512×512 smaller patches in the lateral direction, and the most focused plane (target image) was set to be the one with the highest structural similarity index (SSIM) with EDOF image. Then, 10 planes above and below the focused plane (corresponding to +/−5 μm defocus) were set to be in the range of the stack, and the input image for the training of the network 10a was generated from each of the 21 planes.

To generate training and validation datasets, the defocused aberrated and focused images of the same field-of-view were paired and used as input and output for the network 10a training, respectively. The original dataset was composed from 30,000 such pairs, randomly divided into training and validation dataset, which took 85% and 15% of the data. The training dataset was augmented 8 times by random flipping and rotation during training, while the validation dataset was not augmented. The testing dataset was cropped from separate FOVs that did not appear in training and validation datasets. Images were normalized by its mean and standard deviation at the FOV before they were fed into the network 10a.

Deep Neural Network Architecture, Training and Validation

A generative and adversarial network (GAN) 10a is used here to perform snapshot autofocusing. The GAN network 10a consists of a generator network (G) and a discriminator network (D). The generator network (G) is a U-net with residual connections, and the discriminator network (D) is a convolutional neural network. During training, the network iteratively 10a minimizes the loss functions of generator and discriminator, defined as $$L_G = MAE\{z_{label}, z_{output}\} + \lambda \times MSSSIM\{z_{label}, z_{output}\} + \beta \times MSE\{z_{label}, z_{output}\} + \alpha \times (1 - D(z_{output}))^2 \quad (14)$$

$$L_D = D(z_{output})^2 + (1 - D(z_{label}))^2 \quad (15)$$

Where $z_{label}$ denotes the focused fluorescence image, $z_{output}$ denotes the generator output, D is the discriminator output. The generator loss function is a combination of mean absolute error (MAE), multiscale structural similarity (MS-SSIM) index, and mean square error (MSE), balanced by regularization parameters λ, β, α. In training, the parameters are set as λ=50, β=1, α=1 empirically. The multiscale structural similarity index (MS-SSIM) is defined as $$MSSSIM(x, y) = \left[\frac{2\mu_{x_M}\mu_{y_M} + C_1}{\mu_{x_M}^2 + \mu_{y_M}^2 + C_1}\right]^{\alpha_M} \cdot \prod_{j=1}^{M} \left[\frac{2\sigma_{x_j}\sigma_{y_j} + C_2}{\sigma_{x_j}^2 + \sigma_{y_j}^2 + C_2}\right]^{\beta_j} \left[\frac{\sigma_{x_j y_j} + C_3}{\sigma_{x_j}\sigma_{y_j} + C_3}\right]^{\gamma_j} \quad (16)$$

Where $x_j$ and $y_j$ are the distorted and reference image downsampled $2^{j-1}$ times; $\mu_x$, $\mu_y$ are the averages of x, y;

$$\sigma_x^2, \sigma_x^2$$

are me variances or x; $\sigma_{xy}$ is the covariance of x, y; and $C_1$, $C_2$, $C_3$, are small constants to stabilize the division with a small denominator.

An adaptive moment estimation (Adam) optimizer is used to update the learnable parameters, with a learning rate of $1\times10^{-4}$ for generator (G) and $1\times10^{-6}$ for discriminator (D), respectively. In addition, six updates of the generator loss and three updates of the discriminator loss are performed at each iteration. A batch size of five (5) was used in the training. The validation set is tested every 50 iterations, and the best model is chosen as the one with smallest loss on the validation set.

Implementation Details

The network is implemented using TensorFlow on a PC with Intel Xeon Core W-2195 CPU at 2.3 GHz and 256 GB RAM, using Nvidia GeForce 2080Ti GPU. The training for 30,000 image pairs of size 512×512 takes about ~30 hours. The testing time for a 512×512 pixels image patch is ~0.2 s.

Experimental—Virtual Staining with Multiple Stains with a Single Network

In this embodiment, a class conditional convolutional neural network 10 is used to transform input images consisting of one or more autofluorescence images 20 of the unlabeled tissue sample 22. As an example, to demonstrate its utility, a single network 10 was used to virtually stain an image of an unlabeled section with Hematoxylin and Eosin (H&E), Jones silver stain, Masson's Trichrome, and Periodic acid-Schiff (PAS) stains. The trained neural network 10 is able to generate novel stains as well as staining of specific tissue microstructures with these trained stains.

Data Acquisition

Unstained formalin-fixed and paraffin-embedded (FFPE) kidney tissues were sectioned into thin, 2 μm slices and fixed on a standard microscope glass slide. These tissue sections 22 were obtained under IRB 18-001029. A conventional widefield fluorescence microscope 110 (IX83, Olympus) equipped with a 20×/0.75 NA objective lens (Olympus UPLSAPO 20×/0.75 NA, WD 0.65) and with two separate filter cubes, DAPI (OSFI3-DAPI-5060C, EX 377/50 nm EM 447/60 nm, Semrock) and TxRed (OSFI3-TXRED-4040C, EX 562/40 nm EM 624/40 nm, Semrock) were used with the autofluorescence of the unlabeled tissue sections 22 imaged. The exposure time for the DAPI channel was ~50 ms and ~300 ms for the TxRed channel. Once the autofluorescence of the tissue sections 22 was imaged, the slides were histologically stained using standard H&E, Jones, Masson's trichrome, or PAS staining procedures. The staining was performed by the UCLA Translational Pathology Core Laboratory (TPCL). These histologically stained slides were then imaged using an FDA approved slide scanning microscope 110 (Aperio AT, Leica Biosystems, scanning using a 20×/0.75NA objective) to create the target images 48 used to train, validate and test the neural network 10.

Deep Neural Network Architecture, Training and Validation

A conditional GAN architecture was used for the trained, deep neural network 10 to learn the transformation from a label-free unstained autofluorescence input image 20 to the corresponding bright-field image 48 using four different stains (H&E, Masson trichrome, PAS and Jones). Of course, other or additional stains can be trained in the deep neural network 10. Following the co-registration of the autofluorescence images 20 to the bright-field images 48, these accurately aligned FOVs were randomly partitioned into overlapping patches of 256×256 pixels, which were then used to train the GAN network 10. In the implementation of the conditional GAN network 10, one-hot encoded matrices M (FIG. 15) were used which are concatenated to the network's 256×256 input image/image stack patches, in the training process, where each matrix M corresponds to a different stain. One way to represent this conditioning is given by:

$$\tilde{c}=[c_1,c_2,c_3,c_4] \quad (17)$$

Where [•] refers to concatenation, and $c_1$ represents a 256×256 matrix for the label for the i-th staining type (in this example: H&E, Masson trichrome, PAS and Jones). For an input and target image pair from the i-th staining dataset, the $c_i$ is set to be an all ones matrix, while all other remaining matrices are assigned zero values, accordingly (see FIG. 15). The conditional GAN network 10 is composed of two deep neural networks, a generator (G) and a discriminator (D) as explained herein. For this task, the loss functions of the generator and discriminator are defined to be:

$$\ell_{generator} = L_1\{z_{label}, G(x_{input}, \tilde{c})\} + \lambda \times TV\{z_{output}\} + \alpha \times (1 - D(z_{output}, \tilde{c})) \quad (18)$$

$$\ell_{discriminator} = D(z_{output}, \tilde{c})^2 + (1 - D(z_{label}, \tilde{c}))^2$$

Where the anisotropic TV operator and $L_1$ norm are defined as:

$$TV(Z) = \Sigma_p \Sigma_q |z_{p+1,q} - z_{p,q}| + |z_{p,q+1} - z_{p,q}|$$

$$L_1(z, G) = \frac{1}{P \times Q} \sum_p \sum_q |z_{p,q} - G(x_{input}, \tilde{c})_{p,q}|$$

Where D(•) and G(•) refer to the discriminator and generator network output respectively, $z_{label}$ denotes the bright-field image of the histologically stained tissue and $z_{output}$ denotes the output of the generator network. P and Q represent the number of vertical and horizontal pixels for the image patch, and p and q represent summation indices. The regularization parameters (λ, α) were set to be 0.02 and 2000 which accommodates the total variation loss term to be approximately 2% of the $L_1$ loss and the discriminator loss term to be 98% of the total generator loss.

The deep neural network architecture of the generator (G) follows the structure of the deep neural network 10 illustrated in FIG. 10 (and described herein). However, in one implementation, the number of input channels for each level in the down sampling path was set to: 1, 96, 192, 384. The discriminator network (D) receives seven input channels. Three (YCbCr color map) come from either the generator output or the target and four from the one-hot encoded class condition matrices M. A convolution layer is used to transform this input into a 64-channel feature map. The convolution filter size throughout the GAN was set to be 3×3. The learnable parameters were updated through the training using adaptive moment estimation (Adam) optimizer with a learning rate of $1\times10^{-4}$ for the generator network (G) and $2\times10^{-6}$ for discriminator network (D). For each discriminator step, there were ten iterations of the generator network. The batch size of the training was set to be 9.

Single Virtual Tissue Staining

Once the deep neural network 10 is trained, the one-hot encoded label $\tilde{c}$ is used to condition the network 10 to generate the desired stained images 40. In other words, a $c_i$ matrix is set to be an all ones matrix and other remaining matrices are set to be all zeros for the i-th staining (for a single stain embodiment). Thus, one or more conditional matrices can be applied to the deep neural network 10 to generate the respective stains on all or sub-regions of the imaged sample. The conditional matrix/matrices M define the sub-regions or boundaries of each stain channel.

Stain Blending and Micro-Structuring

Following the training process, one can use the conditional matrices in ways that the network 10 wasn't trained for, in order to create new or novel type(s) of stains. The encoding rule that should be satisfied can be summarized in the following equation:

$$\sum_{i=1}^{Nstains} c_{i,j,k} = 1 \tag{19}$$

Figure 17:
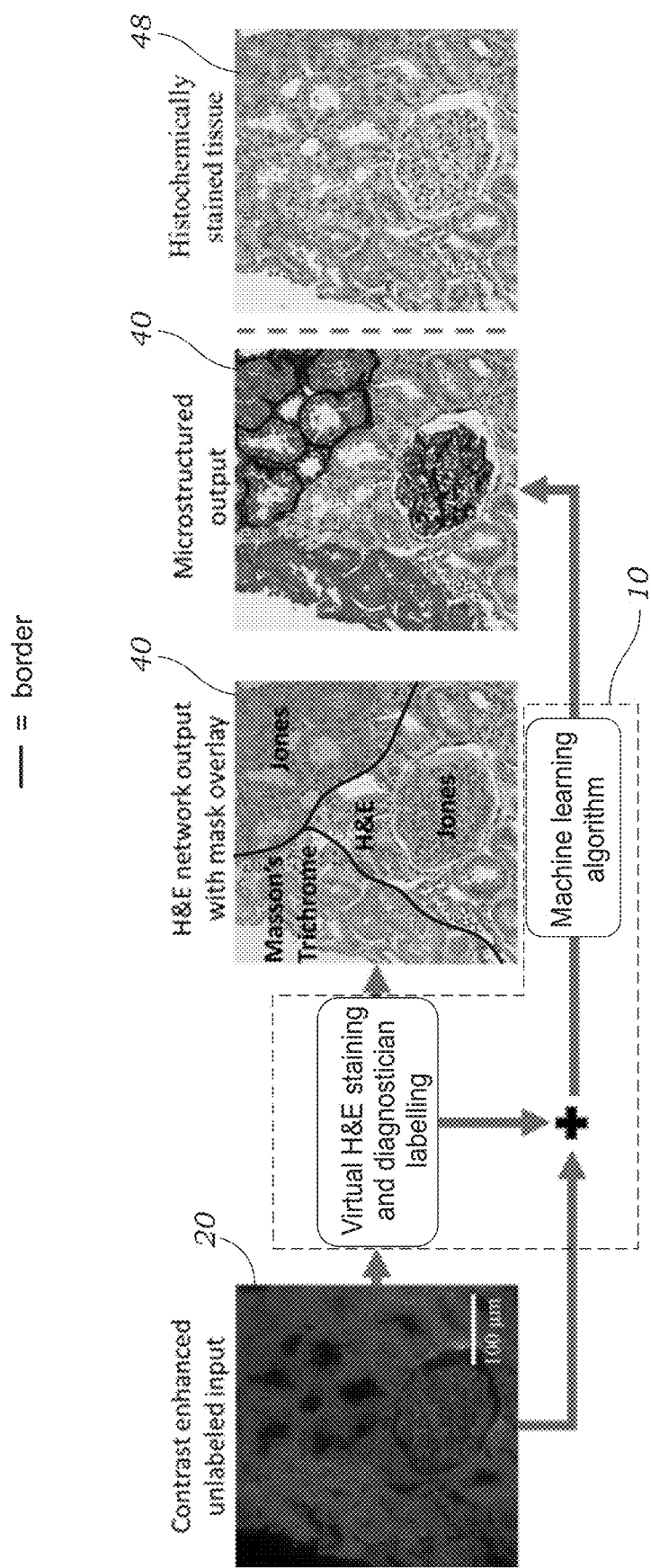
FIG. 17 illustrates an example of stain micro structuring. A diagnostician can manually label sections of the unstained tissue. These labels are used by the network to stain different areas of the tissue with the desired stains. A co-registered image of the histochemically stained H&E tissue is shown for comparison.

In other words, for a given set of indices, i,j, the sum across the number of stains that the network 10 was trained with ($N_{stains}=4$ in our example) should be equal to 1. In one possible implementation, by modifying the class encoding matrices to use a mixture of multiple classes, as described in the following Equation:

$$\sum_{i=1}^{Nstains} c_i = 1 \tag{20}$$

the various stains can be blended, creating a unique stain with features emanating from the various stains learned by the artificial neural network. This is illustrated in FIG. 17.

Another option is to partition the tissue's field-of-view into different regions of interest (ROI-s) where every region of interest can be virtually stained with a specific stain, or the blending of these stains:

$$\sum_{i=1}^{Nstains} c_{i,j,k} = 1 \text{ for } j,k \subset \text{ROI} \tag{21}$$

where ROI is the defined region-of-interest in the field of view. Multiple non-overlapping ROI-s can be defined across a field-of-view. In one implementation, different stains can be used for different regions of interest or micro-structures. These can either be user-defined and marked manually as explained herein, or algorithmically generated. As an example, a user can manually define various of the tissue areas via a GUI and stain them with different stains (FIGS. 16 and 17). This results in different tissue constituents being stained differently, as illustrated in FIGS. 16 and 17. The ROI-s selective staining (microstructuring) was implemented using the Python segmentation package Labelme. Using this package, ROI logical masks are generated, which are then processed to be label $\tilde{c}_{ROI}$ for microstructure. In another implementation, the tissue's structures can be stained based on a computer-generated mapping, obtained for example by a segmentation software. For example, this can virtually stain all the cell nuclei with one (or multiple) stain(s), while the rest of the tissue 22 is stained with another stain or stain combination. Other manual, software or hybrid approaches can be used to implement selection variety of tissue structures.

FIG. 16 illustrates an example of a GUI of a display 106 that includes tool bars 120 that may be used to select certain regions of interest in the network output image 40 to stain with a particular stain. The GUI may also include various stain options or stain palette 122 that can be used to select the desired stain for the network output image 40 or selected regions of interest within the network output image 40. In this particular example, three areas are identified by hashed lines (Areas A, B, C) that have been manually selected by the user. These Areas may also be identified automatically by the image processing software 104 in other embodiments. FIG. 16 illustrates a system that includes a computing device 100 that contains one or more processors 102 therein and image processing software 104 that incorporates the trained, deep neural network 10.

Implementation Details

The virtual staining network was implemented using Python version 3.6.0, with TensorFlow framework version 1.11.0. The software may be implemented on any computing device 100. For experiments described herein, the computing device 100 was a desktop computer with an Intel Xeon W-2195 CPU at 2.30 GHz and 256 GB RAM, running a Microsoft Windows 10 operating system. Network training and testing were performed using four NVIDIA GeForce RTX 2080 Ti GPUs.

Augmented Training with Multiple Styles

Figure 20C:
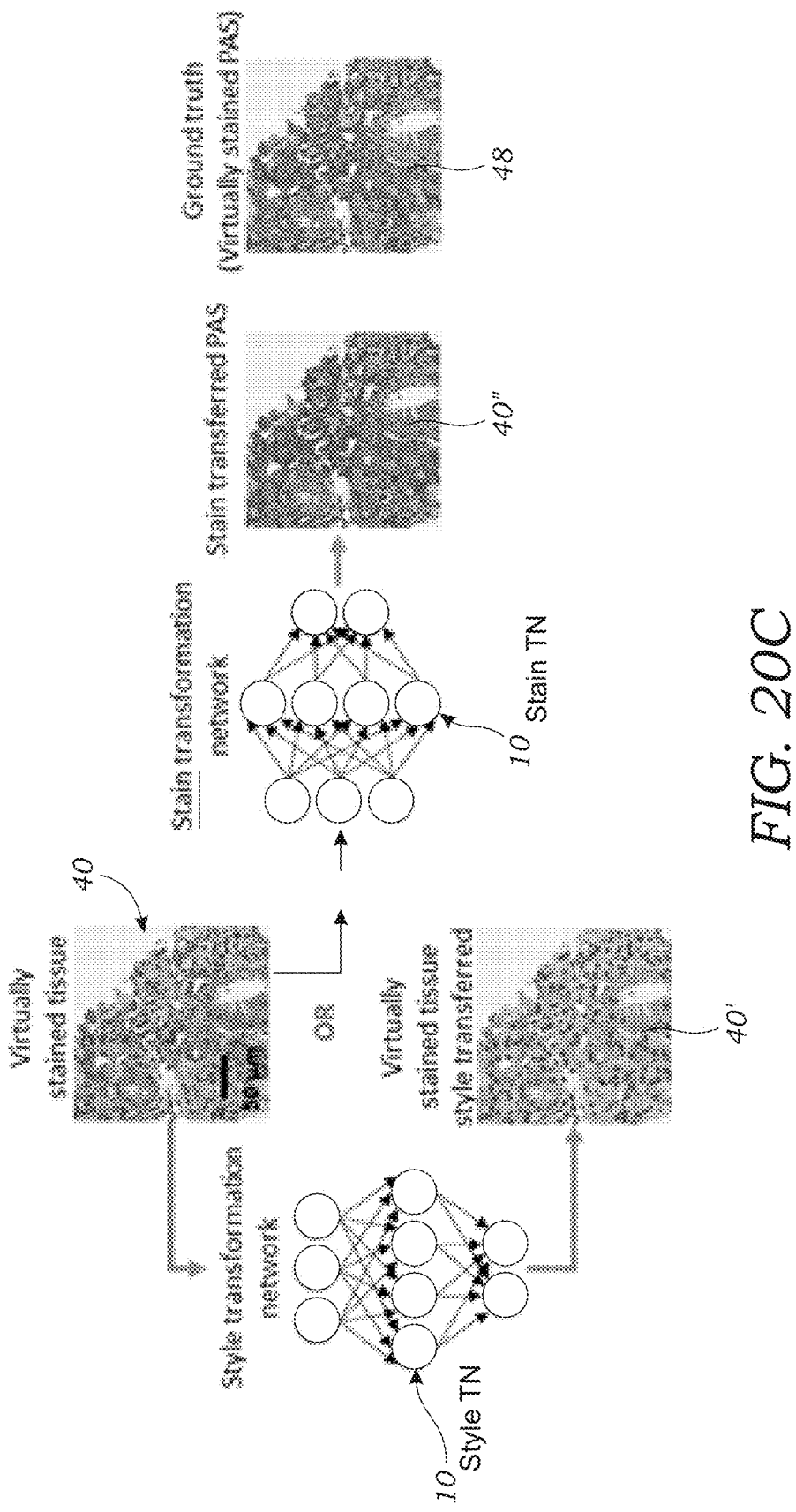
FIG. 20C illustrates the scheme used to train the stain transformation network ($10_{stainTN}$). The stain transformation is randomly given either the virtually stained H&E tissue, or an image of the same field of view after passing through one of K=8 stain transformation networks ($10_{styleTN}$). A perfectly matched virtually stained tissue using the desired special stain (in this case PAS) is used as the ground truth to train this neural network.

FIGS. 20A-20C illustrate another embodiment in which training of the deep neural network acting as a stain transformation network $10_{stainTN}$ (FIG. 20C) is augmented with additional styles. The images that are generated using the virtual staining network 10 and meant to be used as inputs for training of the stain transfer network $10_{stainTN}$ are normalized (or standardized). The augmentation with the additional styles is needed in certain situations, however, because whole slide images that are generated using a standard histological staining and scanning, demonstrate an inevitable variability as a result of varying staining procedures and reagents between different labs as well specific digital whole slide scanner characteristics. This embodiment thus produces a stain transfer network $10_{stainTN}$ that can accommodate a wide range of input images by incorporating a plurality of styles during the training process.

Therefore, to generalize the performance of the network $10_{stainTN}$ to this staining variability, network training was augmented with additional staining styles. Styles refers to the different variability in images that may appear in chemically stained tissue samples. In this implementation, it was decided to facilitate this augmentation by K=8 unique style transfer (staining normalization) networks which are trained using a CycleGAN approach although other style transfer networks may be used. CycleGAN is a GAN approach that uses two generators (G) and two discriminators (D). One pair is used to convert images from a first domain to a second domain. The other pair is used to convert images from the second domain to the first domain. This is seen, for example, in FIG. 21. Details regarding the CycleGAN approach may be found in, for example, Zhu et al., Unpaired Image-to-Image Translation using Cycle-Consistent Adversarial Networks, arXiv:1703.10593v1-v7 (2017-2020), which are incorporated herein by reference. These style augmentations ensure that a broad sample space is covered by the ensuing stain transformation network $10_{stainTN}$, and therefore that the stain transfer will be effective when applied to a chemically H&E stained tissue samples regardless of inter-technician, inter-lab or inter-equipment variations.

The style transformation network $10_{stainTN}$ may be used to augment the virtual stain generator/transformation network $10_{stainTN}$ for virtual-to-virtual stain transformations or chemical-to-virtual stain transformations. The latter is more likely the to be used with the stain transformation network given the variability seen in chemical stains (e.g., H&E stains). For example, there is a need in the industry to transform chemical stains one type to another type. An example includes chemical H&E stains and the need to create specialized stains such as PAS, MT or JMS. For instance, non-neoplastic kidney disease relies on these "special stains" to provide the standard of care pathologic evaluation. In many clinical practices, H&E stains are available before special stains and pathologists may provide a "preliminary diagnosis" to enable the patient's nephrologist to begin treatment. This is especially useful in the setting of some diseases such as crescentic glomerulonephritis or transplant rejection, where quick diagnosis, followed by rapid initiation or treatment, may lead to significant improvements in clinical outcomes. In the setting when only H&E slides are initially available, the preliminary diagnosis is followed by the final diagnosis which is usually provided the next working day. As explained herein, an improved deep neural network $10_{stainTN}$ was developed to improve the preliminary diagnosis by generating three additional special stains: PAS, MT and Jones methenamine silver (JMS) using the H&E stained slides, that can be reviewed by the pathologist concurrently with the histochemically stained H&E stain.

A set of supervised deep-learning based workflows is presented, which enable a user to perform a transformation between two stains using the stain transformation network $10_{stainTN}$. This is achieved by first generating registered pairs of virtually stained H&E images and special stains of the same autofluorescence image of the label-free tissue section (FIG. 20A). These generated images can be used to transform chemically stained images to specialized stains. This facilitates the creation of a perfectly spatially registered (paired) dataset and allows the stain transformation network $10_{stainTN}$ to be trained without relying solely on distribution matching losses and unpaired data. Furthermore, no aberrations will be created by misalignments, thus improving the accuracy of the transformation. This is validated by evaluating kidney tissues with various non-neoplastic diseases.

A deep neural network $10_{stainTN}$ was used to perform the transformation between the H&E stained tissue and the special stains. To train this neural network, a set of additional deep neural networks 10 were used in conjunction with one another. This workflow relies upon the ability of virtual staining to generate images of multiple different stains using a single unlabeled tissue section (FIG. 20A). By using a single neural network 10 to generate both H&E images alongside one of the special stains (PAS, MT or JMS) a perfectly matched (i.e., paired) dataset can be created. Due to the normalization (standardization) of the images generated using the virtual staining network 10, the virtually stained images 40, which are meant to be used as inputs when training the stain transformation network $10_{stainTN}$ are augmented with the additional staining styles to ensure generalization (FIG. 20B). This is shown by virtually stained image 40 in FIG. 20B being run through the style transfer network $10_{stainTN}$ to create the augmented or style transferred output image 40'. In other words, the stain transformation network $10_{stainTN}$ is designed to be able to handle an inevitable H&E staining variability that is a result of staining procedures and reagents between different labs as well specific digital whole slide scanner characteristics. This augmentation is performed by K=8 unique style transfer (staining normalization) networks $10_{stainTN}$ which are trained using a CycleGAN (FIG. 20B). These augmentations ensure that a broad H&E sample space is covered by the ensuing stain transformation network $10_{stainTN}$, and therefore that it will be effective when applied to H&E stained tissue samples regardless of inter-technician, inter-lab or inter-equipment variations. Note that even though the deep neural network $10_{stainTN}$ is used to transform a chemical stain to one or more virtual stains, the augmented training of the neural network $10_{stainTN}$ is done using different virtually stained inputs for stain style transformation.

Using this dataset, the stain transformation network $10_{stainTN}$ can be trained, using the scheme shown in FIG. 20C. The network $10_{stainTN}$ is randomly fed image patches either coming from the virtually stained tissue 40 (upper path), or the virtually stained images passing through one of the K=8 style transfer networks $10_{stainTN}$ (left path) and histochemical stain transferred output image 40" is generated. The corresponding special stain (virtual special stain from the same unlabeled field of view) is used as the ground truth 48 regardless of the CycleGAN style transfer. The network $10_{stainTN}$ is then blindly tested (on patients/cases that the network was not trained with) on a variety of digitized H&E slides taken from UCLA repository, which represent a cohort of diseases and staining variations.

Method for Stain Style Transfer for Data Augmentation

Figure 21:
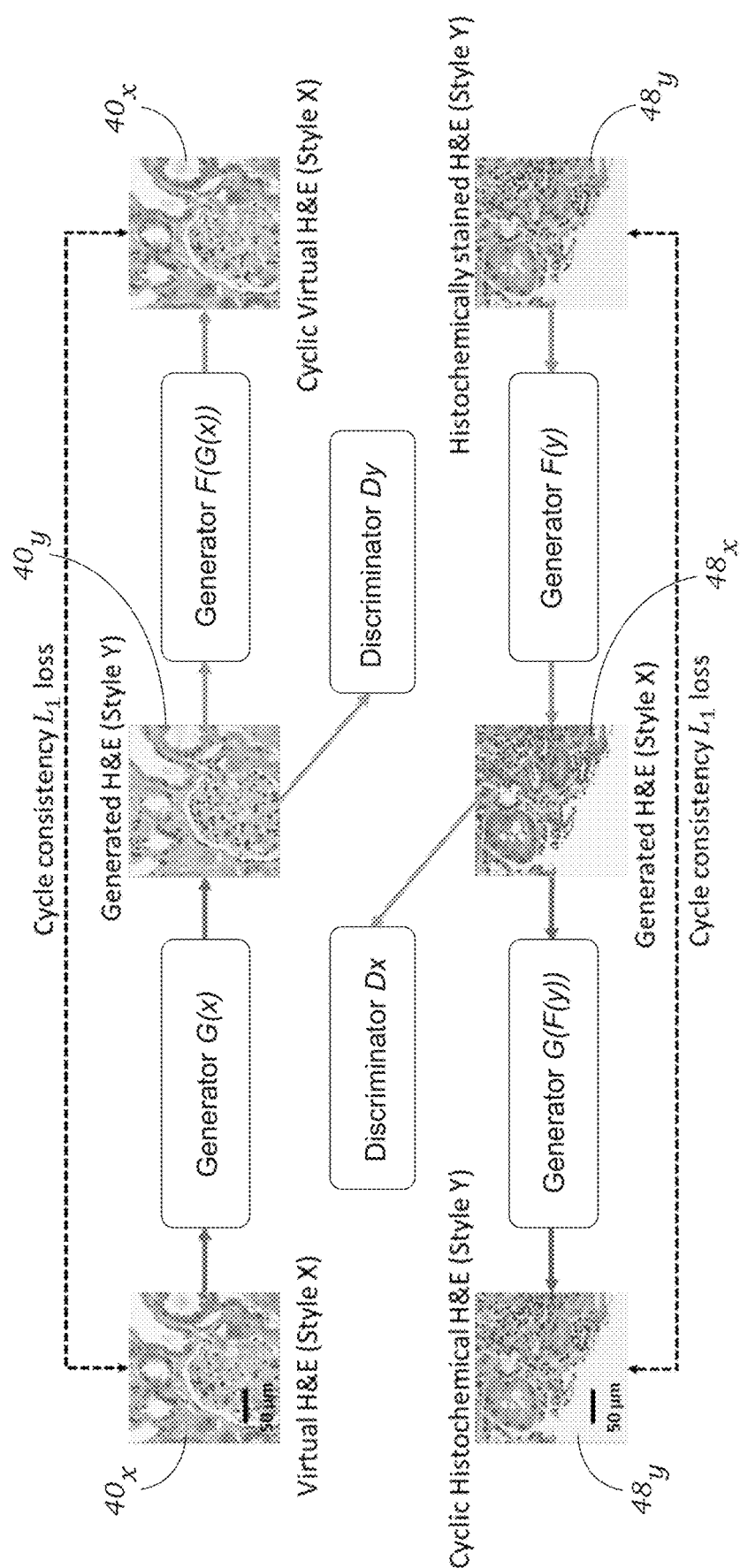
FIG. 21 schematically illustrates the transformations performed by the various networks during the training phase of the style transformation (e.g., CycleGAN).

In order to ensure that the neural network $10_{stainTN}$ is capable of being applied to a wide variety of H&E stained tissue sections, the CycleGan model was used to augment the training dataset by performing style transformation using a style transformation network $10_{stainTN}$ (FIG. 20B). This neural network $10_{stainTN}$ learns to map between two domains X and Y given training samples x and y, where X is the domain for the original virtually stained H&E (image $40_x$ in FIG. 21) and Y is the domain for the H&E generated image $48_y$ by a different lab or hospital. This model performs two mappings G:X→Y and F:Y→X. In addition, two adversarial discriminators $D_X$ and $D_Y$ are introduced. A diagram showing the relation between these various networks is shown in FIG. 21. As seen in FIG. 21, the virtual H&E image $40_x$ (style X) is input to generator G(x) to create a generated H&E image $40_y$ with style Y. A mapping is then made back to the X domain using the second generator F(G(x)) to generate image $40_x$. With reference to FIG. 21, the histochemically stained H&E image $40_y$ (style Y) is input to generator F(y) to create a generated H&E image $48_x$ with style X. A mapping is then made back to the Y domain using the second generator G(F(y)) to generate image 48y. FIGS. 22A, 22B illustrates the construction of the two generator networks G(x) (FIG. 22A), F(y) (FIG. 22B).

The loss function of the generator $l_{generator}$ contains two types of terms: adversarial losses $l_{adv}$ to match the stain style of the generated images to the style of histochemically stained images in target domain; and cycle consistency losses $l_{cycle}$ to prevent the learned mappings G and F from contradicting each other. The overall loss is therefore described by the equation:

$$l_{generator} = \lambda \times l_{cycle} + \varphi \times l_{adv} \quad (22)$$

where $\lambda$ and $\varphi$ are constants used to weight the loss function. For all the networks, $\lambda$ was set to 10 and $\varphi$ was set to be equal to 1. Each generator in FIG. 21 is associated with a discriminator ($D_x$ or $D_y$), which ensures that the generated image matches the distribution of the ground truth. The losses for each of the generator networks can be written as:

$$l_{adv\ X \to Y} = (1 - D_Y(G(X)))^2 \quad (23)$$

$$l_{adv\ Y \to X} = (1 - D_X(F(y)))^2 \quad (24)$$

And the cycle consistency loss can be described as:

$$l_{cycle} = L_1\{y, G(F(y))\} + L_1\{x, F(G(x))\} \quad (25)$$

Where the $L_1$ loss, or the mean absolute error loss is given by:

$$L_1(z, x) = \frac{1}{P \times Q} \sum_p \sum_q |z_{p,q} - x_{p,q}| \quad (26)$$

In this equation p and q are the pixel indices and P and Q are the total number of pixels on the lateral dimensions.

The adversarial loss terms used to train $D_X$ and $D_Y$ are defined as:

$$l_{D_X} = (1-D_X(x))^2 + D_X(F(y))^2 \qquad (27)$$

$$l_{D_Y} = (1-D_Y(y))^2 + D_Y(G(x))^2 \qquad (28)$$

For these CycleGAN models, G and F use U-net architectures. This architecture consists of three "down-blocks" 220 followed by three "up-blocks" 222. Each of the down-blocks 220 and up-blocks 222 contain three convolutional layers with a 3×3 kernel size, activated upon by the LeakyReLU activation function. The down blocks 220 each increase the number of channels by a factor of two, and end with an average pooling layer with a stride and kernel size of two. The up-blocks 222 begin with a bicubic up-sampling prior to the application of the convolutional layers. Between each of the blocks of a certain layer, a skip connection is used to pass data through the network without needing to go through all the blocks.

The discriminators $D_X$ and $D_Y$ are made up of four blocks. These blocks contain two convolutional layer and LeakyReLU pairs, which together increase the number of channels by a factor of two. These are followed by an average pooling layer with a stride of two. After the five blocks, two fully connected layers reduce the output dimensionality to a single value.

During the training, adaptive moment estimation (Adam) optimizer was used to update the learnable parameters with learning rates of $2\times10^{-5}$ for both generator (G) and discriminator (D) networks. For each step of discriminator training, one iteration of training was performed for the generator network, and the batch size for training was set to 6.

The style transformation network $10_{styleTN}$ may, in some embodiments, include a normalization of staining vectors. The trained, network $10_{stainTN}$ may also be trained in a supervised manner between two different variations of the same stained slide, where the variation is a result of imaging of the samples with different microscopes or histochemical staining followed by a second re-staining of the same slide. The trained, network $10_{stainTN}$ may be trained by a set of paired virtually stained images, each stained with a different virtual stain, generated by a single virtual staining neural network 10.

While embodiments of the present invention have been shown and described, various modifications may be made without departing from the scope of the present invention. For example, while various embodiments have been described as generating digitally/virtually stained microscopic images of label-free or unstained samples, the methods may also be used where the sample is labeled with one or more exogenous fluorescent labels or other exogenous emitters of light. Thus, these samples are labeled but not with conventional immunochemistry (IHC) stains. The invention, therefore, should not be limited, except to the following claims, and their equivalents.

What is claimed is:

1. A method of generating a virtually stained microscopic image of a test sample comprising:
    providing a neural network that is executed by image processing software using one or more processors of a computing device, wherein the neural network is trained with a plurality of pairs of stained and matched microscopic images or image patches, wherein each pair comprises a first image or image patch of a training sample that is virtually or chemically stained with a first stain type and a second image or image patch of the training sample that is virtually or chemically stained with a second, different stain type;
    obtaining an input image of the test sample that is virtually or chemically stained with the first stain type;
    inputting the input image of the test sample into the neural network; and
    transforming, via the neural network, the input image into an output image of the test sample that is virtually stained with the second stain type to substantially resemble and match a stained microscopic image of the test sample that is chemically stained with the second stain type.

2. The method of claim 1, wherein the neural network comprises a first neural network, and wherein the input image is virtually stained and generated via a second, different neural network, at least one digital algorithm, or a machine learning algorithm.

3. The method of claim 1, wherein the first stain type of the input image of the test sample comprises a histochemical stain, and wherein the input image is obtained by an incoherent microscope.

4. The method of claim 3, wherein the input image is obtained with a microscope comprising one of: a fluorescence microscope, a widefield microscope, a super-resolution microscope, a confocal microscope, a confocal microscope with single photon or multi-photon excited fluorescence, a second harmonic or high harmonic generation fluorescence microscope, a light-sheet microscope, a FLIM microscope, a brightfield microscope, a darkfield microscope, a structured illumination microscope, a total internal reflection microscope, a computational microscope, a ptychographic microscope, a synthetic aperture-based microscope, or phase contrast microscope.

5. The method of claim 3, wherein the output image of the test sample is obtained using an incoherent microscope that is out-of-focus within an axial range around an in-focus image plane.

6. The method of claim 1, wherein one or both of the first and second images or image patches are augmented with a style transformation network or an algorithm.

7. The method of claim 6, wherein the style transformation network comprises a CycleGAN-based style transformation network.

8. The method of claim 6, wherein the style transformation network comprises normalization of staining vectors.

9. The method of claim 6, wherein the style transformation network is trained in a supervised manner using first and second images of a stained slide, wherein the first and second images vary due to a different microscope type used to take the first and second images, or a different amount of chemical staining applied to the slide in first and second images.

10. The method of claim 6, wherein both of the first and second images or image patches are virtually stained and generated by one or more virtual staining neural networks.

11. The method of claim 1, wherein the chemical stain comprises one of: Hematoxylin and Eosin (H&E) stain, hematoxylin, eosin, Jones silver stain, Masson's Trichrome stain, Periodic acid-Schiff (PAS) stains, Congo Red stain, Alcian Blue stain, Blue Iron, Silver nitrate, trichrome stains, Ziehl Neelsen, Grocott's Methenamine Silver (GMS) stains, Gram Stains, acidic stains, basic stains, Silver stains, Nissl, Weigert's stains, Golgi stain, Luxol fast blue stain, Toluidine Blue, Genta, Mallory's Trichrome stain, Gomori Trichrome, van Gieson, Giemsa, Sudan Black, Perls' Prussian, Best's Carmine, Acridine Orange, immunofluorescent stains, immunohistochemical stains, Kinyoun's-cold stain, Albert's staining, Flagellar staining, Endospore staining, Nigrosin, or India Ink.

12. The method of claim 1, wherein the first stain type of the test sample comprises Hematoxylin and Eosin (H&E).

13. The method of claim 12, wherein the second stain type of the test sample comprises a Jones methenamine silver stain, a Masson's Trichrome stain, or a Periodic acid-Schiff (PAS) stain.

14. The method of claim 1, wherein the stained microscopic image of the test sample is histochemically stained.

* * * * *